(12) United States Patent
Gagnon et al.

(10) Patent No.: US 8,996,375 B1
(45) Date of Patent: *Mar. 31, 2015

(54) SPEECH INTERFACE SYSTEM AND METHOD FOR CONTROL AND INTERACTION WITH APPLICATIONS ON A COMPUTING SYSTEM

(71) Applicant: Great Northern Research, LLC, Vero Beach, FL (US)

(72) Inventors: Jean Gagnon, Vankleek Hill (CA); Philippe Roy, Kitchener (CA); Paul J. Lagassey, Vero Beach, FL (US)

( * ) Notice: Subject to any disclaimer, the term of this patent is extended or adjusted under 35 U.S.C. 154(b) by 106 days.

This patent is subject to a terminal disclaimer.

(21) Appl. No.: 13/951,670

(22) Filed: Jul. 26, 2013

Related U.S. Application Data

(60) Division of application No. 13/454,333, filed on Apr. 24, 2012, now Pat. No. 8,543,407, which is a continuation of application No. 12/241,028, filed on Sep. 29, 2008, now Pat. No. 8,165,886.

(60) Provisional application No. 60/977,645, filed on Oct. 4, 2007.

(51) Int. Cl.
  *G10L 15/18* (2013.01)
(52) U.S. Cl.
  USPC .......................................... 704/257; 704/275
(58) Field of Classification Search
  USPC ......................................... 704/257, 270, 275
  See application file for complete search history.

(56) References Cited

U.S. PATENT DOCUMENTS

| | | | | |
|---|---|---|---|---|
| 5,960,394 A | * | 9/1999 | Gould et al. | 704/270.1 |
| 6,044,347 A | * | 3/2000 | Abella et al. | 704/272 |
| 6,064,959 A | * | 5/2000 | Young et al. | 704/251 |
| 6,088,671 A | * | 7/2000 | Gould et al. | 704/235 |
| 6,871,179 B1 | * | 3/2005 | Kist et al. | 704/275 |
| 8,165,886 B1 | * | 4/2012 | Gagnon et al. | 704/275 |
| 8,219,407 B1 | * | 7/2012 | Roy et al. | 704/275 |
| 8,543,407 B1 | * | 9/2013 | Gagnon et al. | 704/275 |
| 2006/0136221 A1 | * | 6/2006 | James et al. | 704/275 |

* cited by examiner

*Primary Examiner* — Abul Azad
(74) *Attorney, Agent, or Firm* — Steven M. Hoffberg; Ostrolenk Faber LLP

(57) ABSTRACT

A speech processing system which exploits statistical modeling and formal logic to receive and process speech input, which may represent data to be received, such as dictation, or commands to be processed by an operating system, application or process. A command dictionary and dynamic grammars are used in processing speech input to identify, disambiguate and extract commands. The logical processing scheme ensures that putative commands are complete and unambiguous before processing. Context sensitivity may be employed to differentiate data and commands. A multi faceted graphic user interface may be provided for interaction with a user to speech enable interaction with applications and processes that do not necessarily have native support for speech input.

20 Claims, 51 Drawing Sheets

System Overview

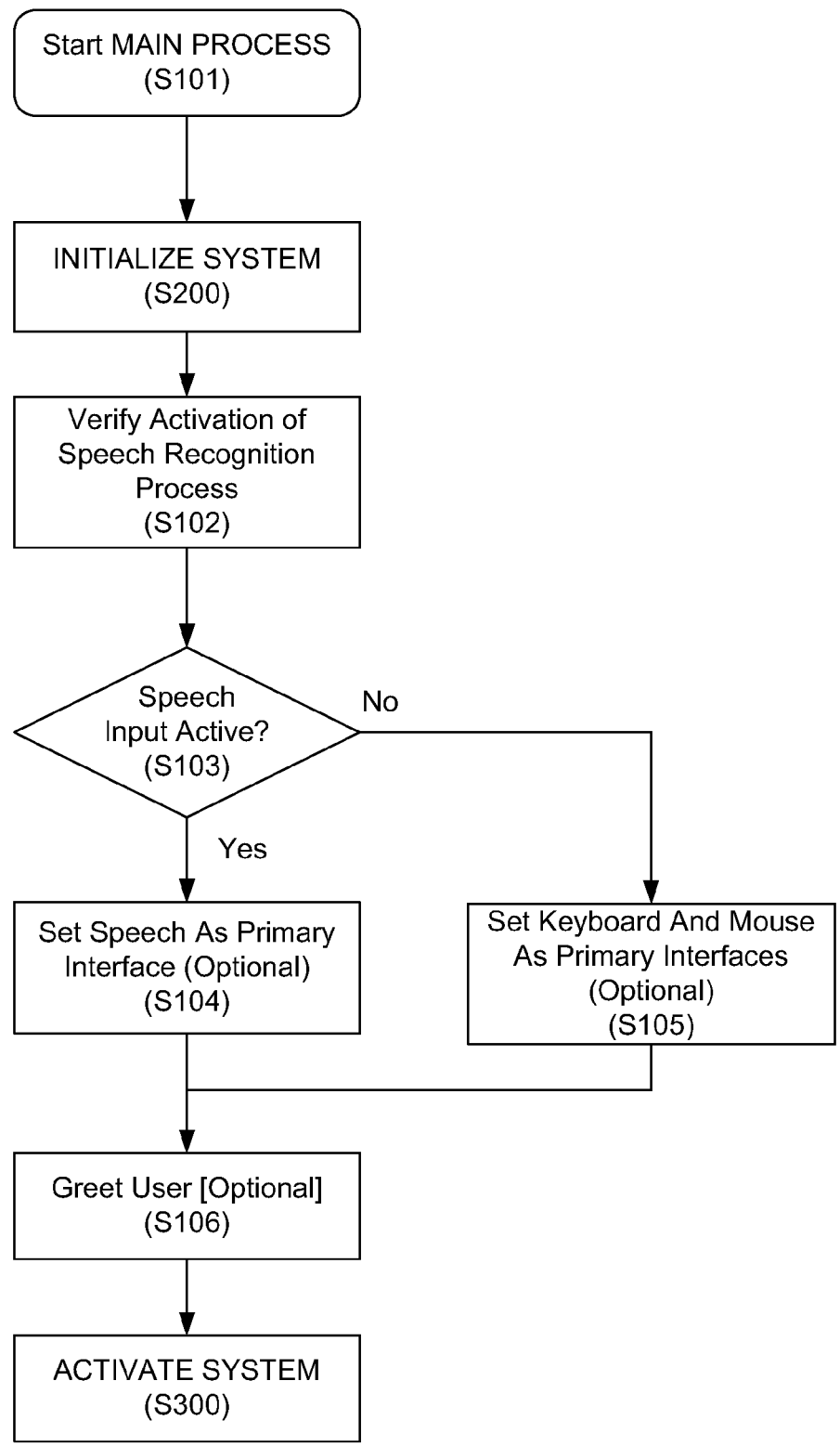
Fig. 1 MAIN PROCESS

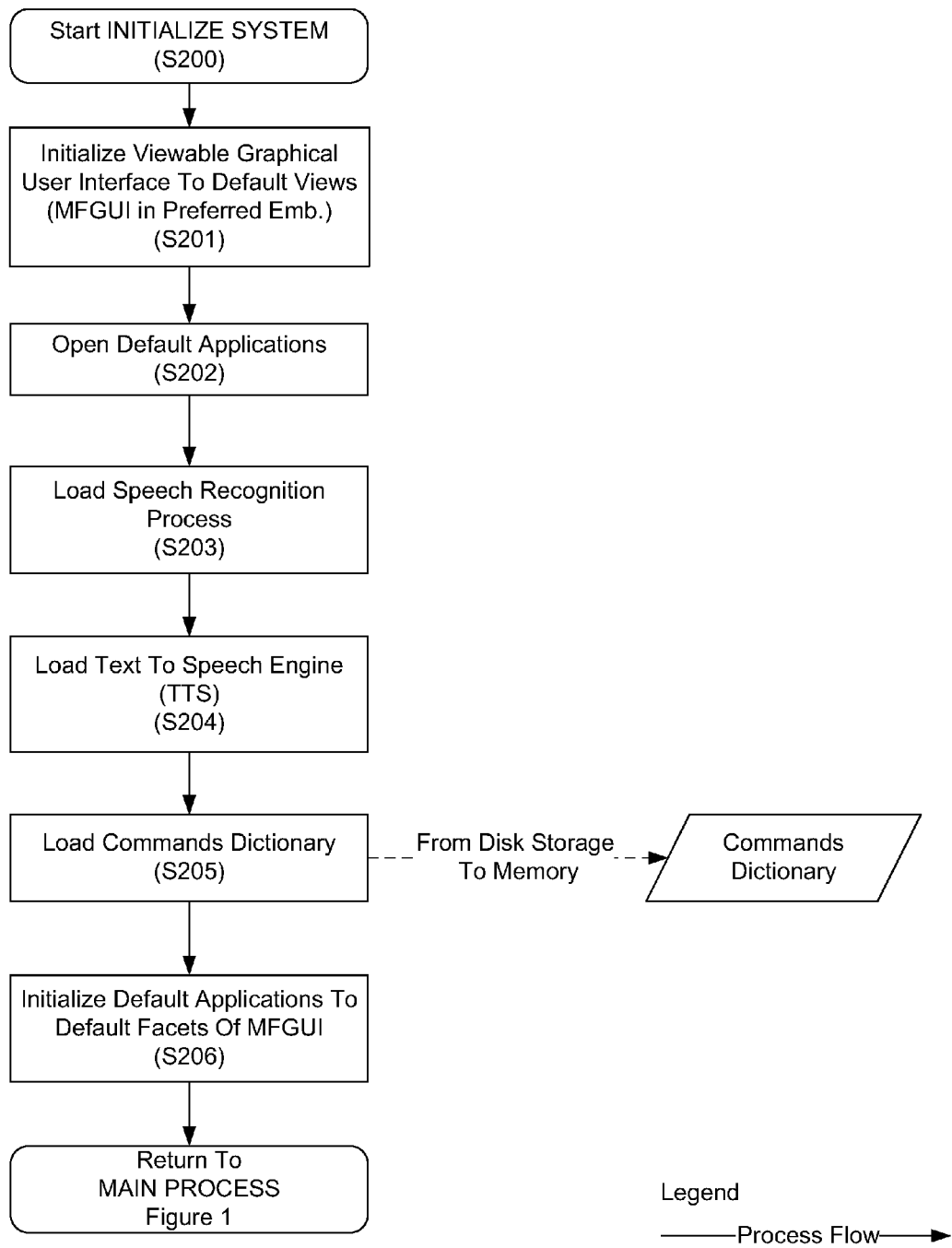
Fig. 2 INITIALIZE SYSTEM

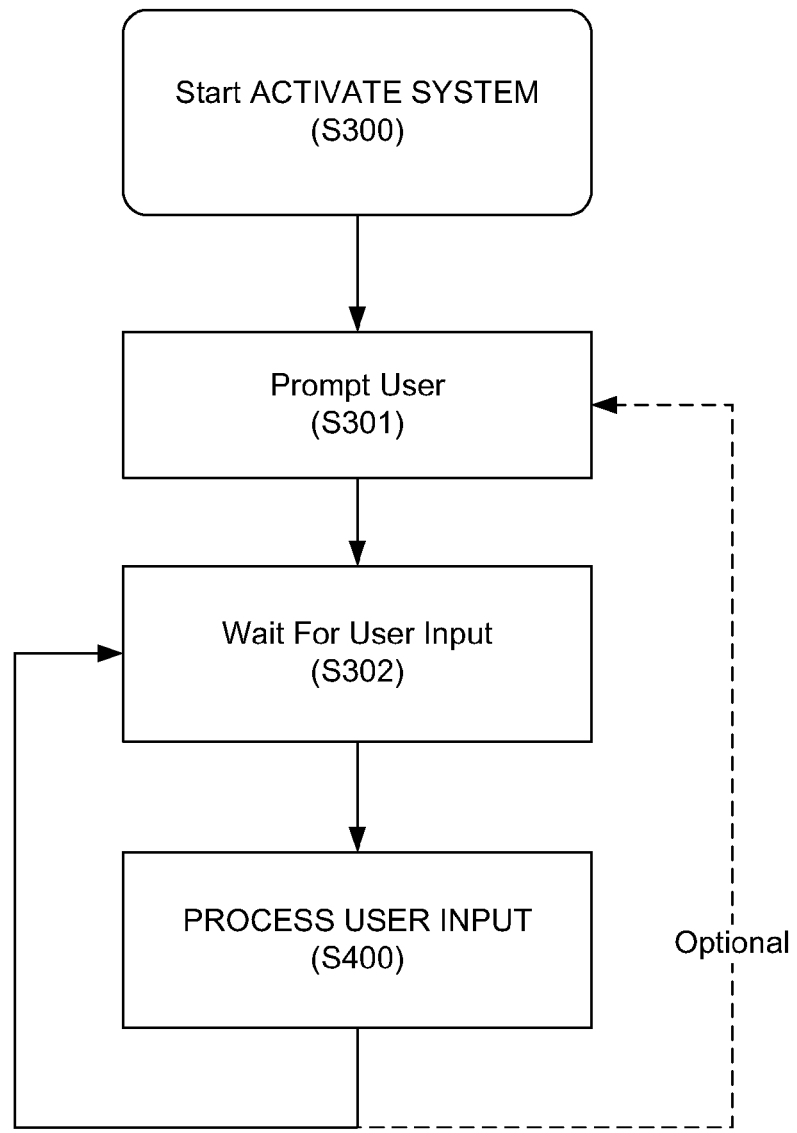
Fig. 3 ACTIVATE SYSTEM

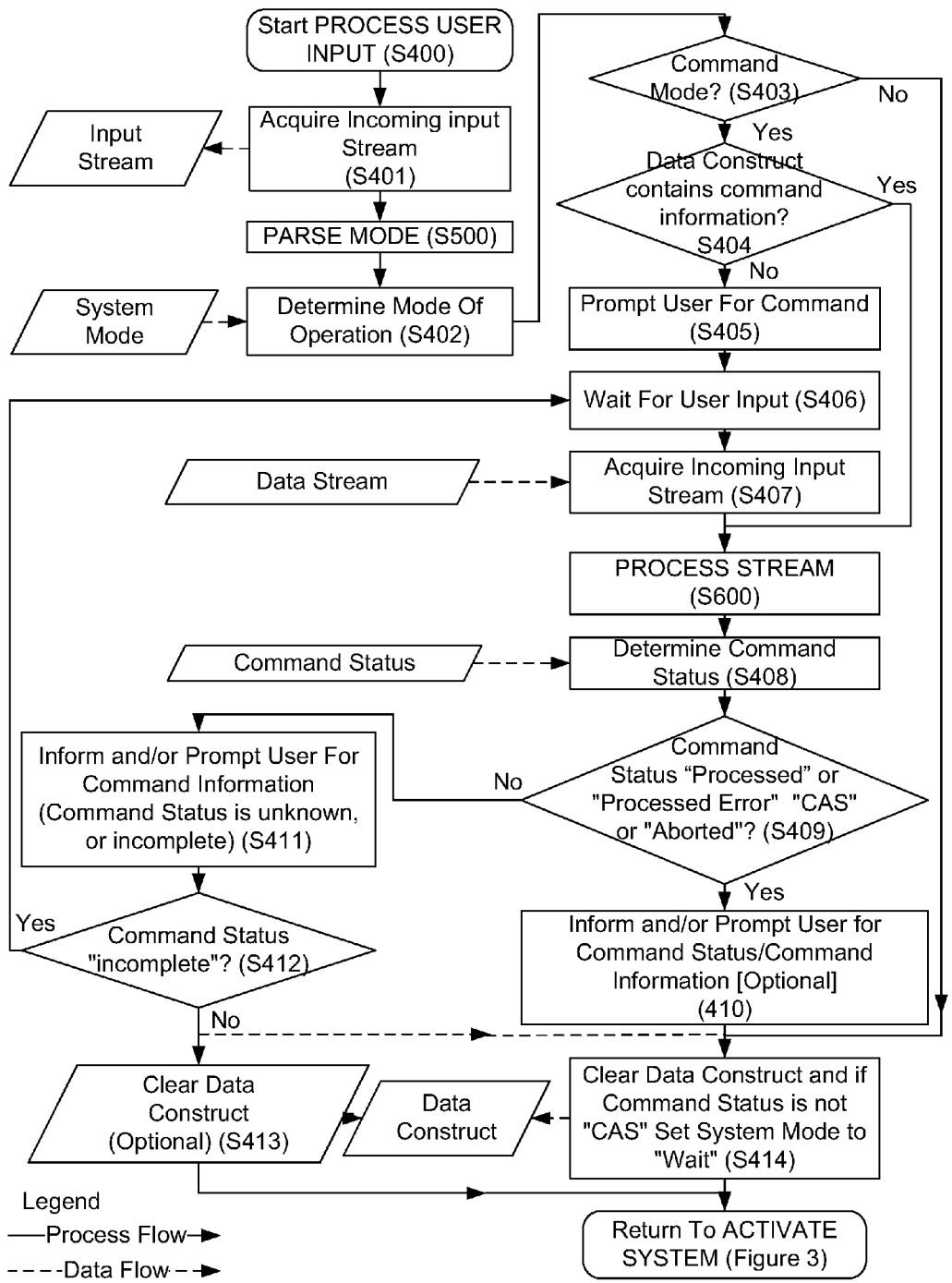
Fig. 4A PROCESS USER INPUT

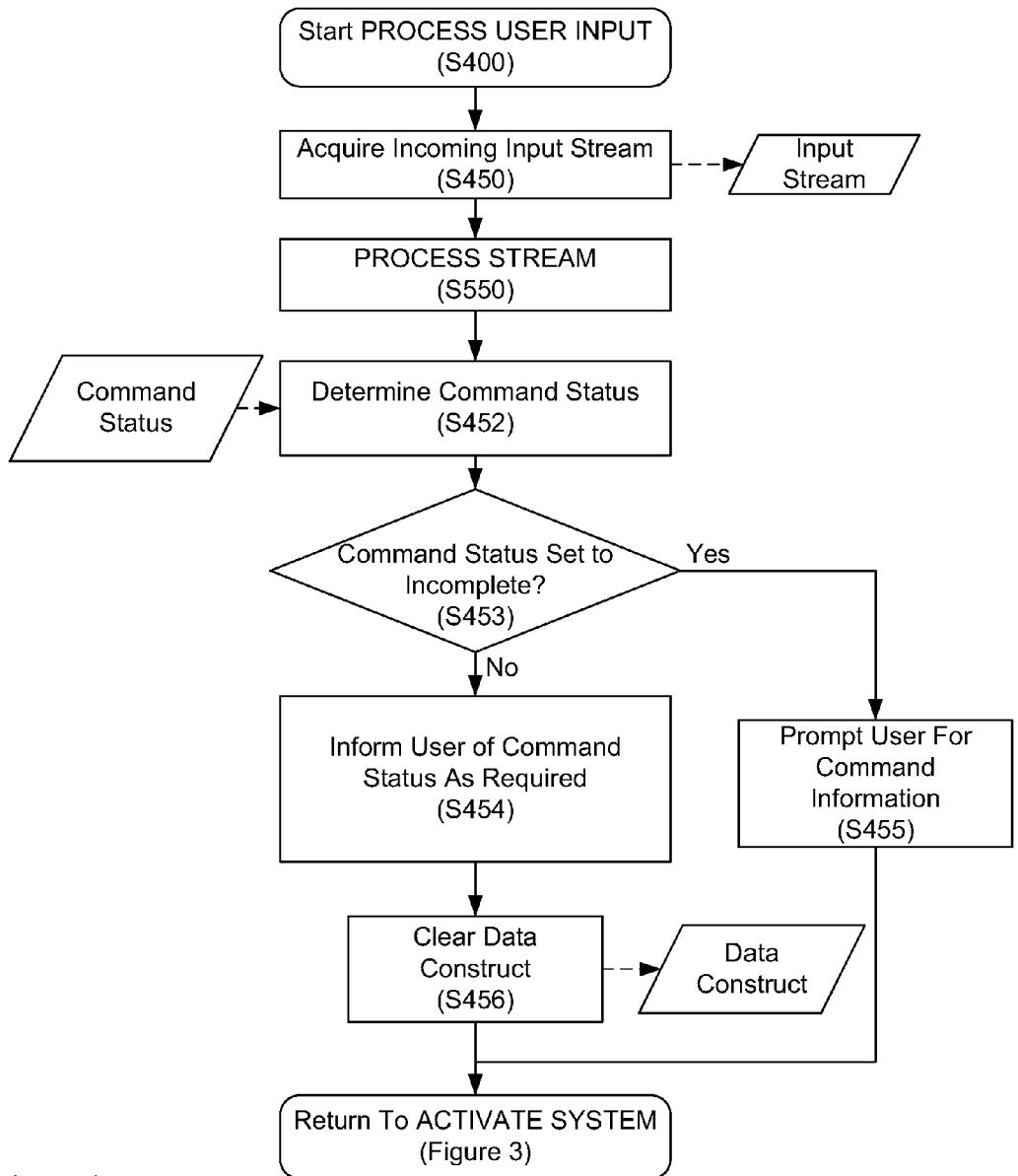
Fig. 4B PROCESS USER INPUT

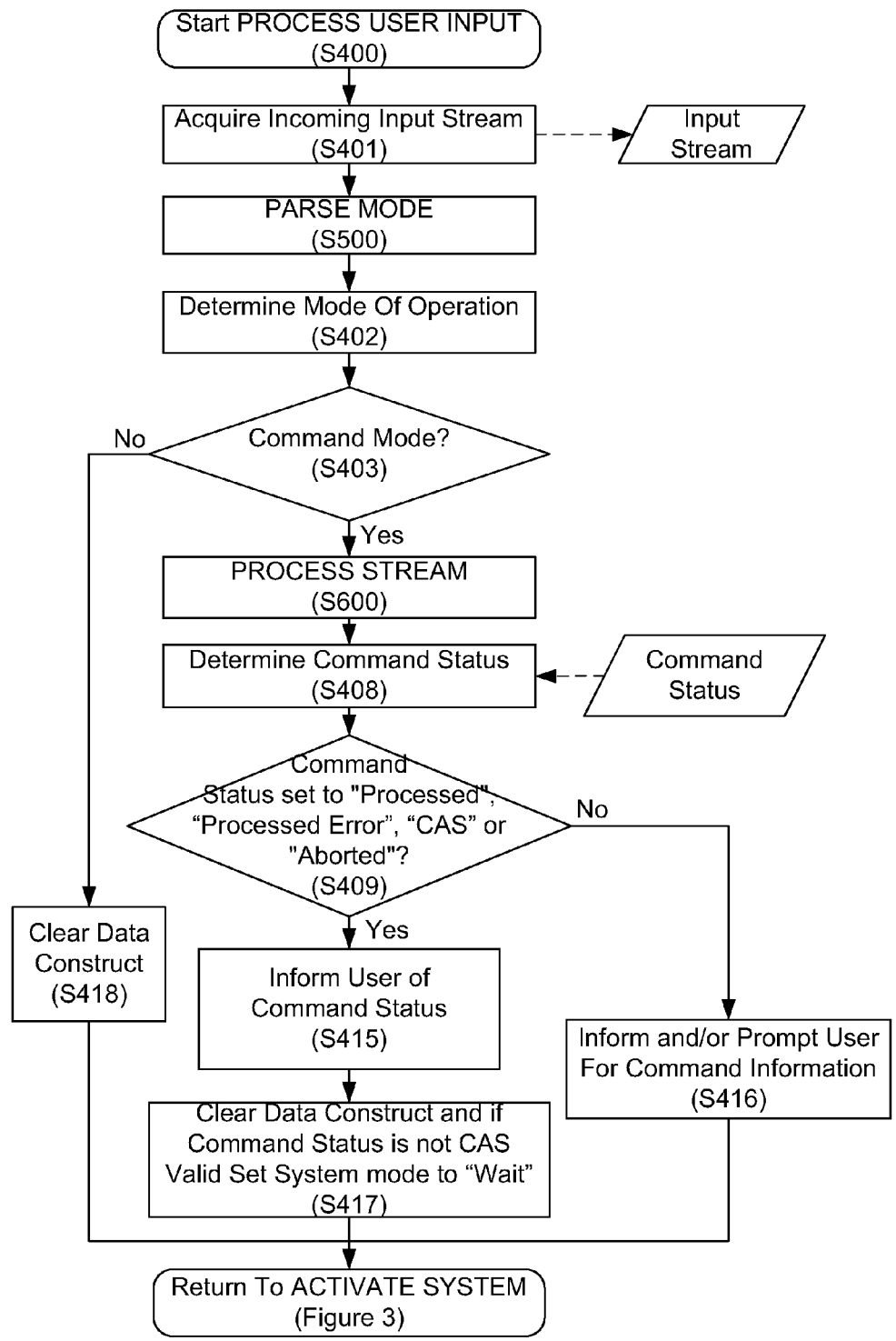
Fig. 4C PROCESS USER INPUT

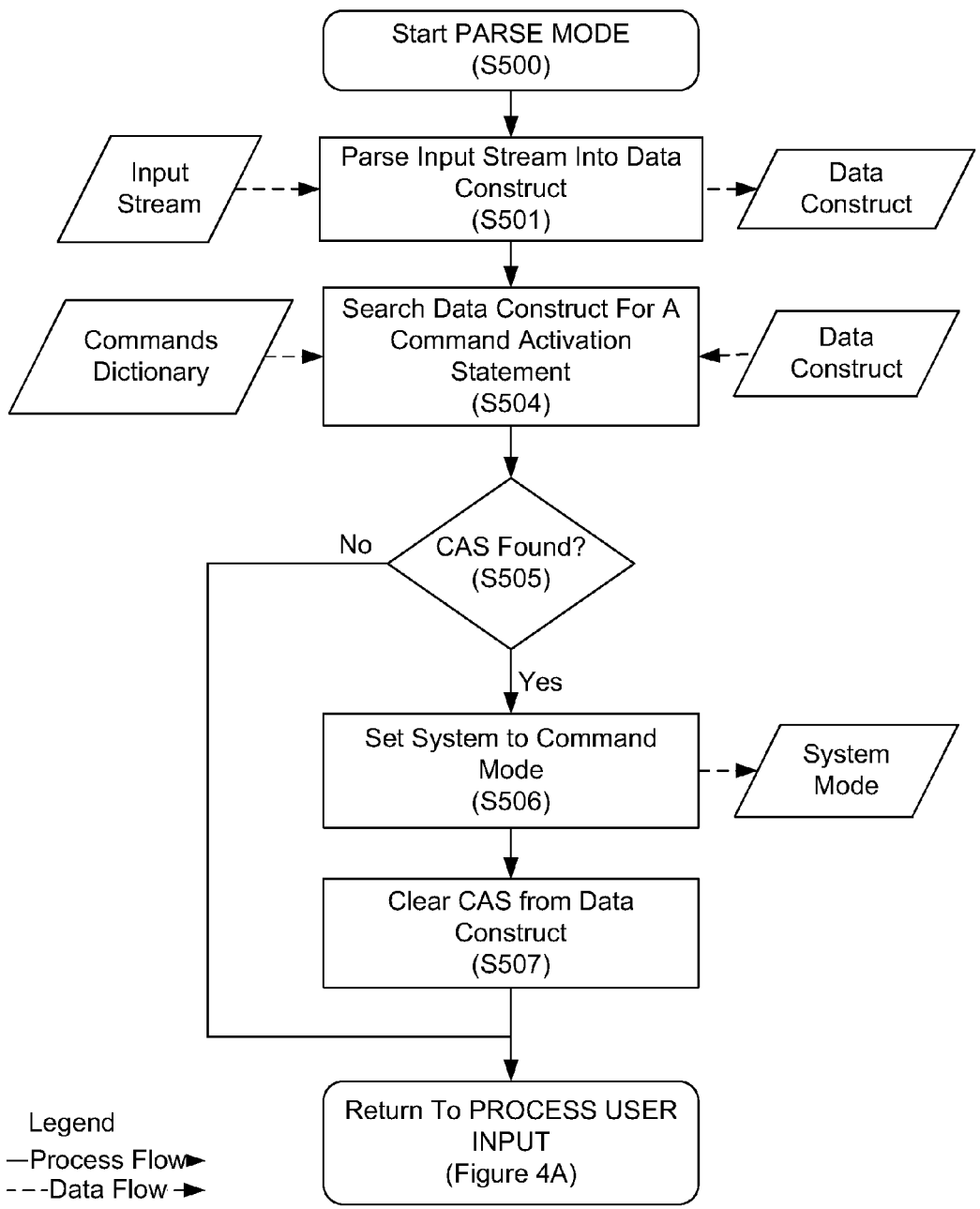
Fig. 5A PARSE MODE

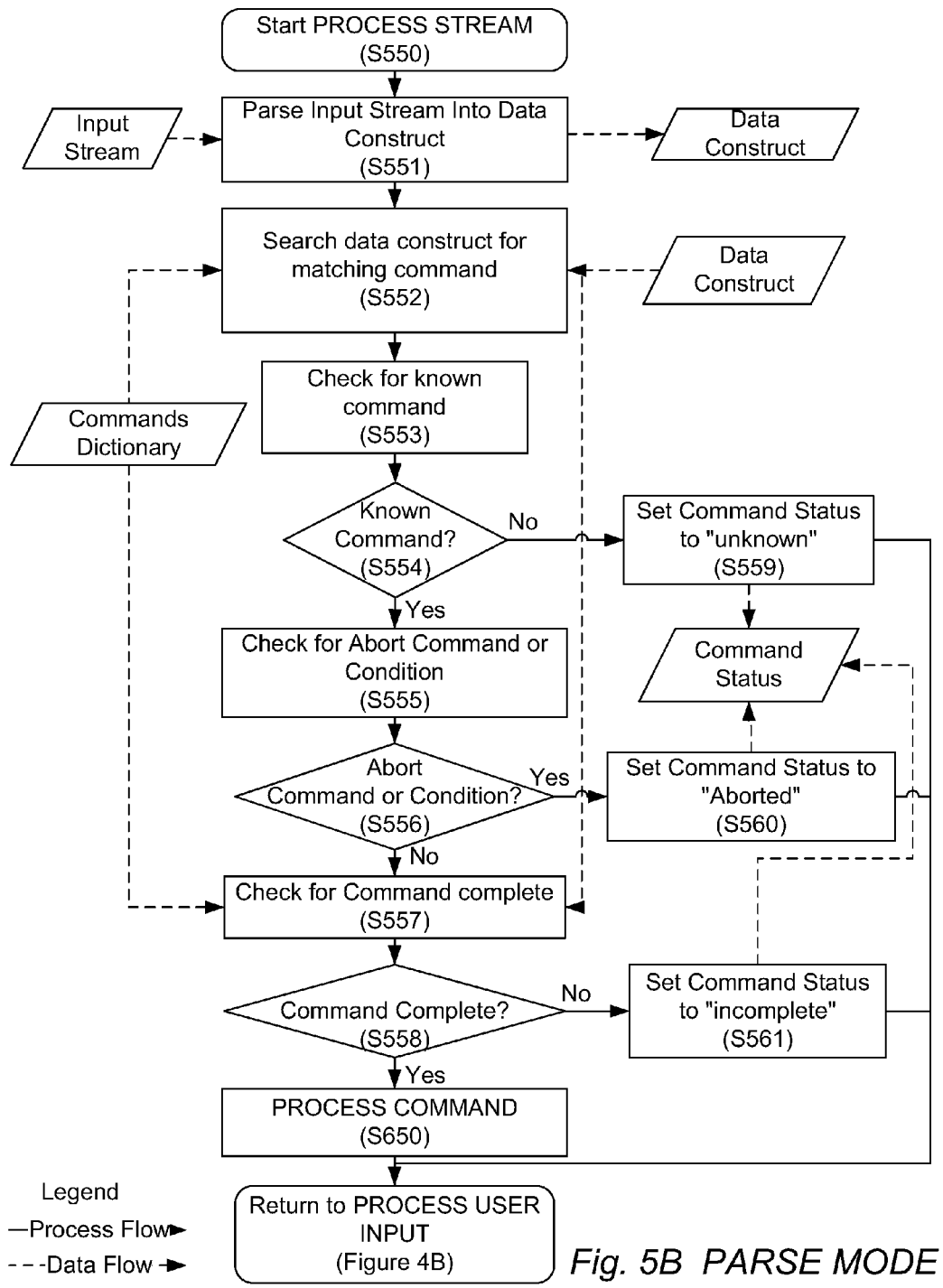
Fig. 5B PARSE MODE

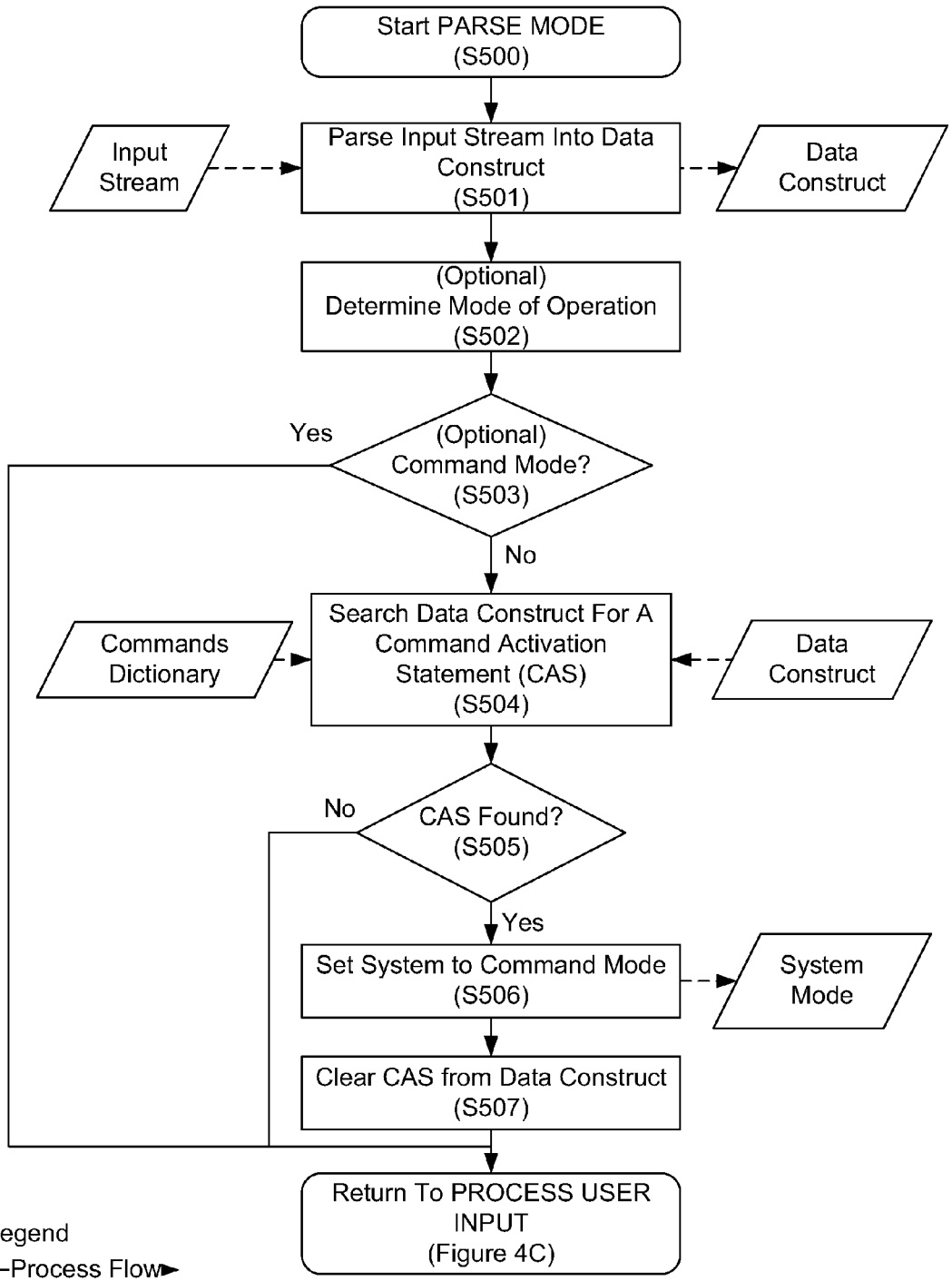

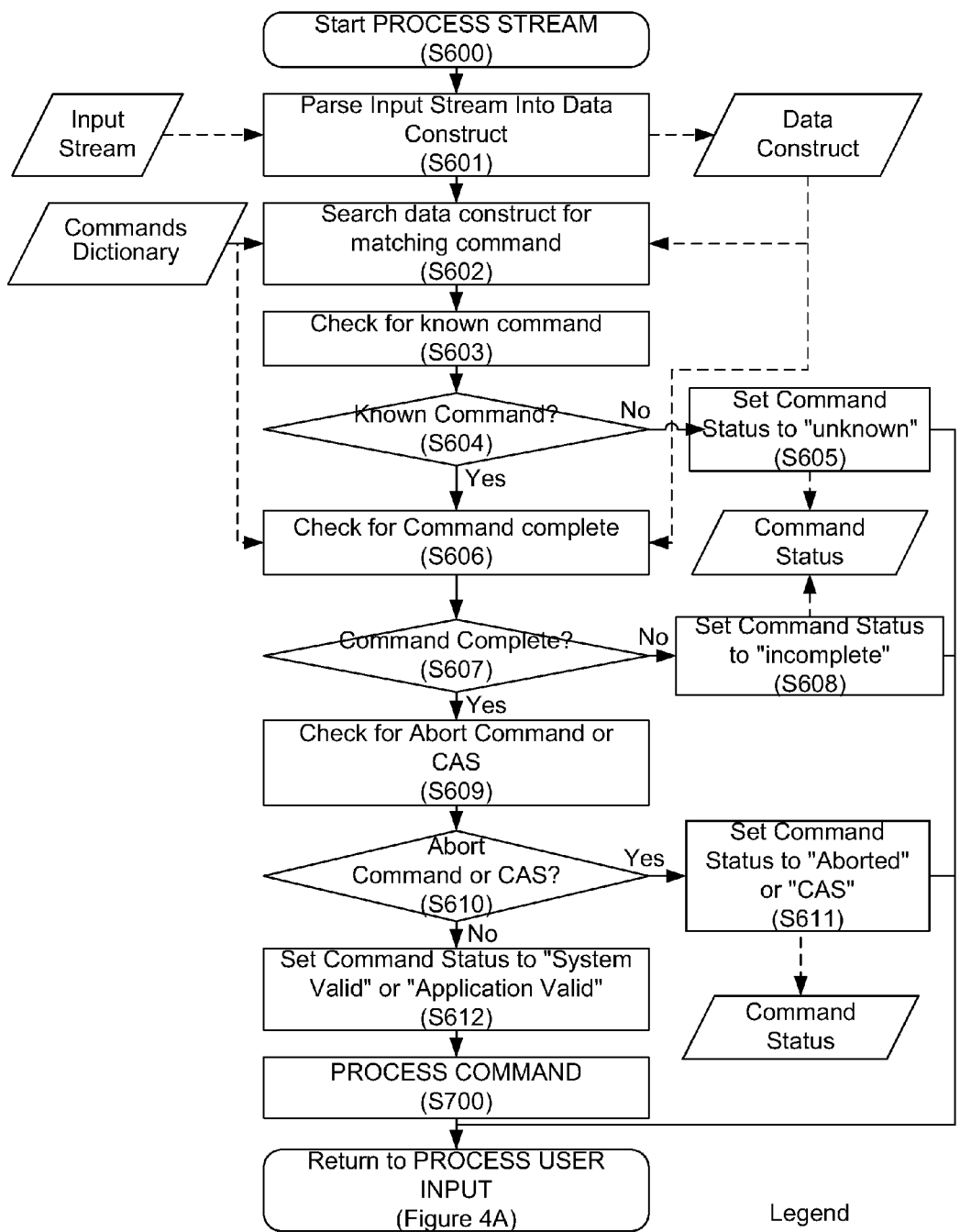
Fig. 6A PROCESS STREAM

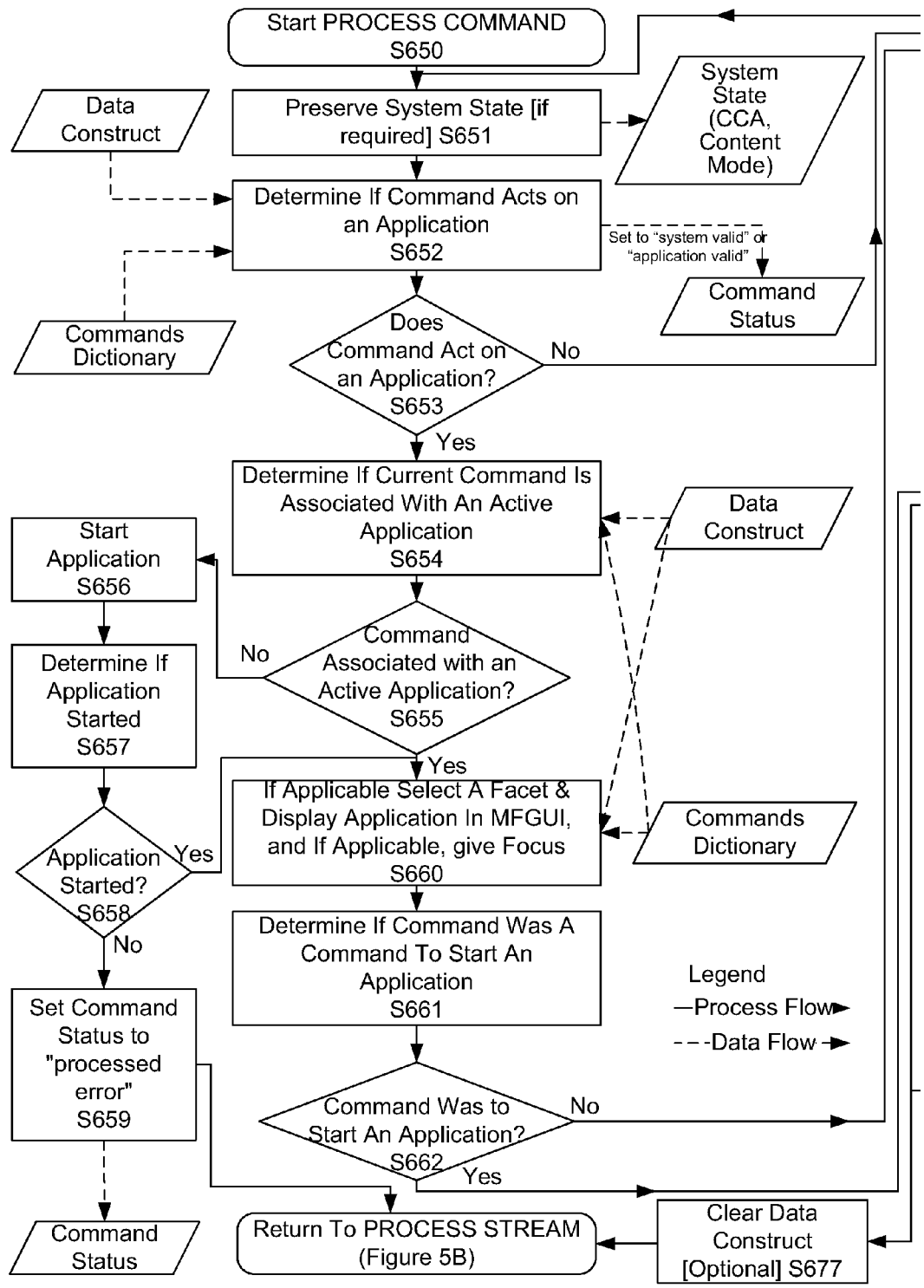
Fig. 6B PROCESS COMMAND

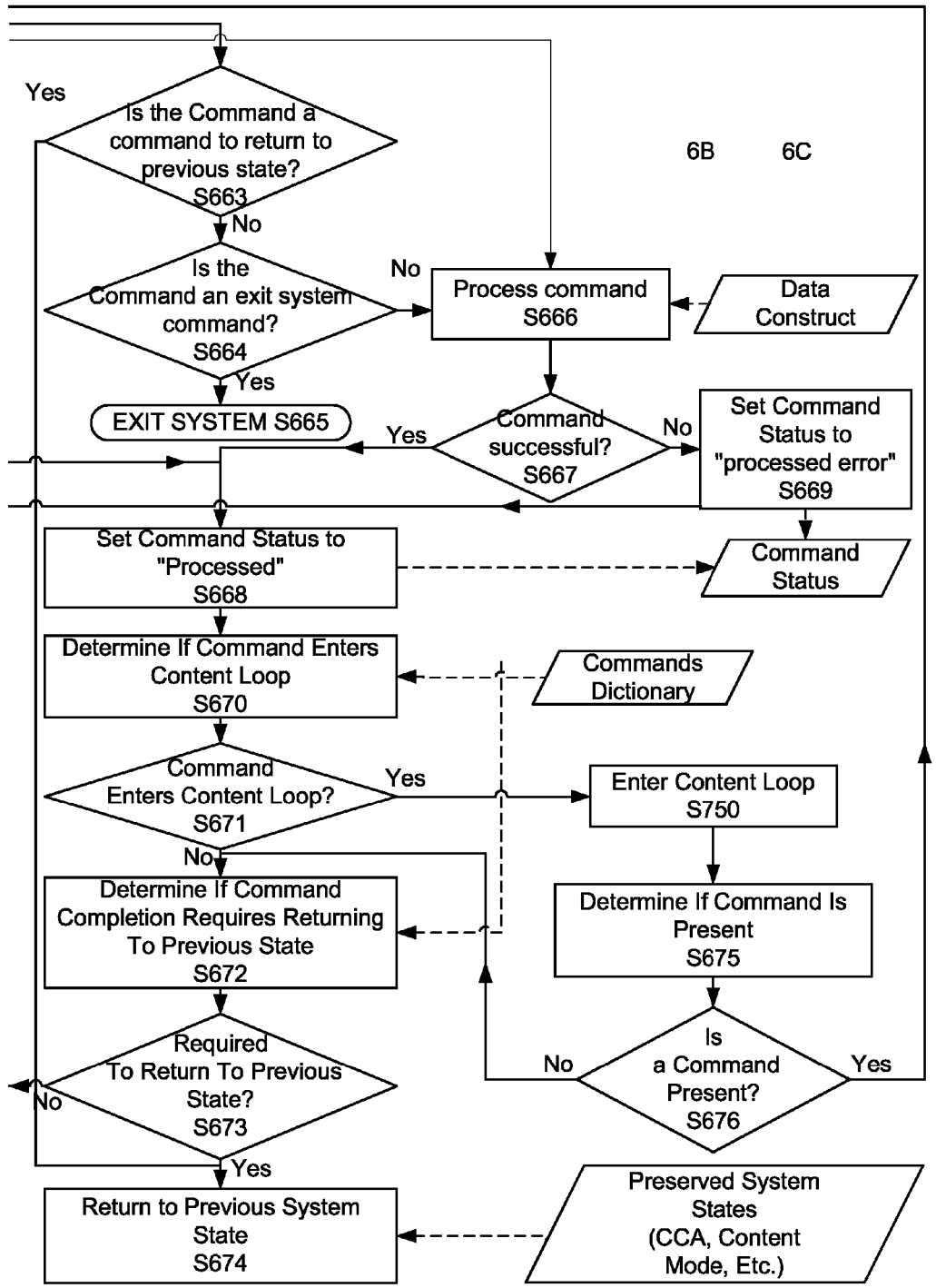
Fig. 6C PROCESS COMMAND

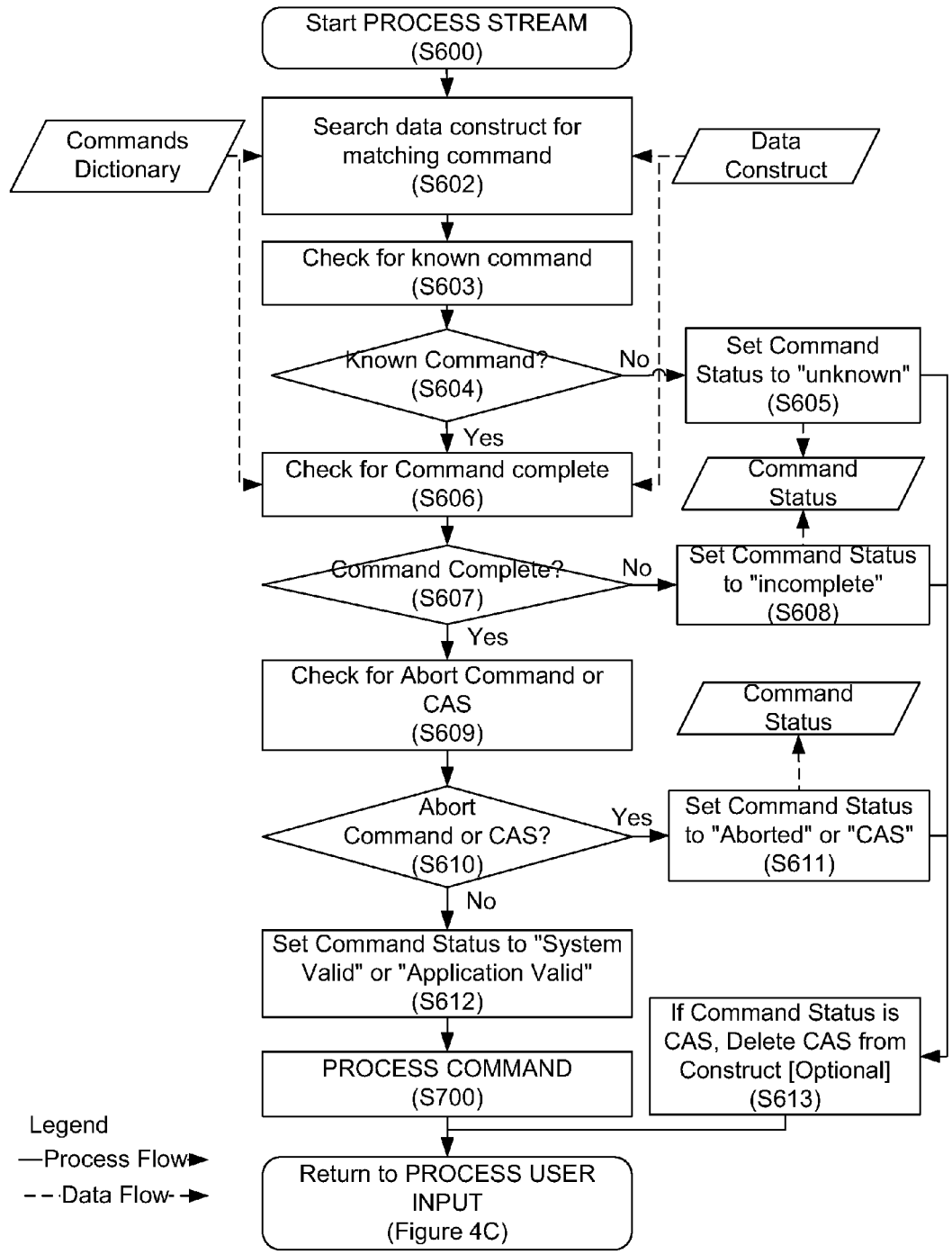
Fig. 6D PROCESS STREAM

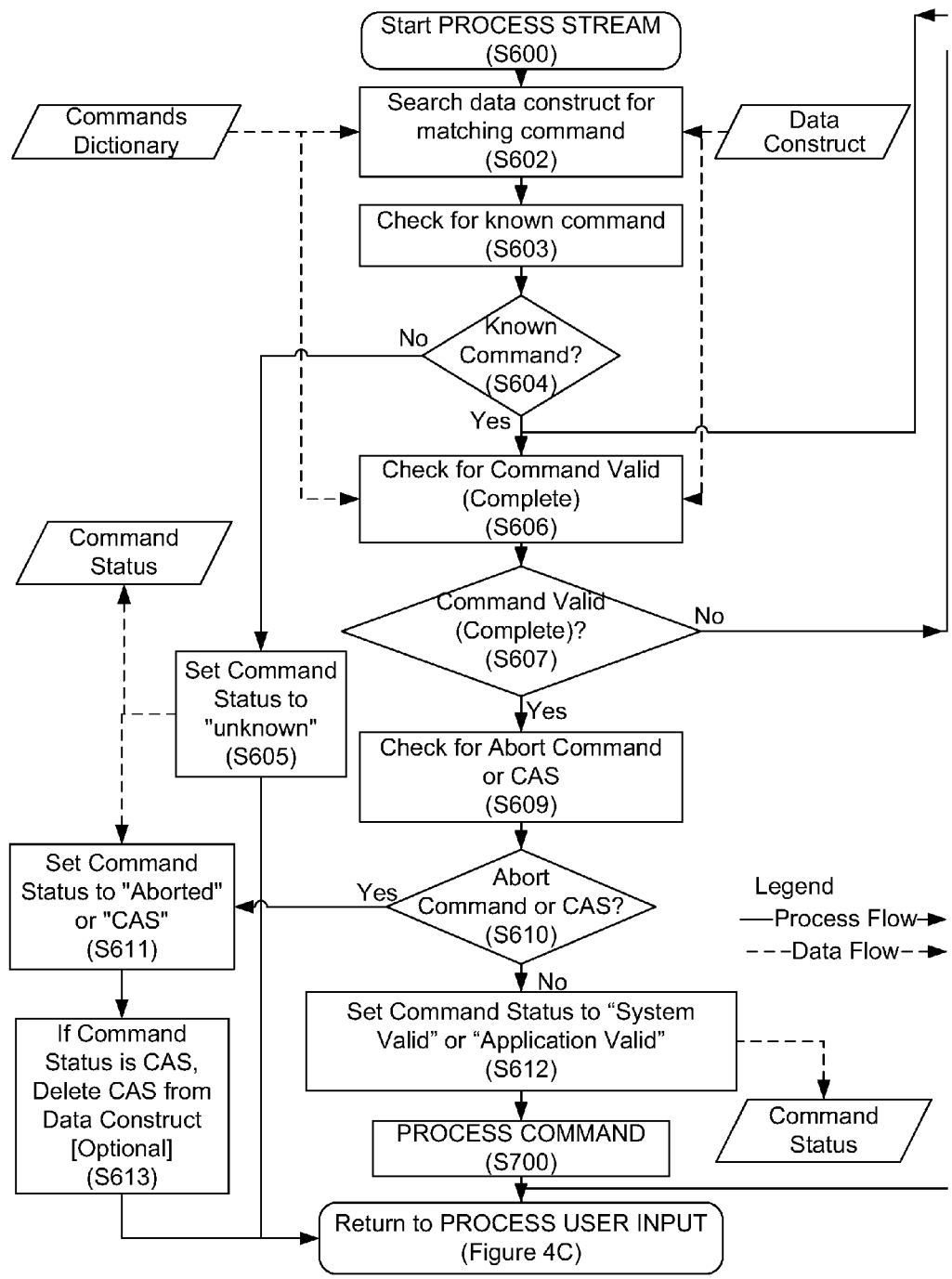
Fig. 6E PROCESS STREAM

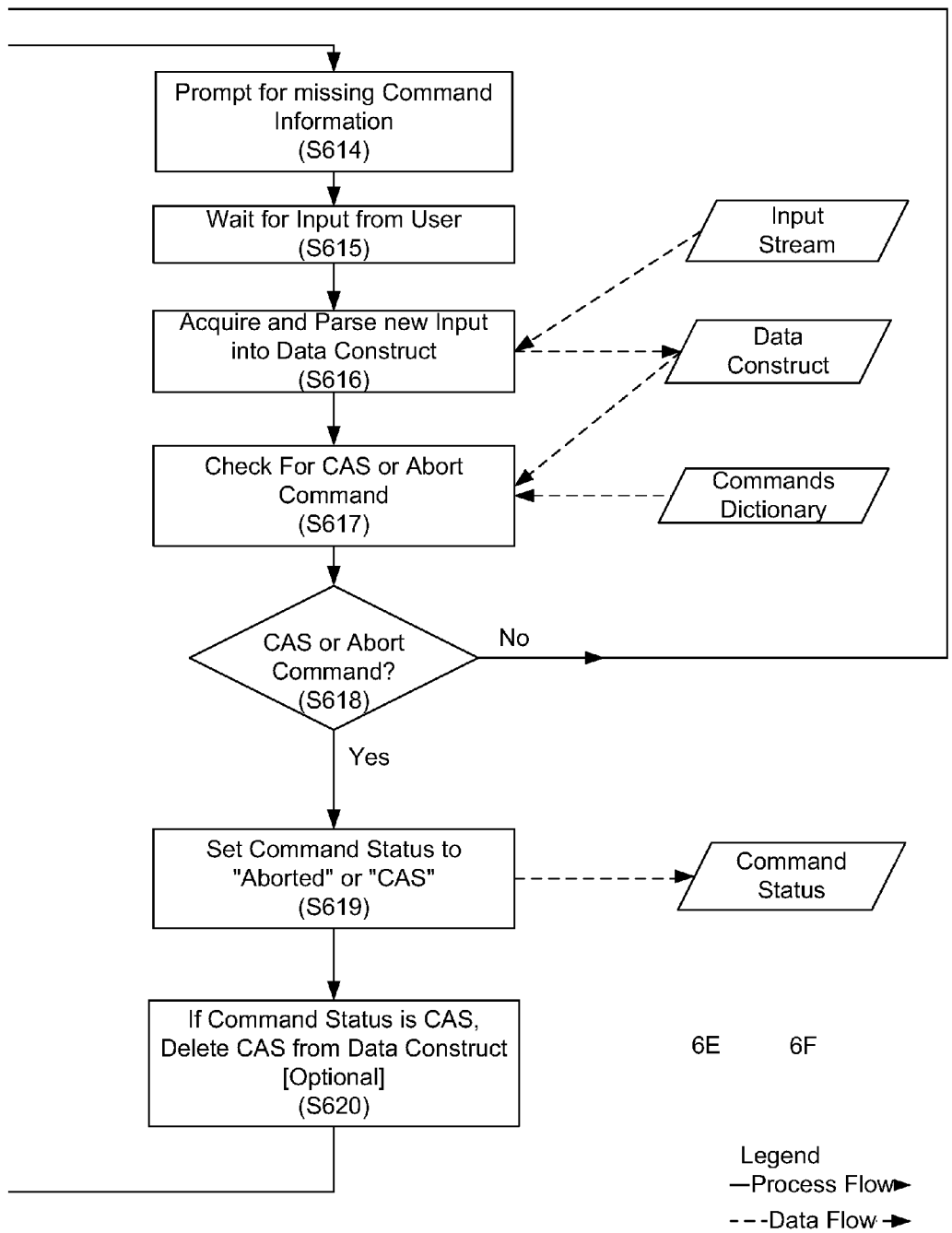
Fig. 6F PROCESS STREAM

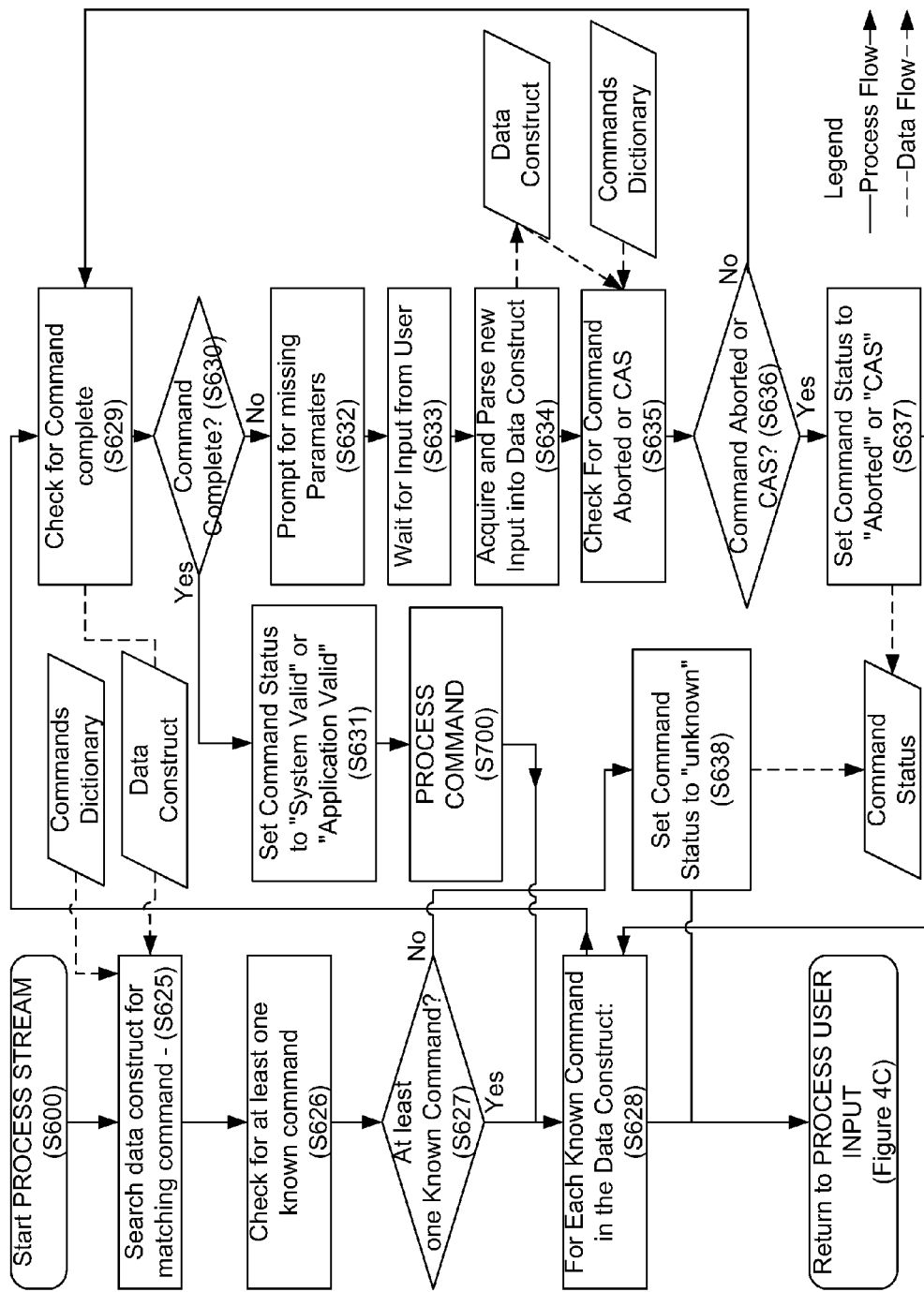
Fig. 6G PROCESS STREAM

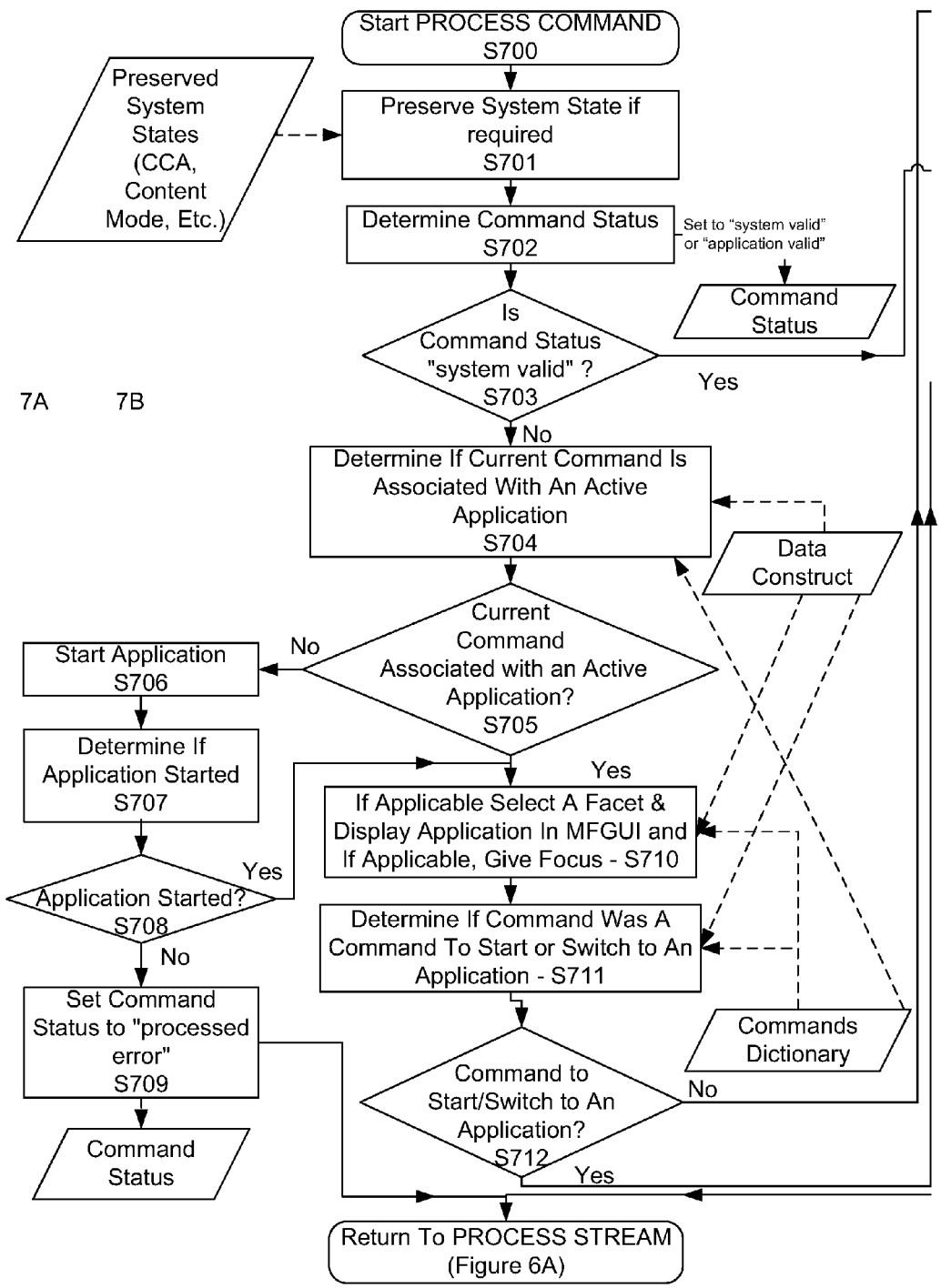
Fig. 7A PROCESS COMMAND

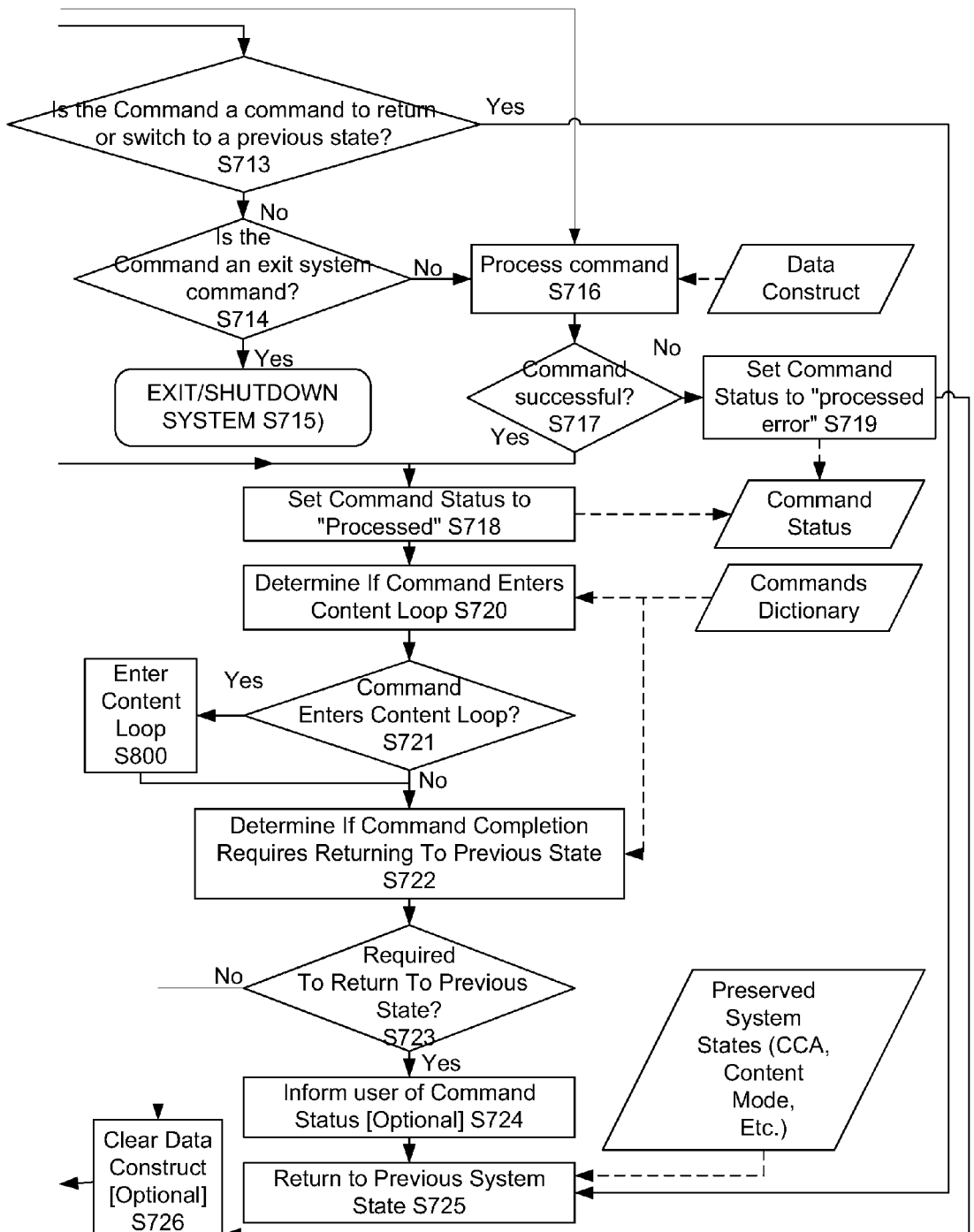
Fig. 7B PROCESS COMMAND

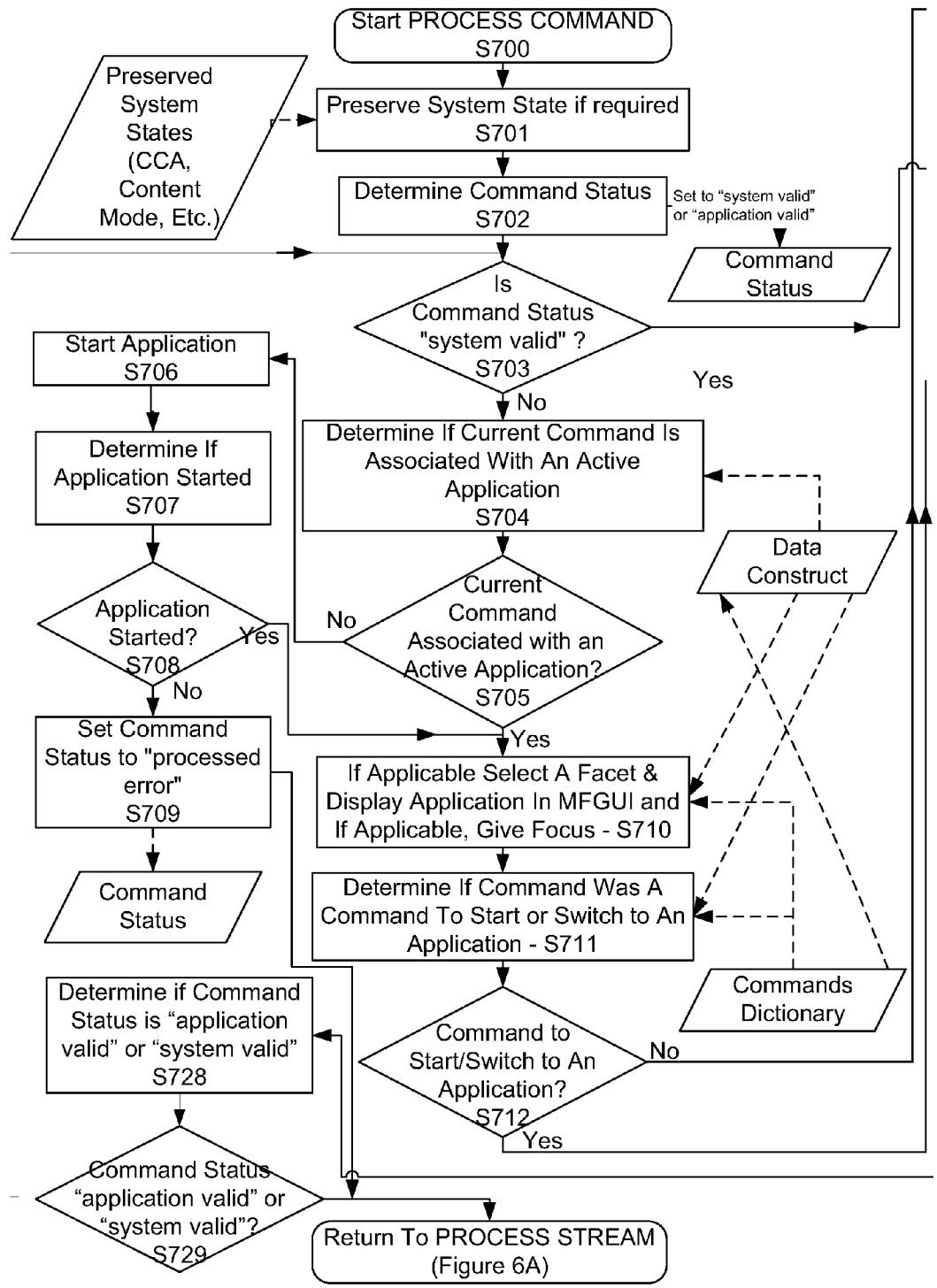
Fig. 7E PROCESS COMMAND

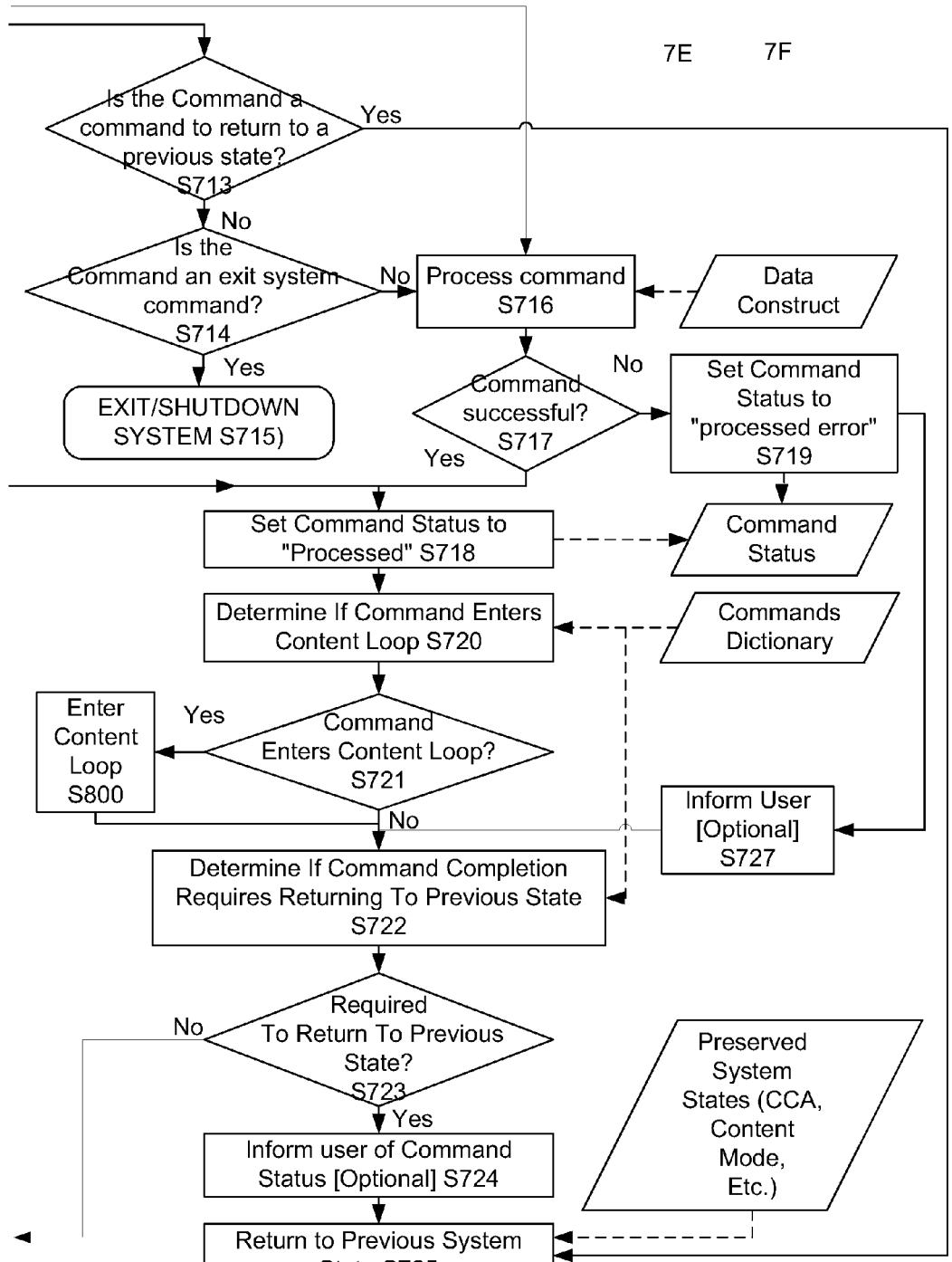
Fig. 7F PROCESS COMMAND

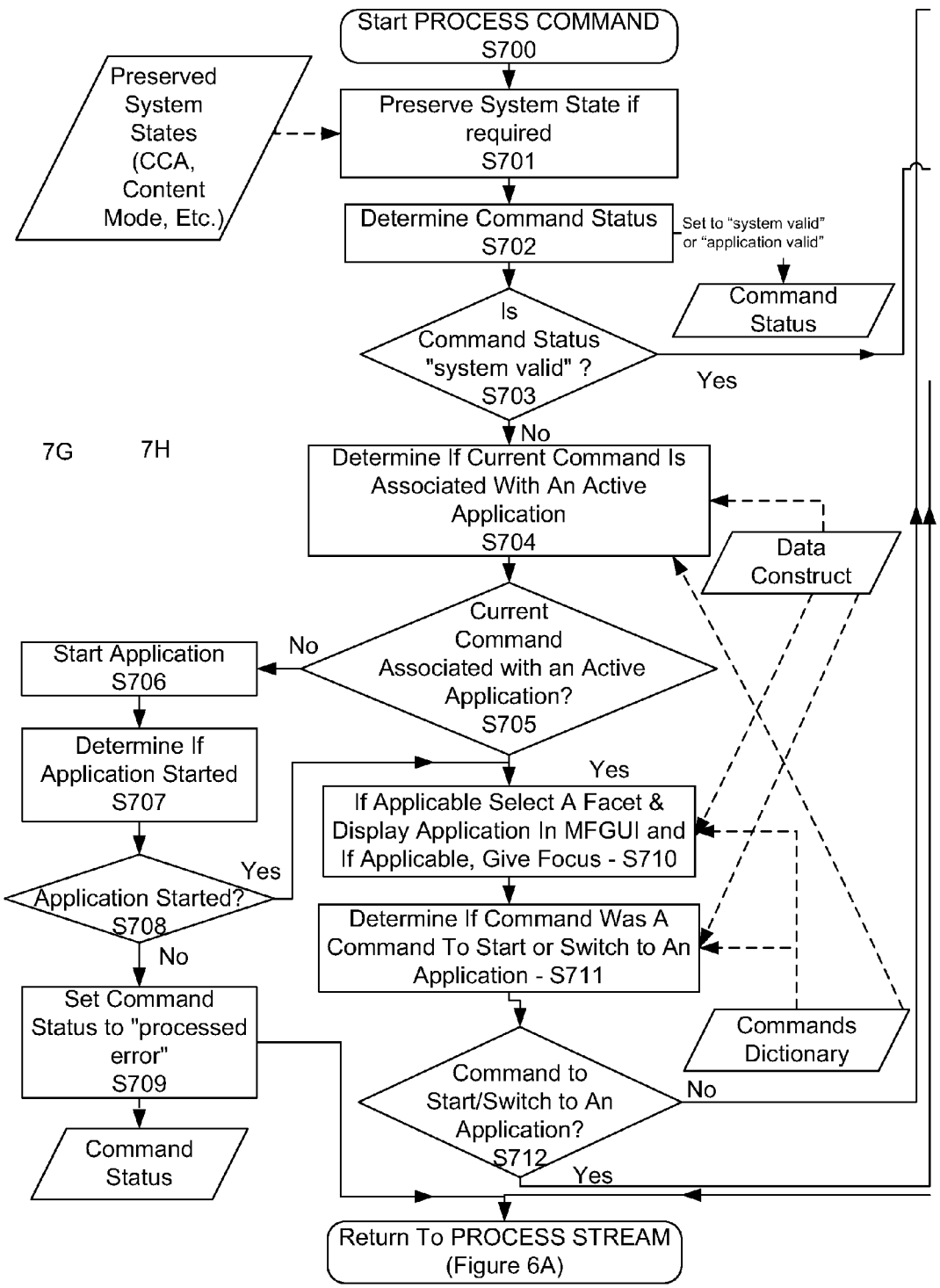
Fig. 7G PROCESS COMMAND ENABLED FOR RECURSIVITY

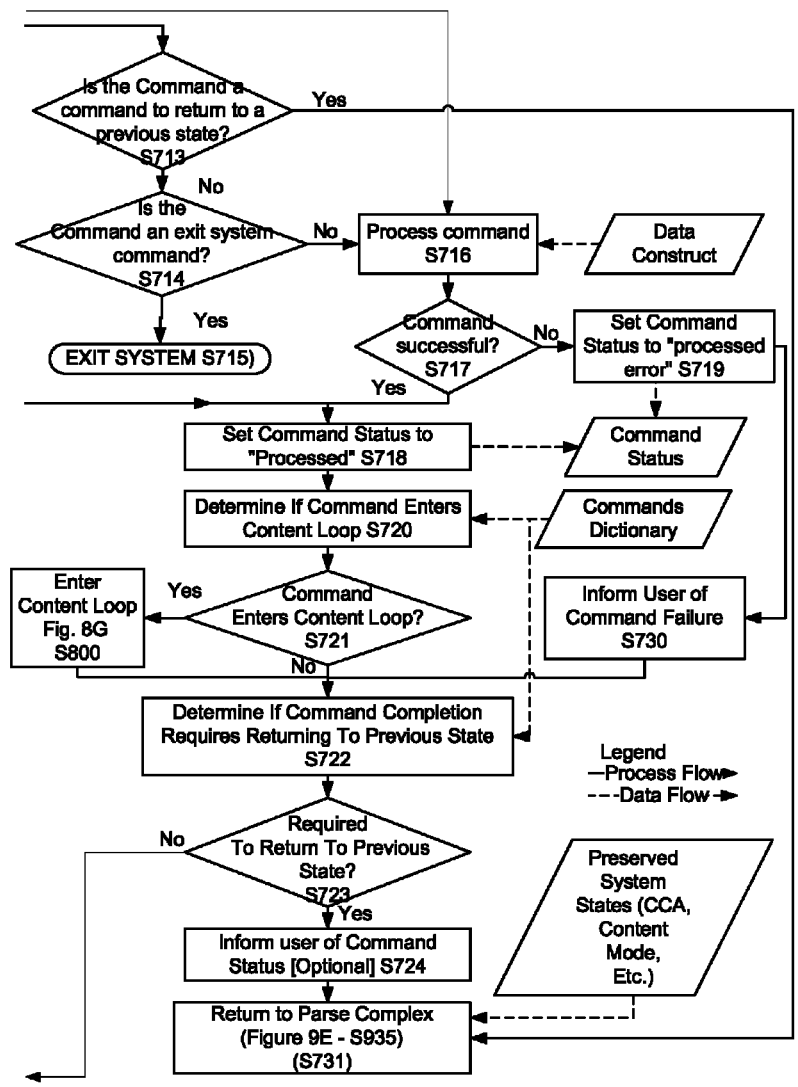
Fig. 7H PROCESS COMMAND ENABLED FOR RECURSIVITY

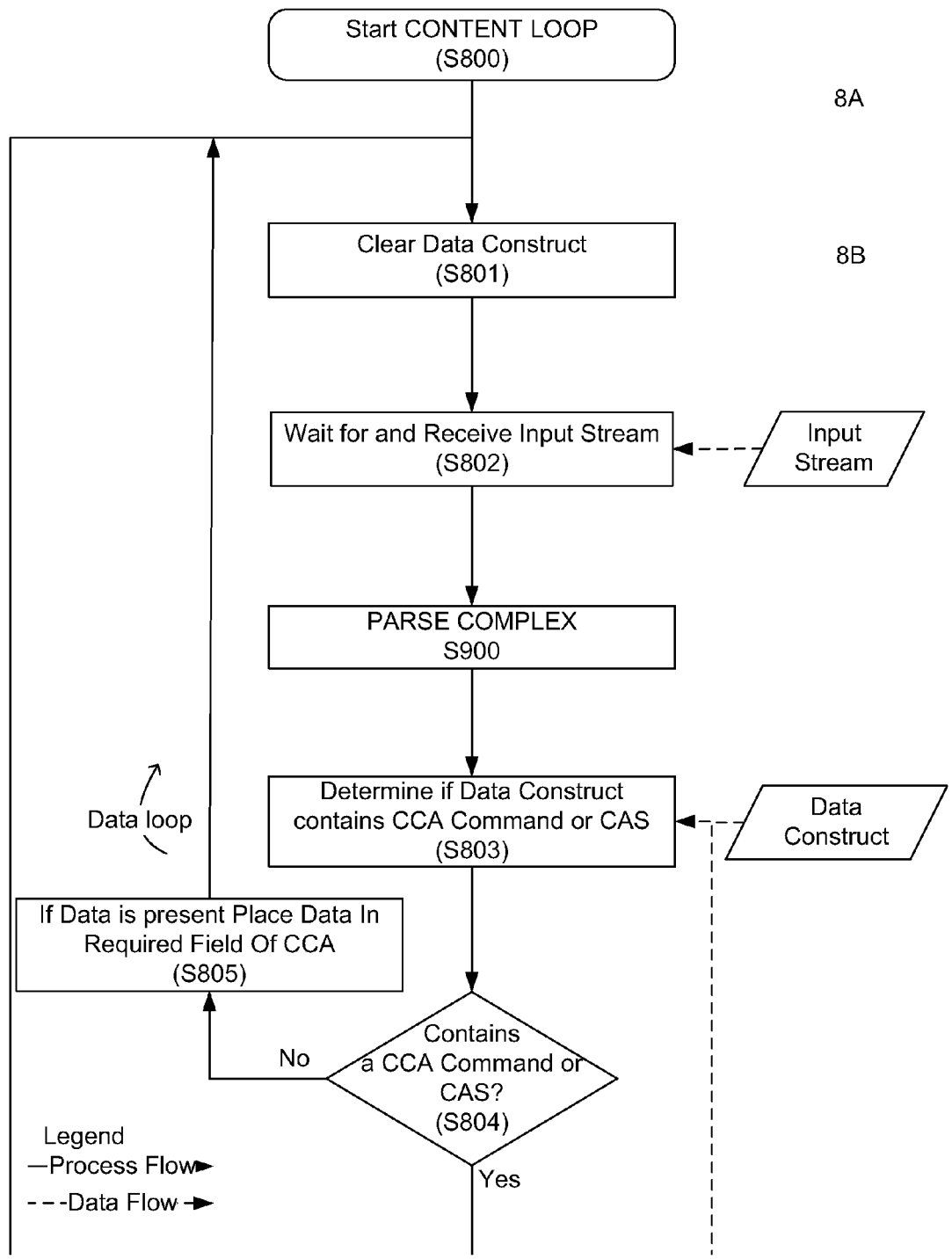
Fig. 8A CONTENT LOOP

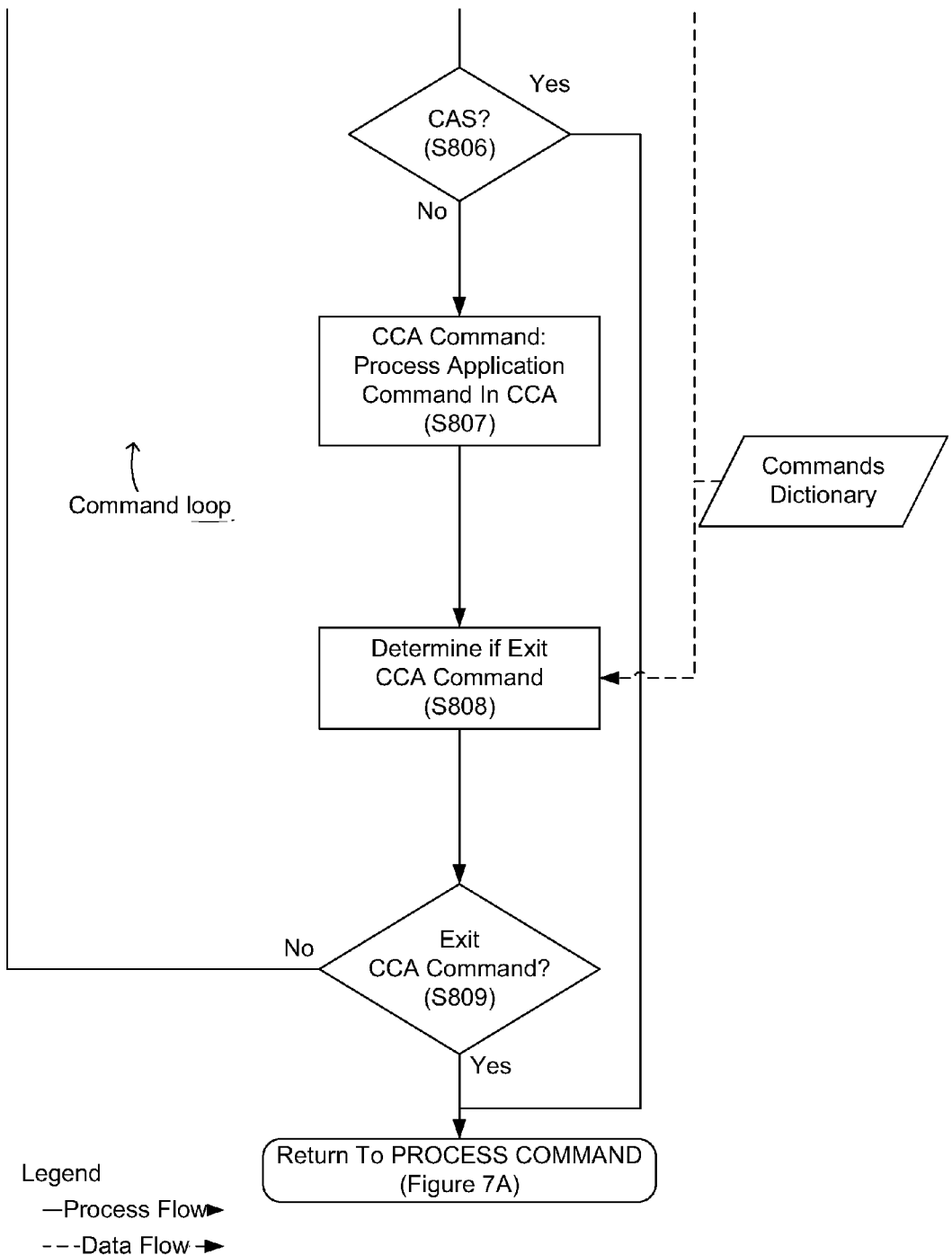
Fig. 8B CONTENT LOOP

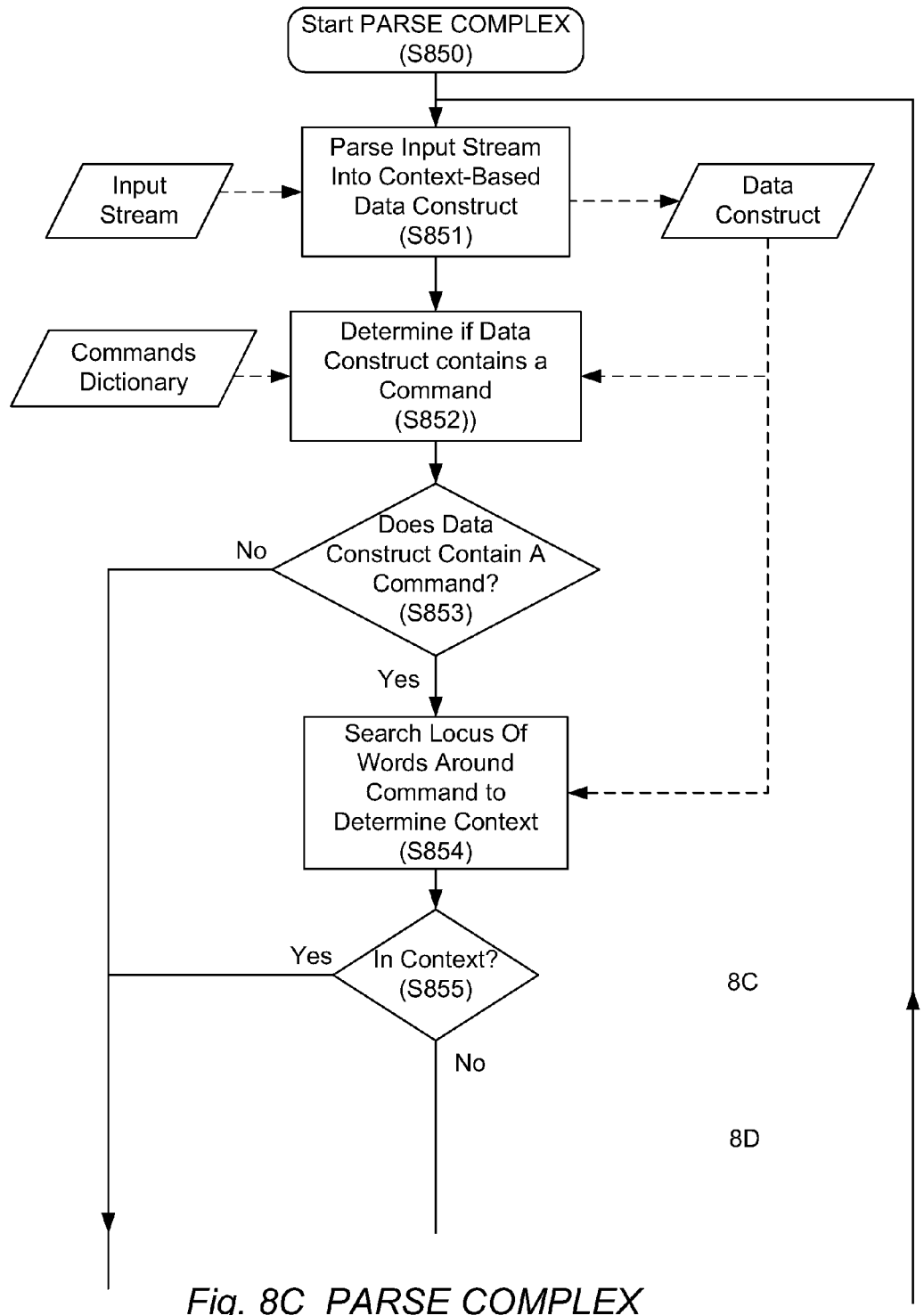
Fig. 8C PARSE COMPLEX

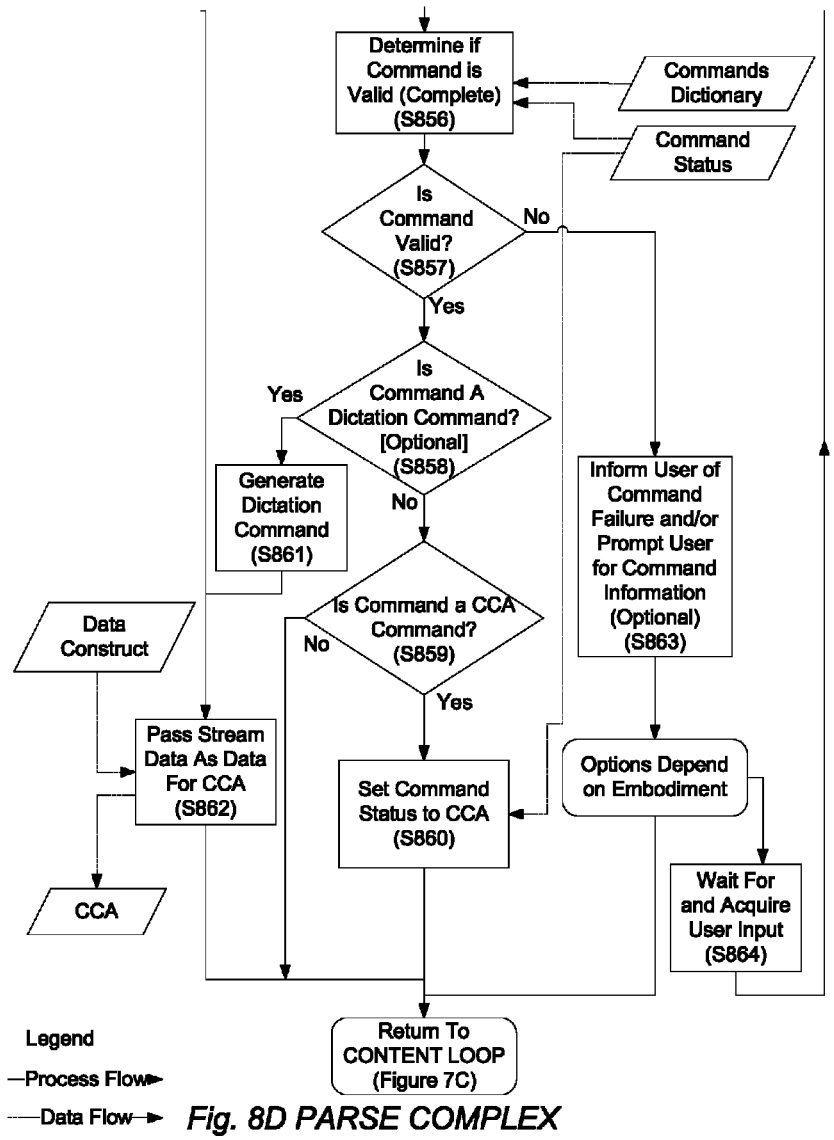

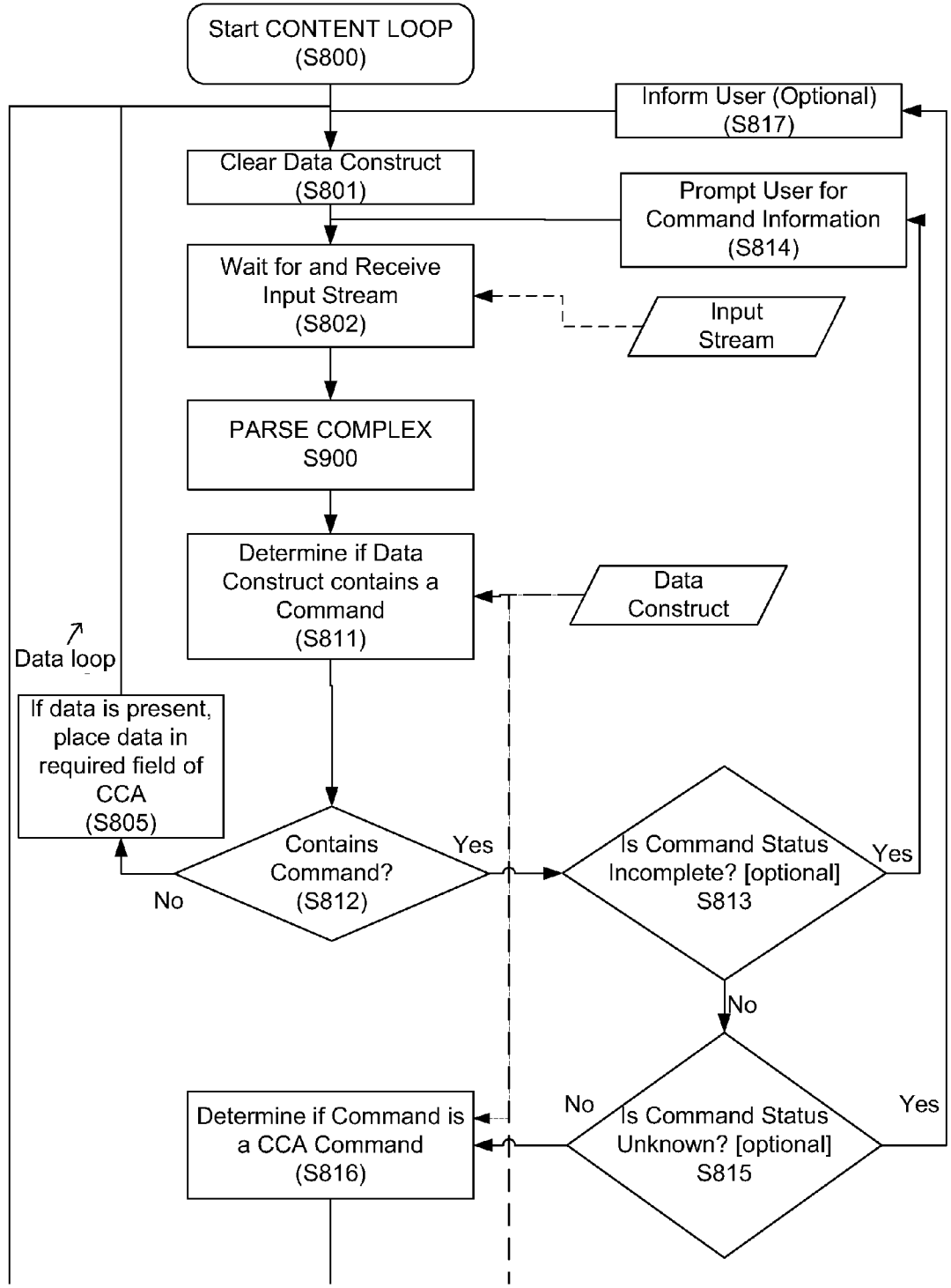
Fig. 8E CONTENT LOOP

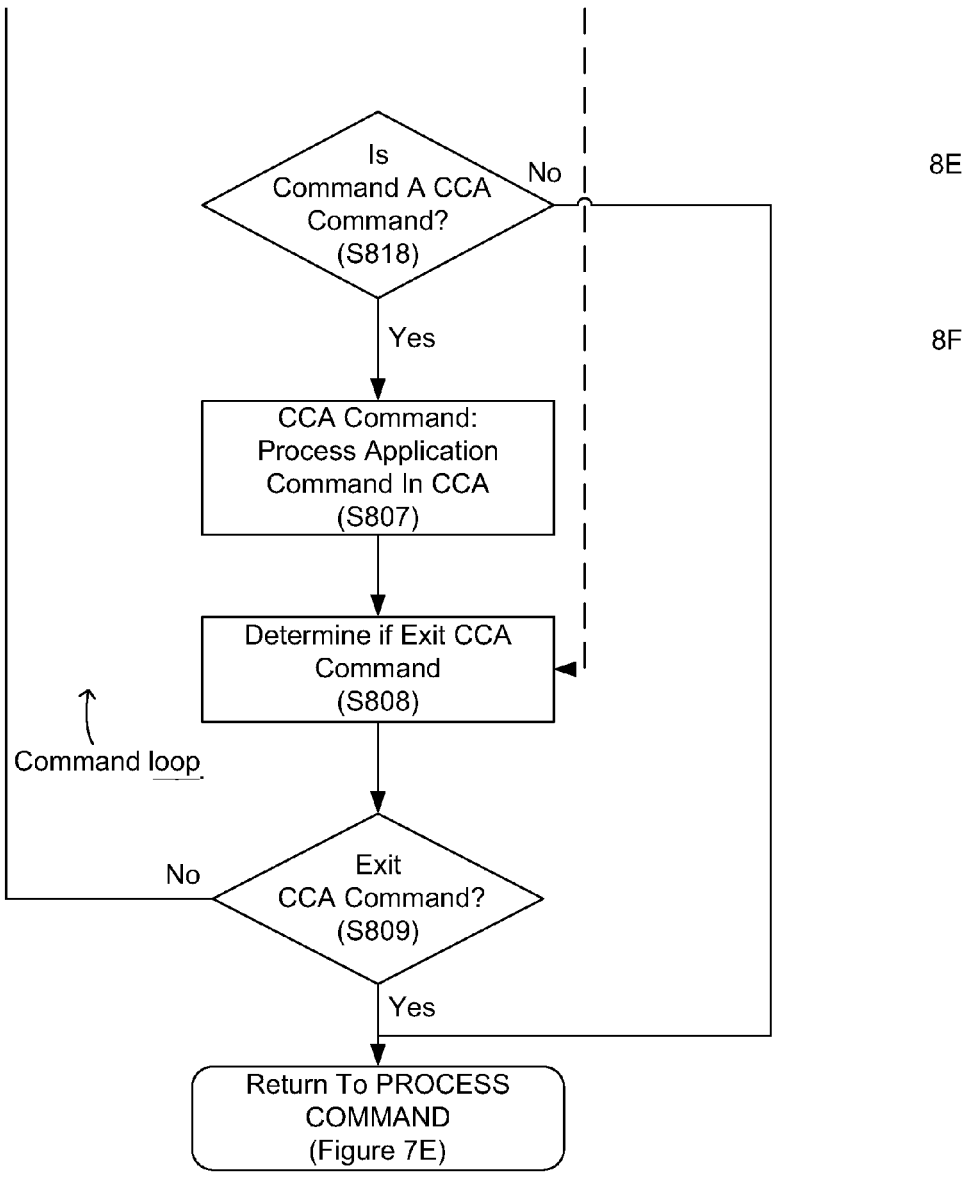
Fig. 8F CONTENT LOOP

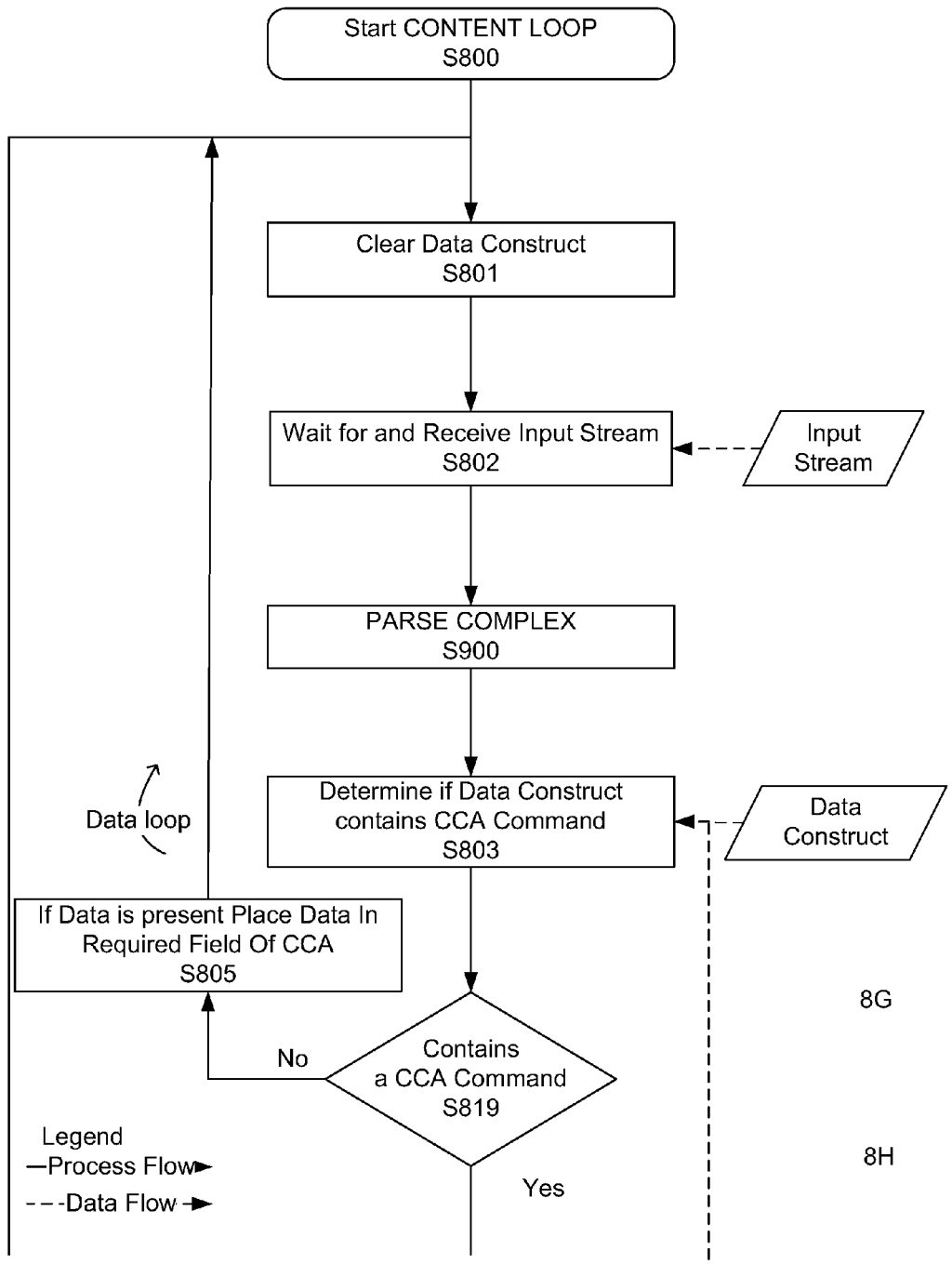
Fig. 8G CONTENT LOOP RECURSIVE

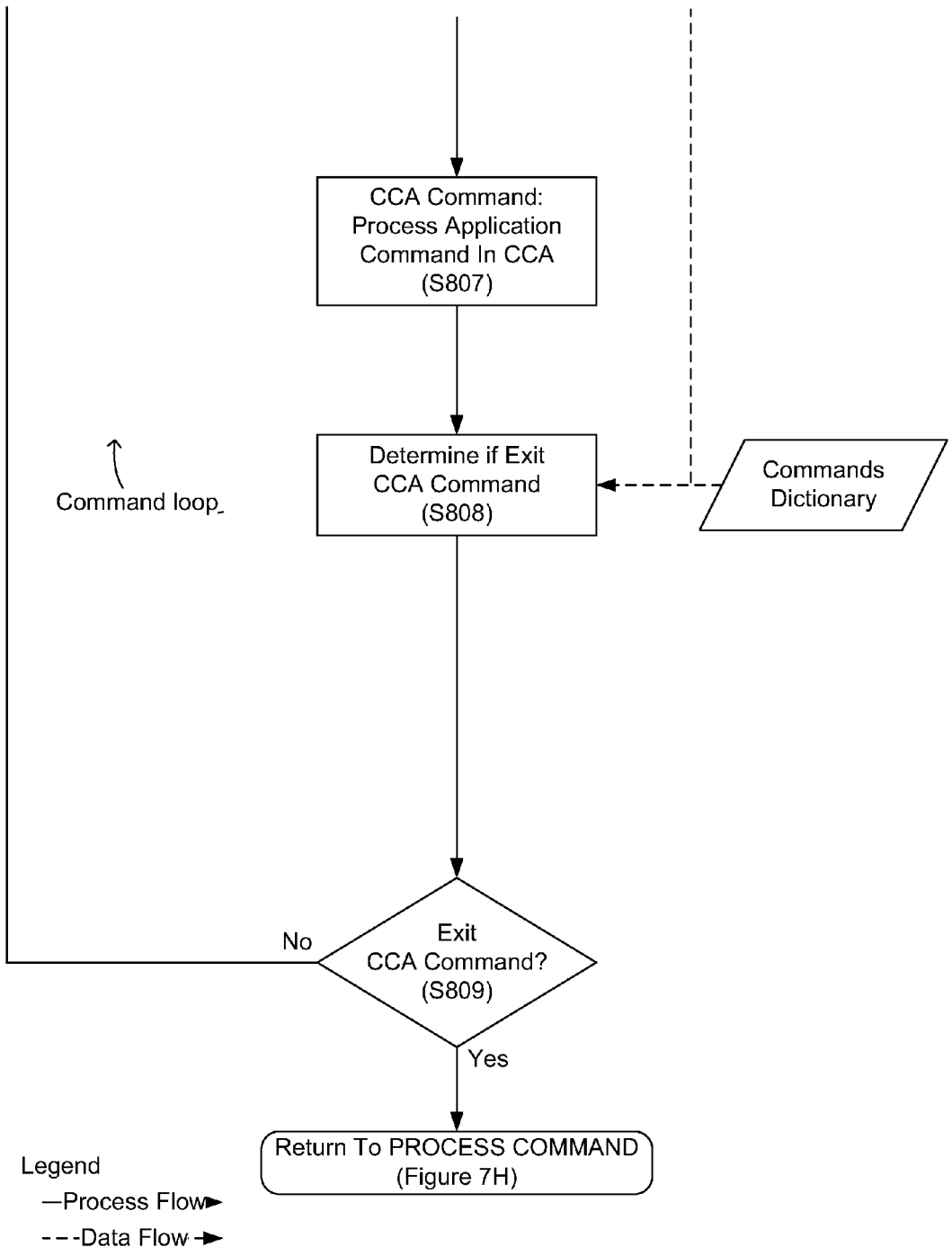
Fig. 8H CONTENT LOOP RECURSIVE

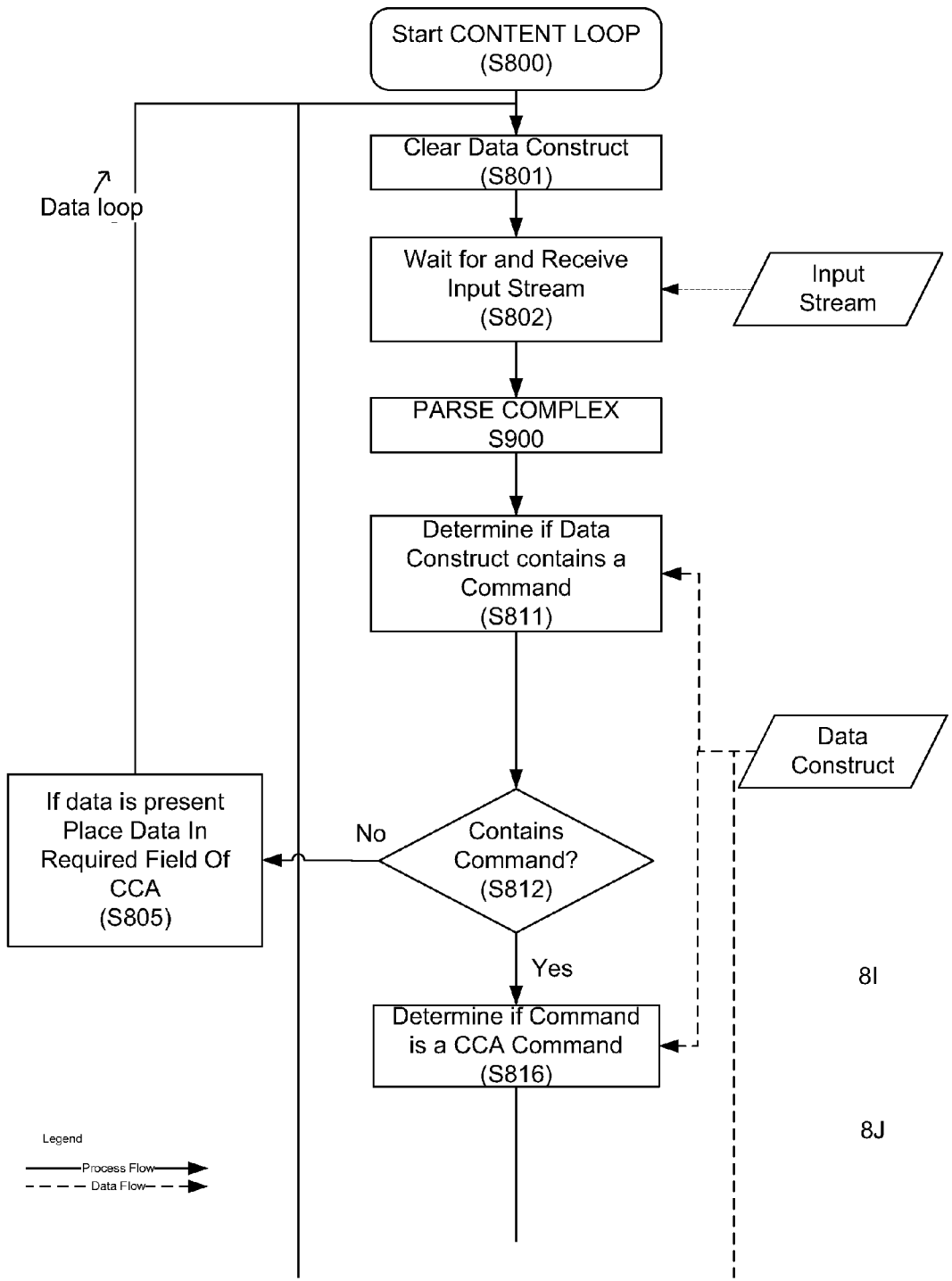
Fig. 8I CONTENT LOOP

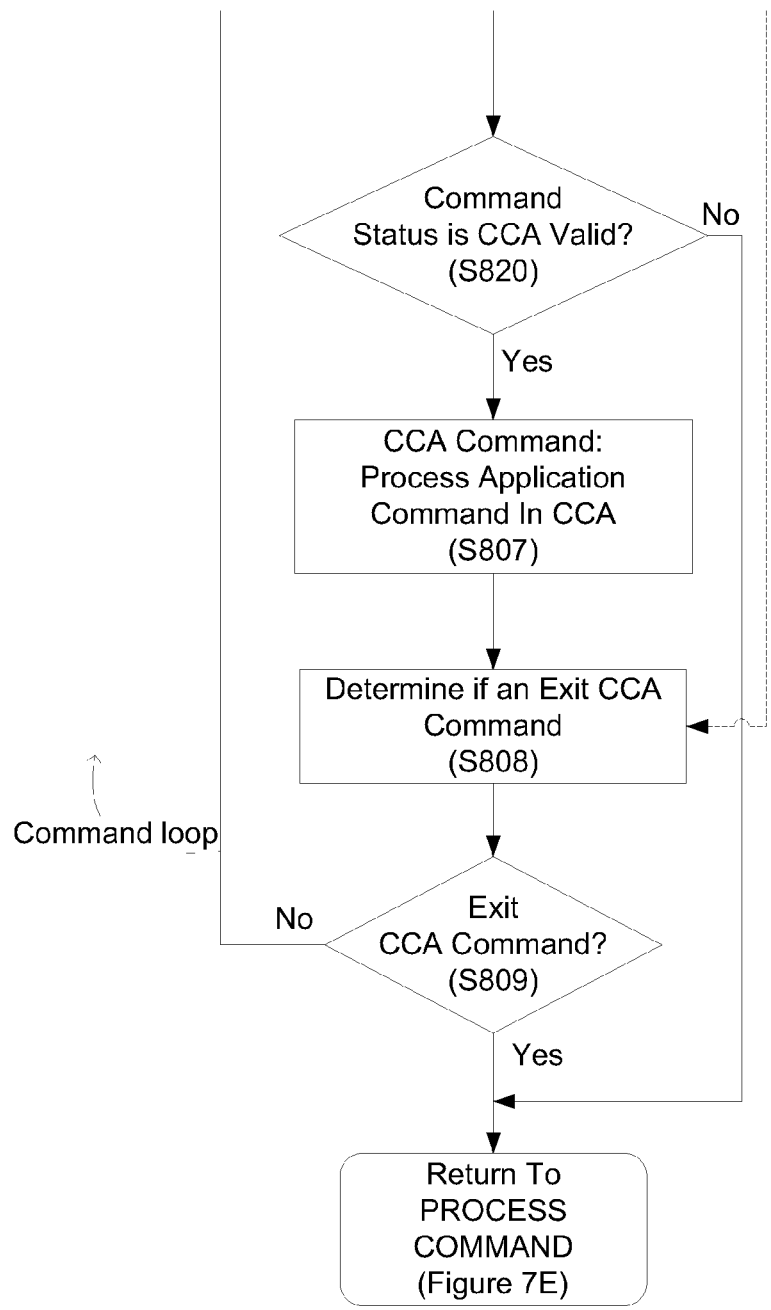
Fig. 8J CONTENT LOOP

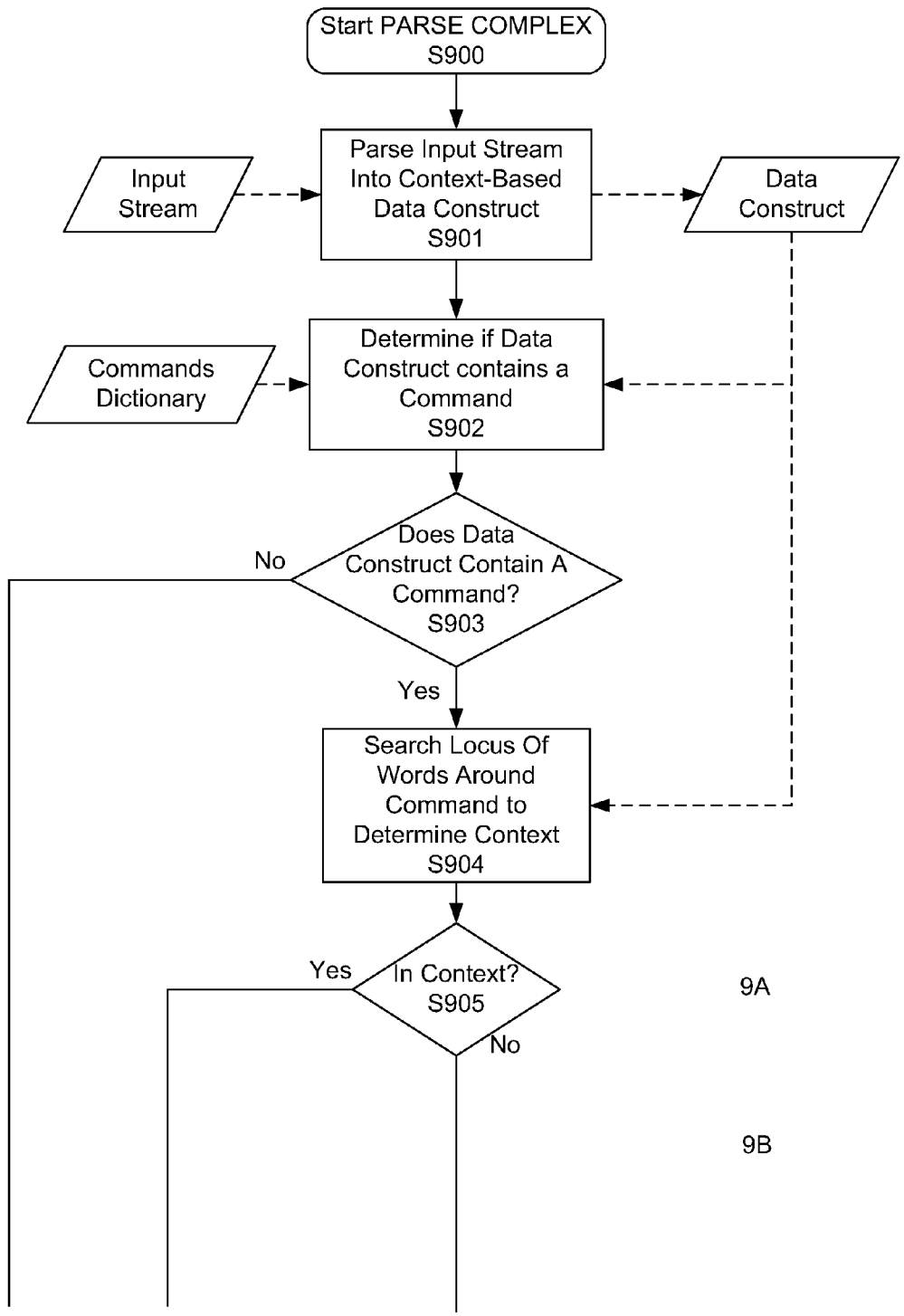
Fig. 9A PARSE COMPLEX

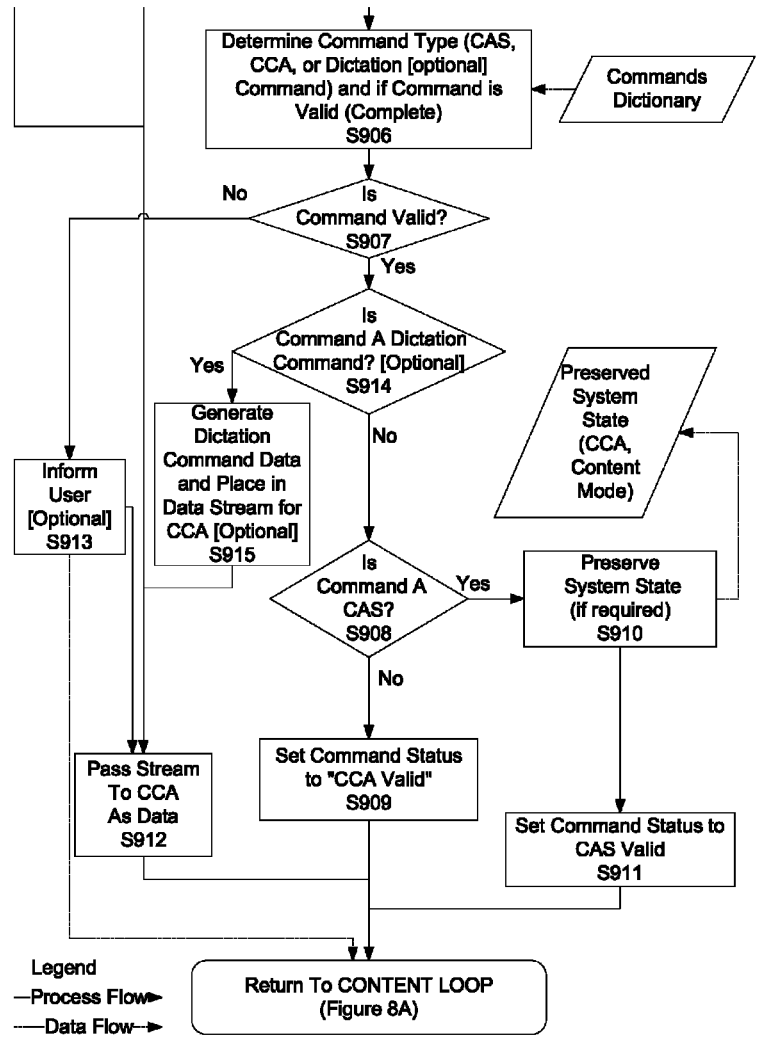
Fig. 9B PARSE COMPLEX

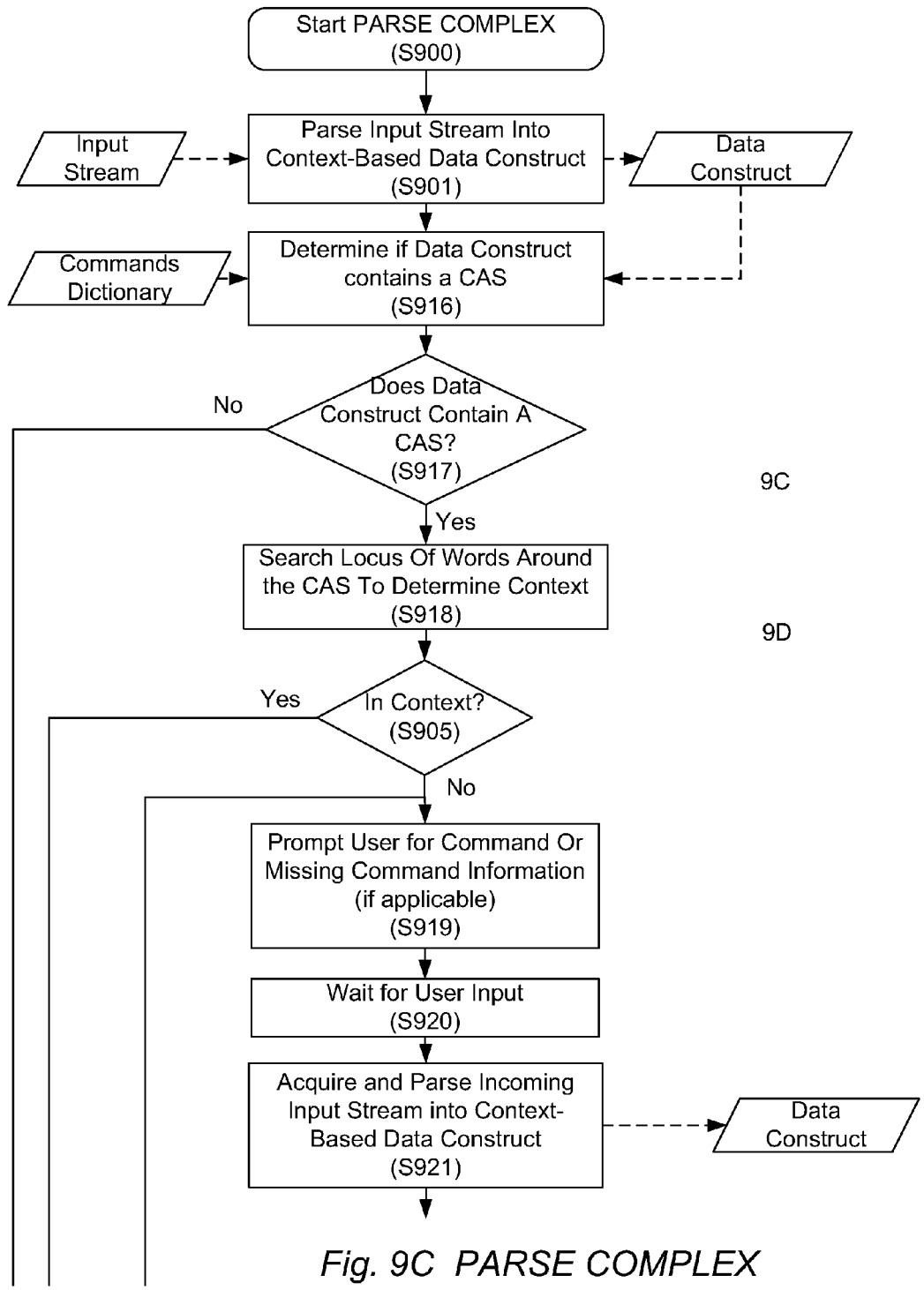
Fig. 9C PARSE COMPLEX

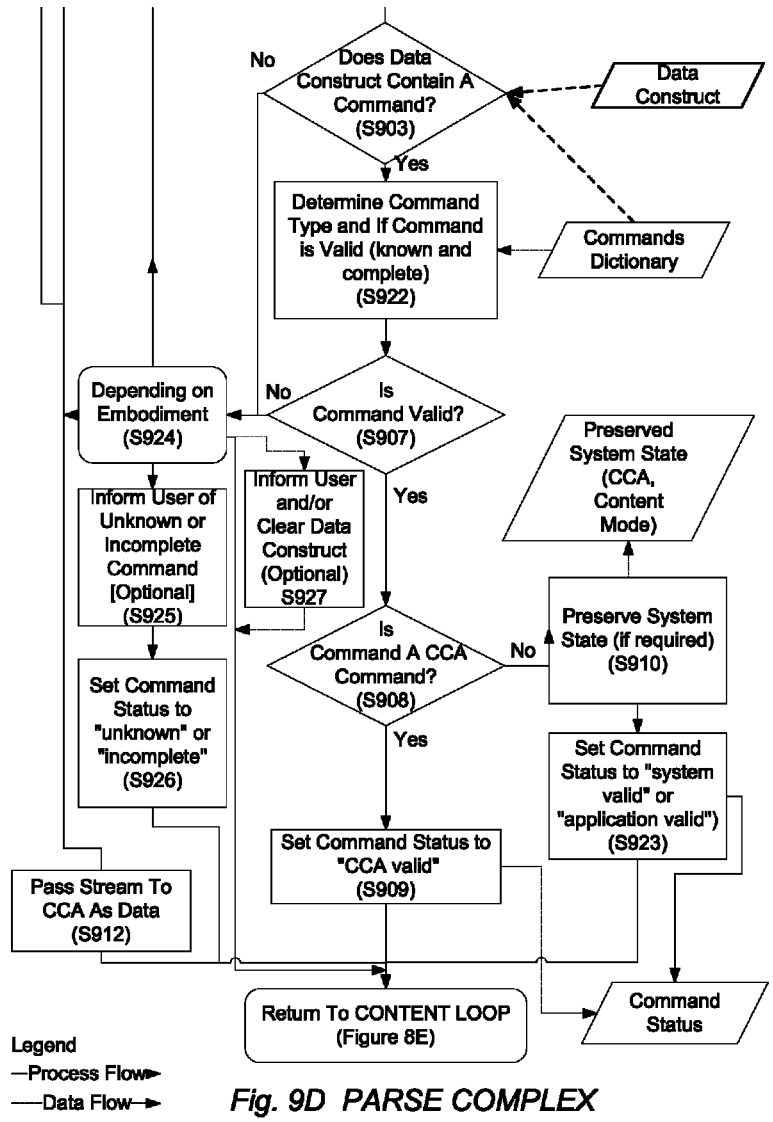
Fig. 9D PARSE COMPLEX

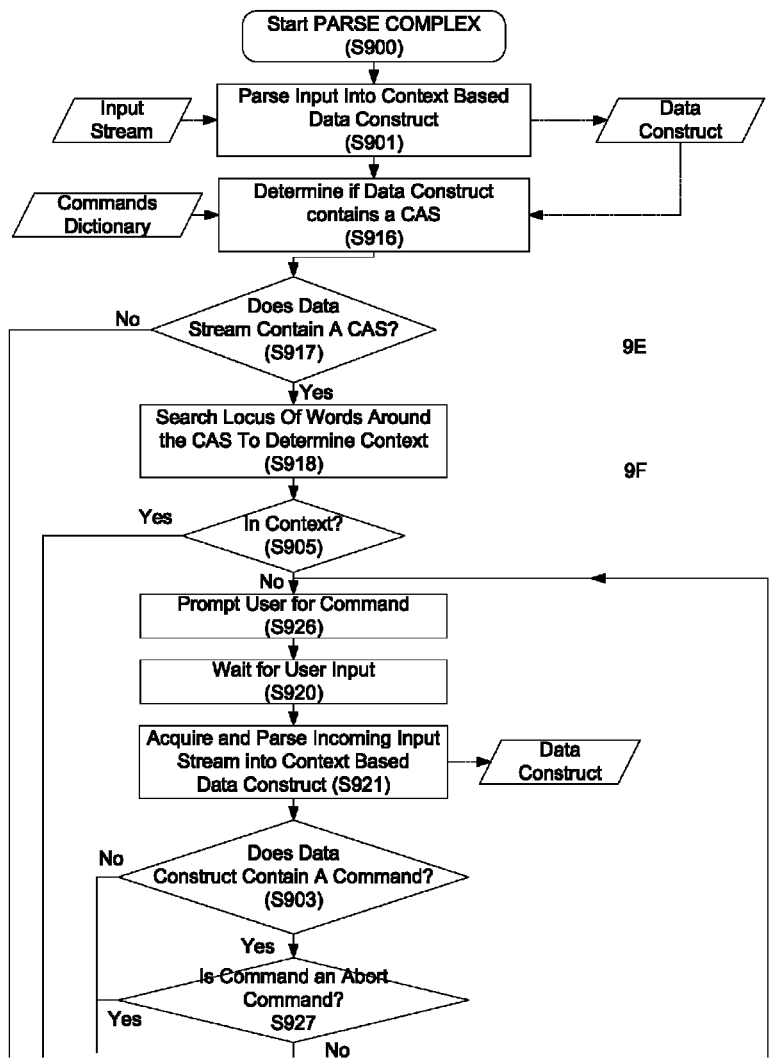
Fig. 9E PARSE COMPLEX RECURSIVE

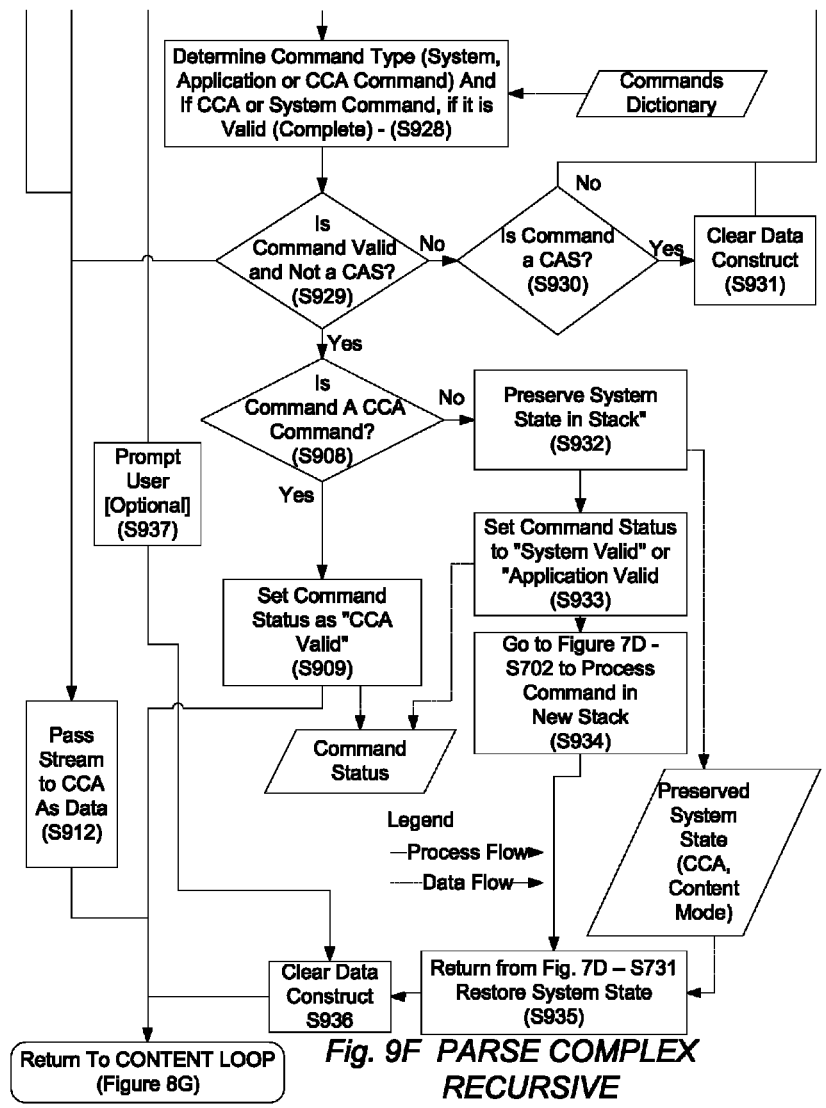
Fig. 9F PARSE COMPLEX RECURSIVE

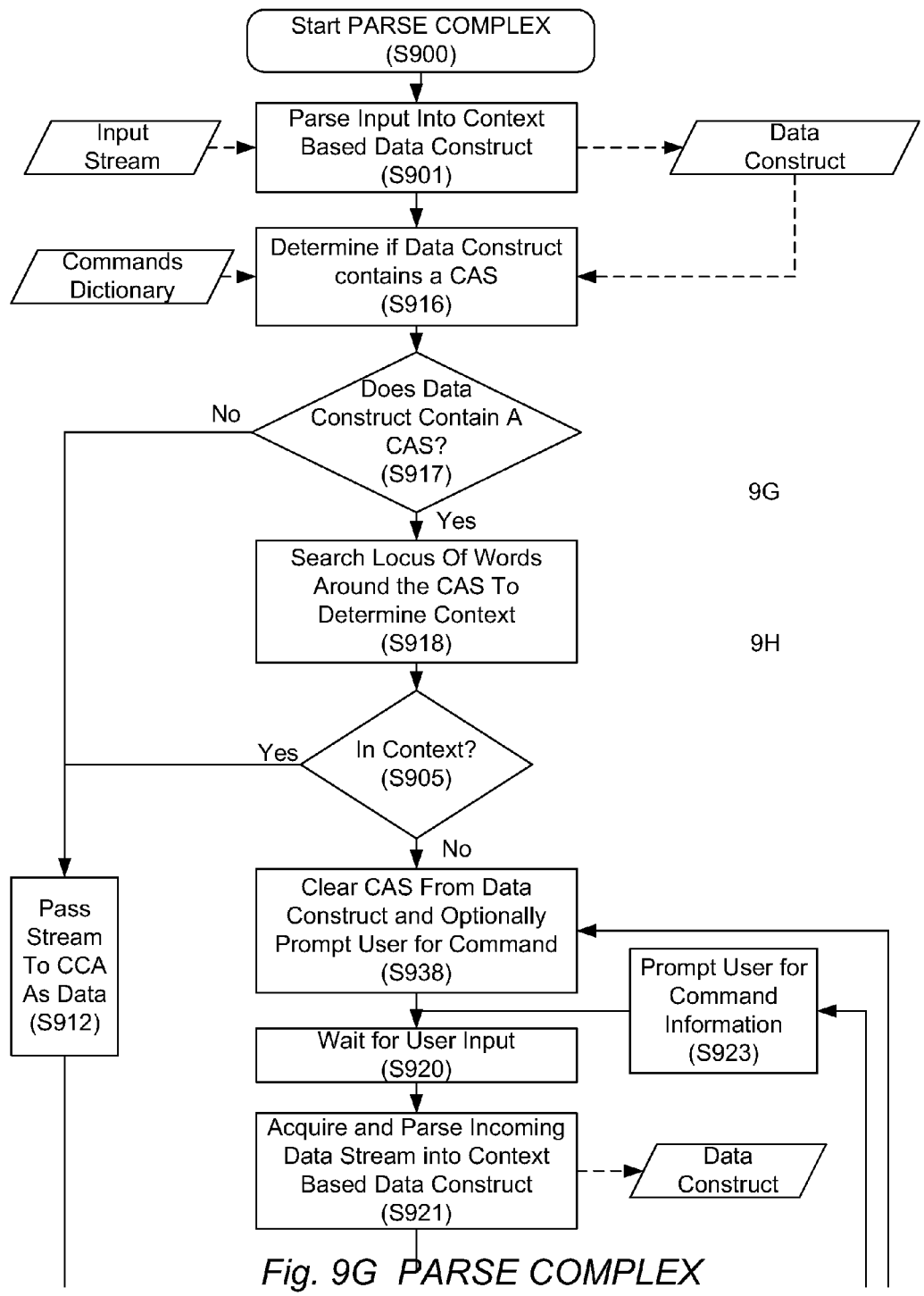
Fig. 9G PARSE COMPLEX

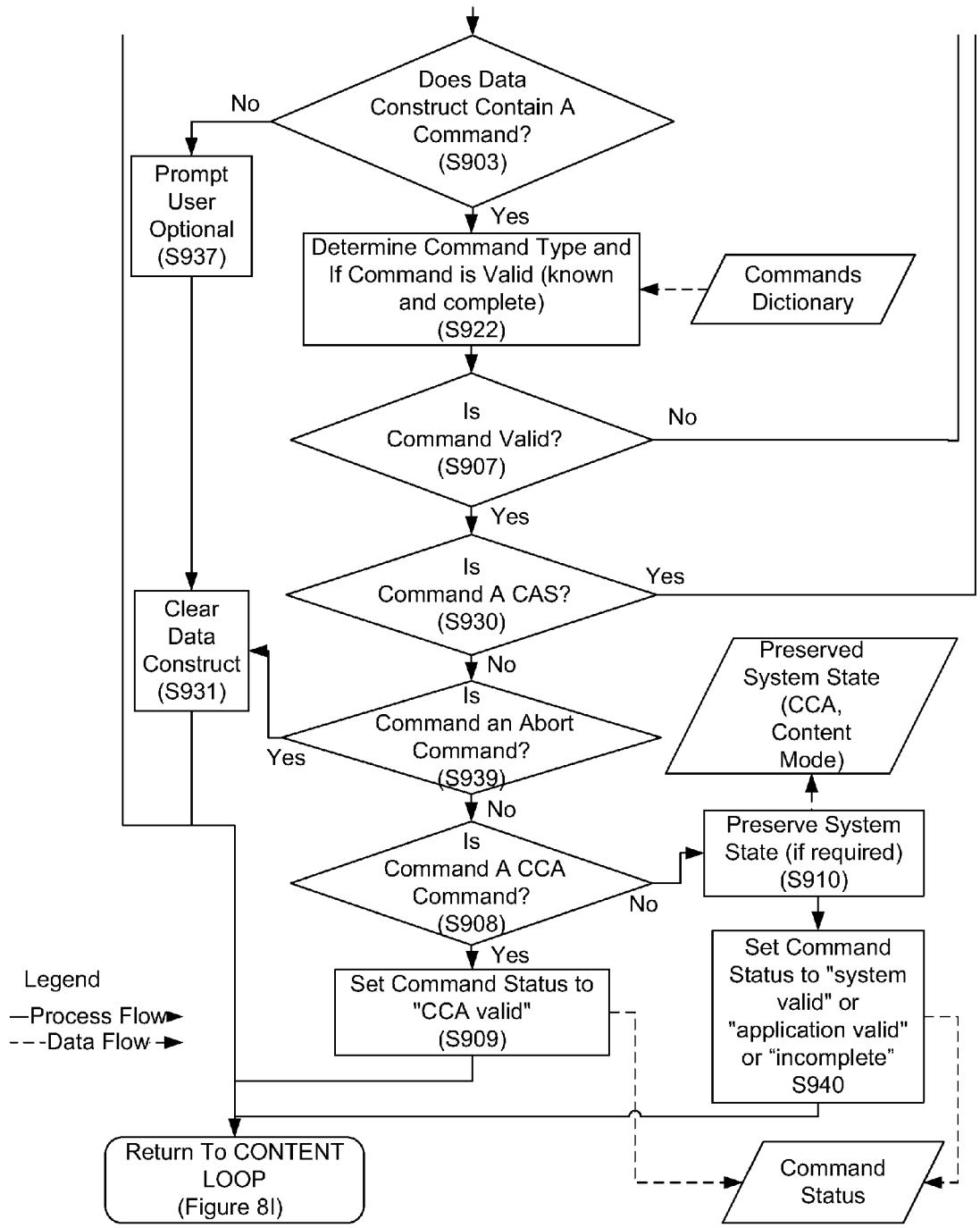
Fig. 9H PARSE COMPLEX

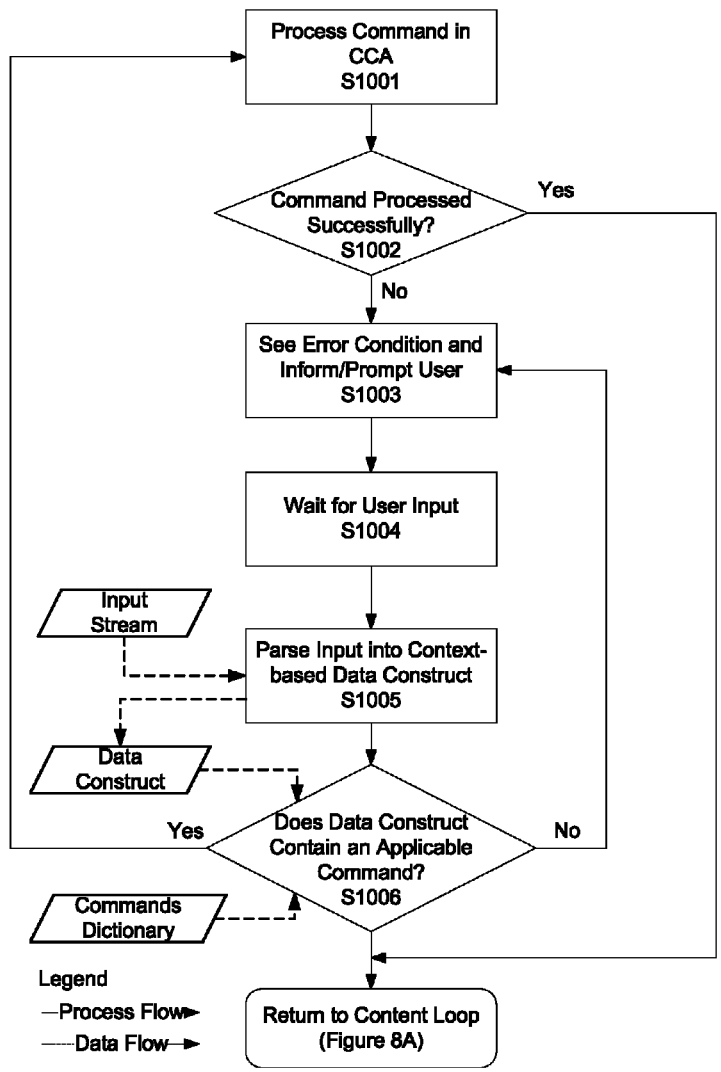
FIG. 10A PROCESS COMMAND IN CCA OPTION 1

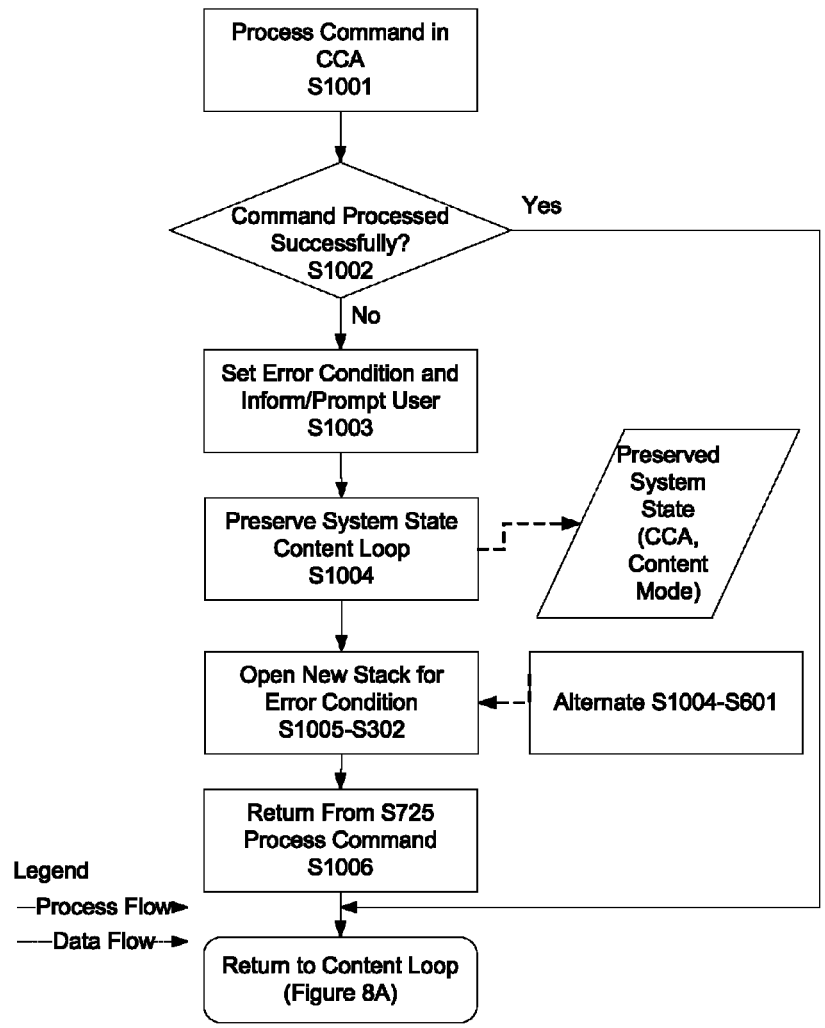
FIG. 10B PROCESS COMMAND IN CCA OPTION 2

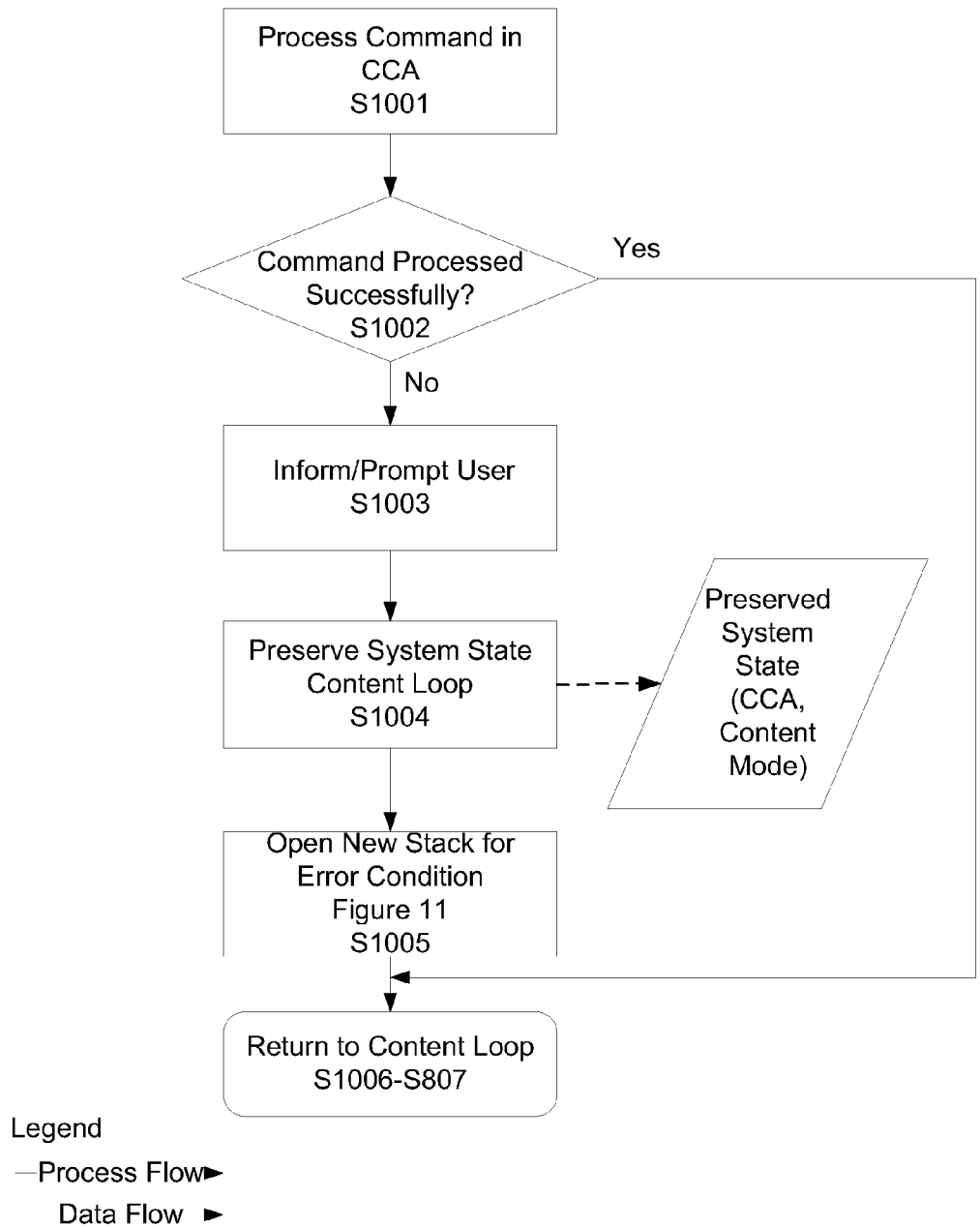
FIG. 10C  PROCESS COMMAND IN CCA OPTION 3

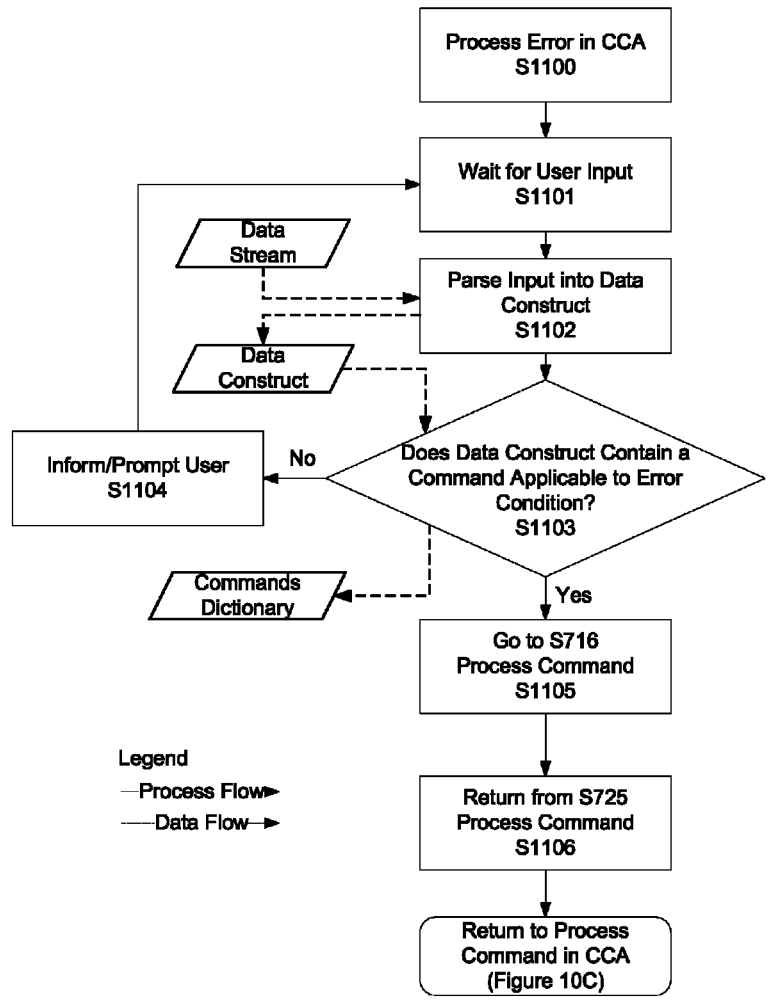
FIG. 11 Error Condition Stack For Processing Command in CCA

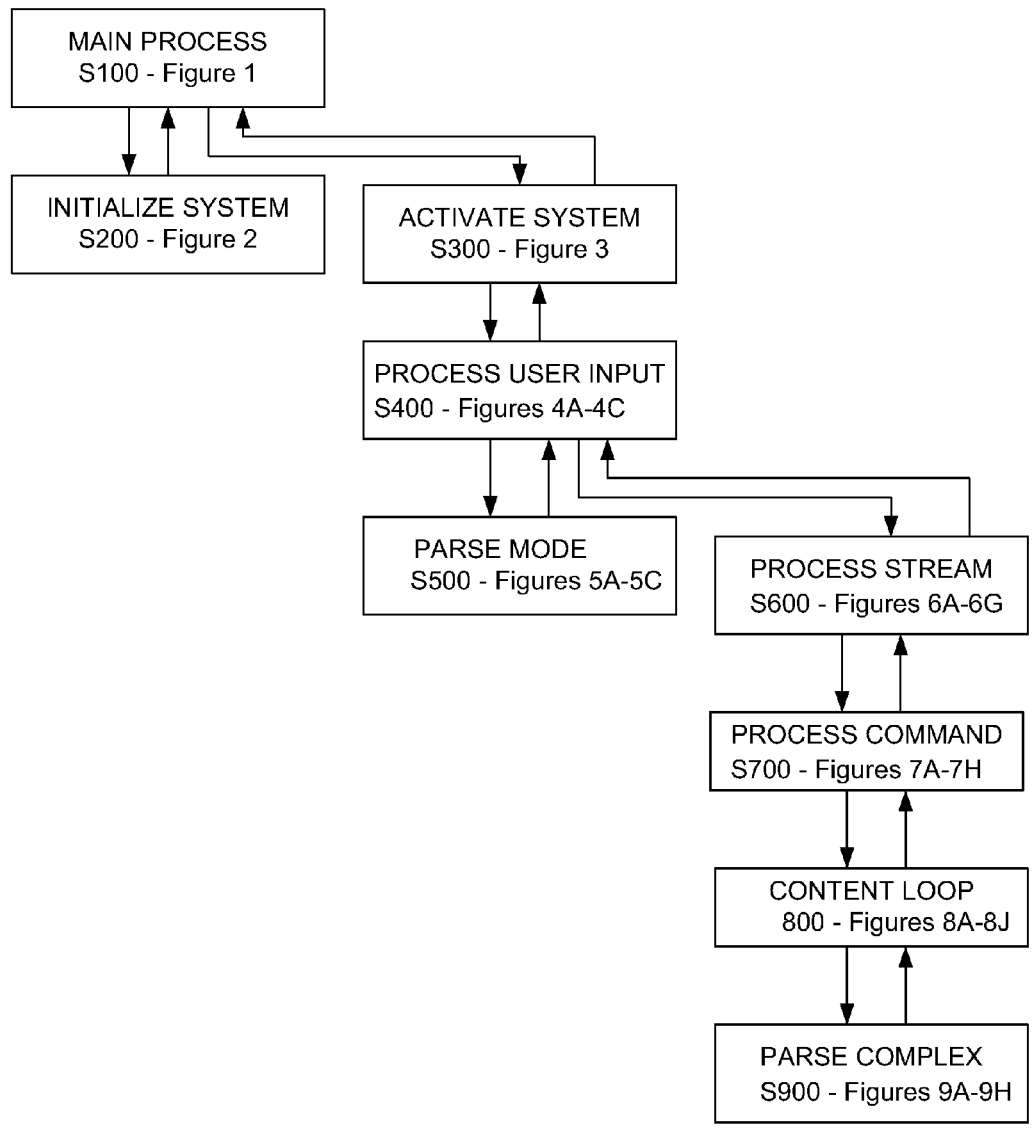
Fig. 12 Charts Overview

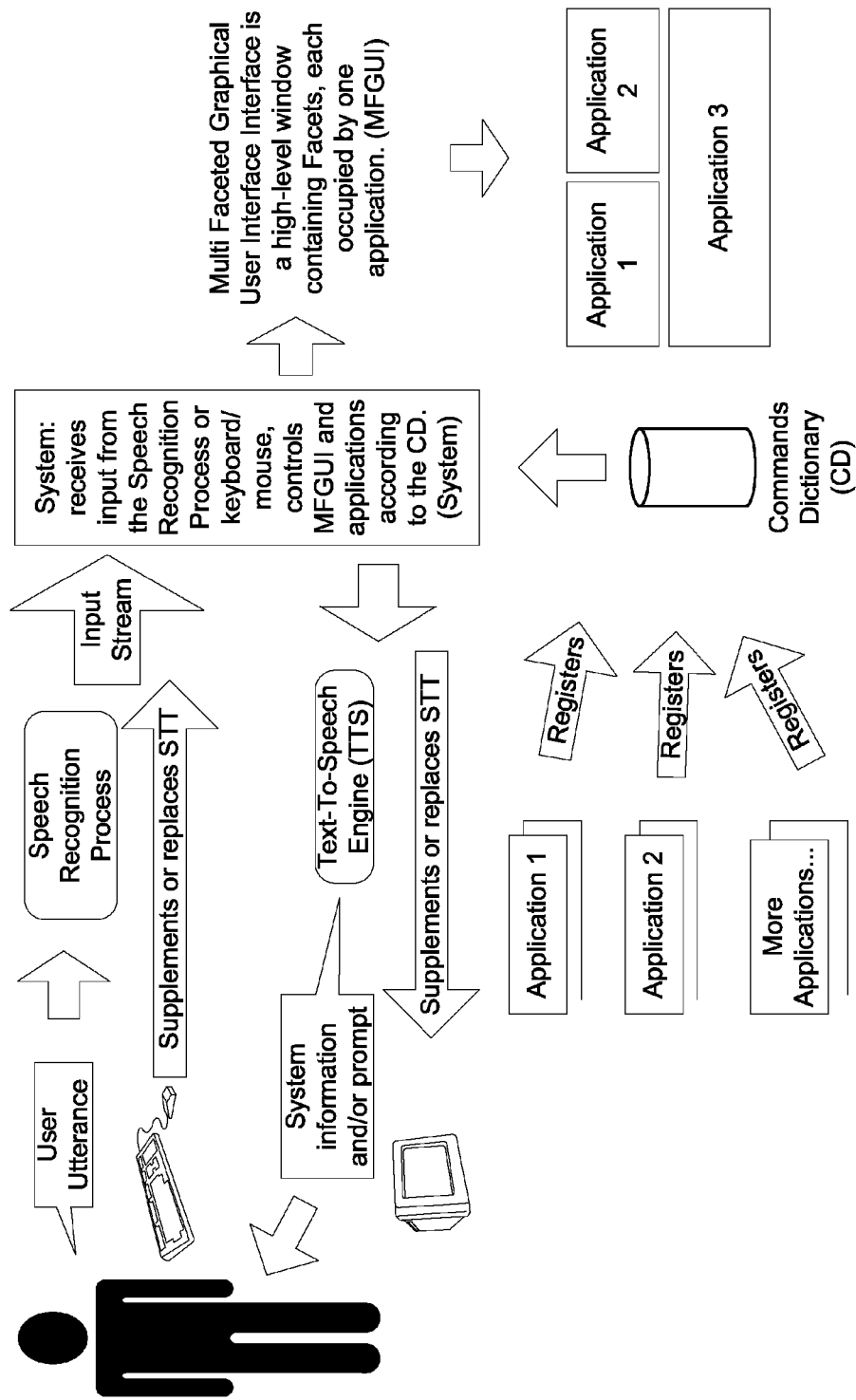
Fig. 13 System Overview

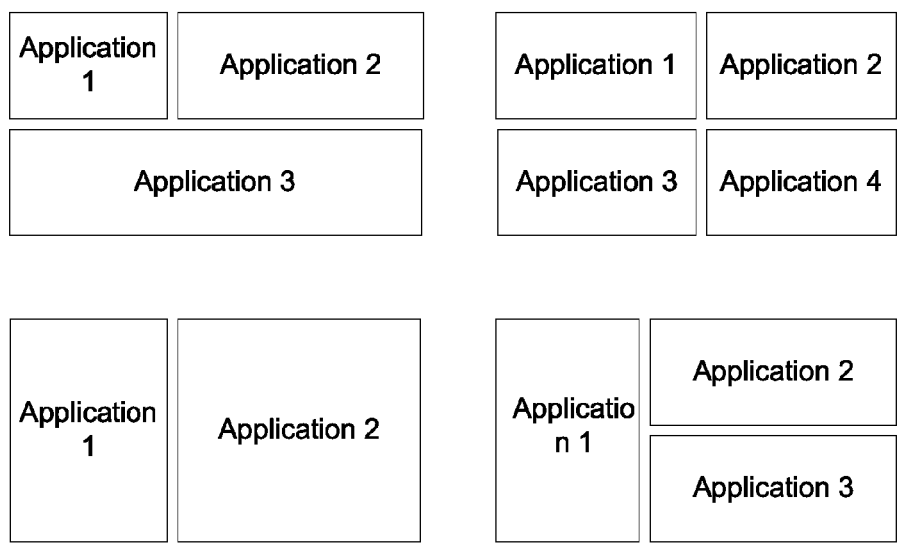
Fig. 14 Examples of possible Facet configurations for the Multi Faceted Graphical User Interface (MFGUI)

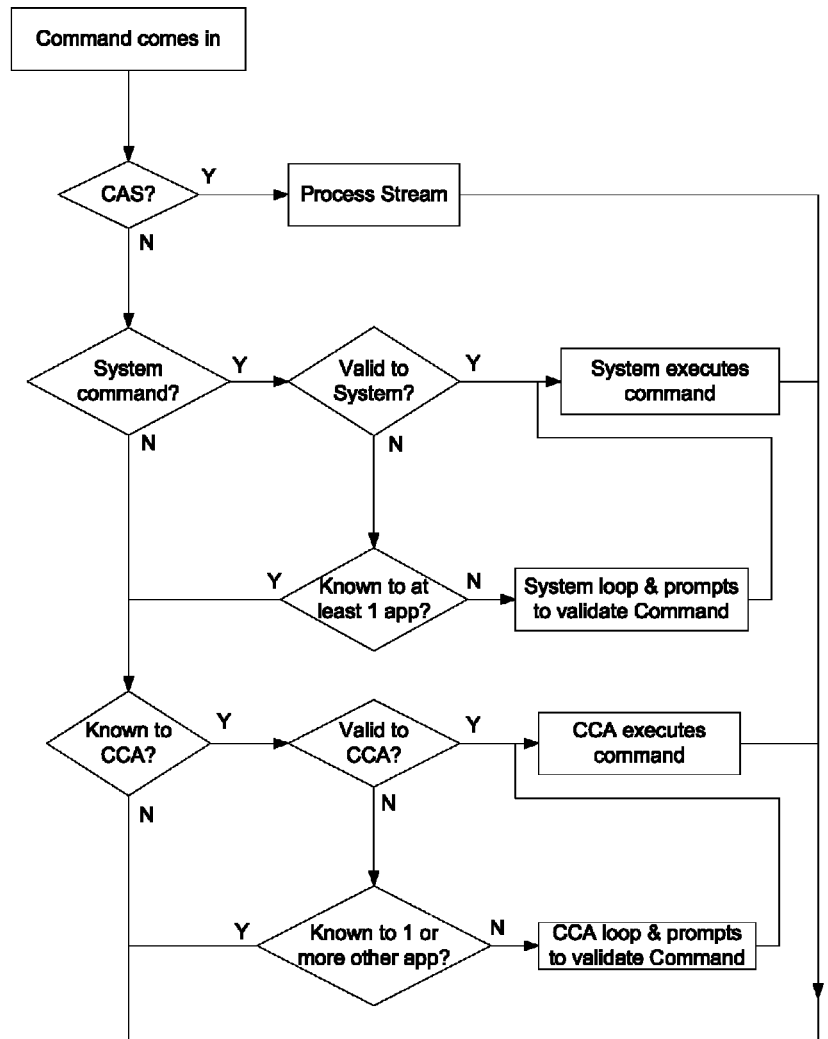
Fig. 15A Decision chart for Priorities at executing Commands

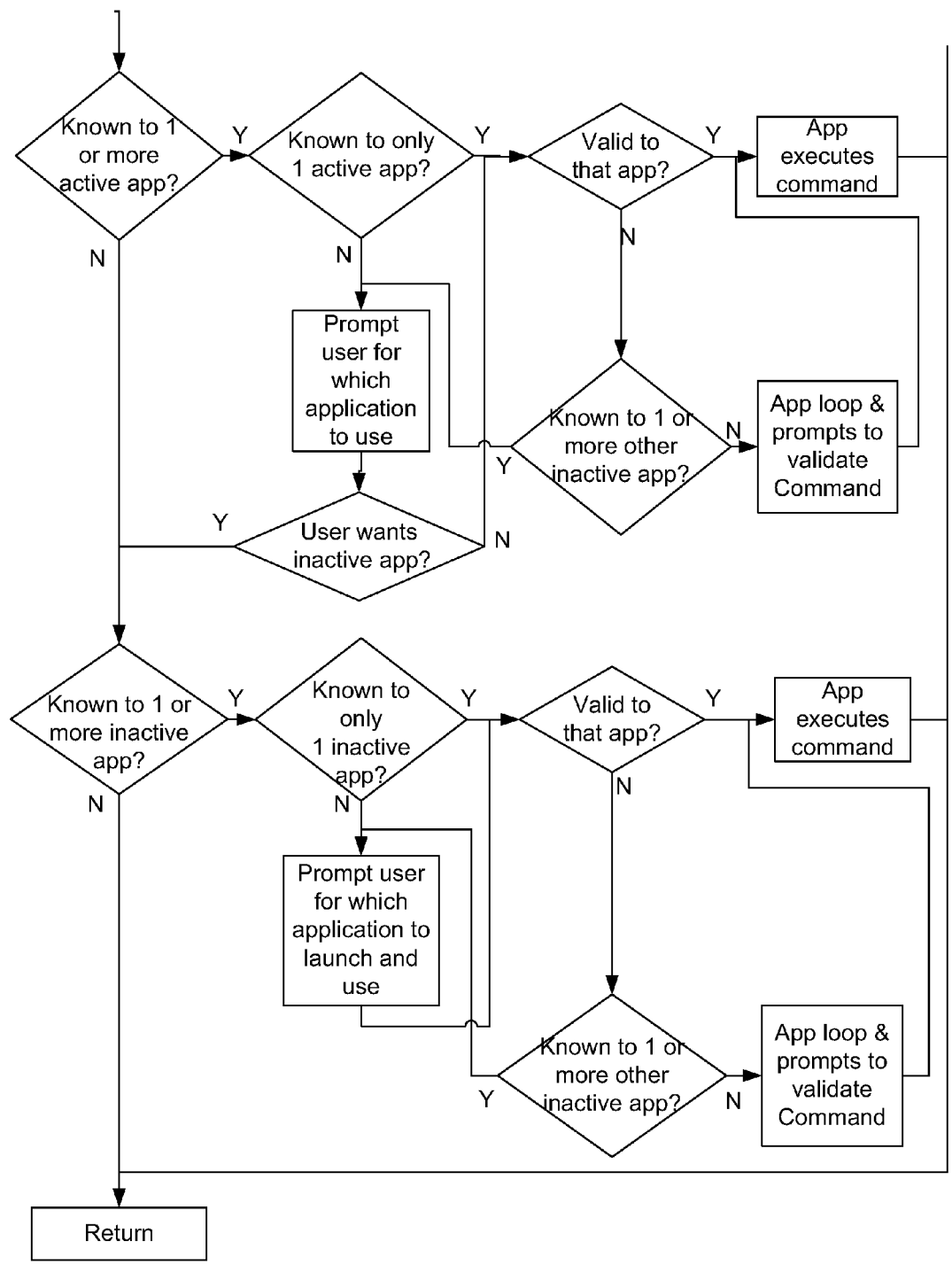
Fig. 15B Decision chart for Priorities at executing Commands

SPEECH INTERFACE SYSTEM AND METHOD FOR CONTROL AND INTERACTION WITH APPLICATIONS ON A COMPUTING SYSTEM

CROSS REFERENCE TO RELATED APPLICATIONS

The present application is a Divisional of U.S. patent application Ser. No. 13/454,333, filed Apr. 24, 2012, now U.S. Pat. No. 8,543,407, issued Sep. 24, 2013, which is a Continuation of U.S. patent application Ser. No. 12/241,028, filed Sep. 29, 2008, now U.S. Pat. No. 8,165,886, issued Apr. 24, 2012, which claims benefit of priority from 60/977,645 filed Oct. 4, 2007, each of which are expressly incorporated herein by reference.

1 BACKGROUND OF THE INVENTION

1.1 Field of the Invention

The present invention relates to systems and methods for controlling computer applications and/or processes using voice input. More precisely, the present invention relates to integrating a plurality of applications and/or processes into a common user interface which is controlled mostly by voice activated commands, which allows hands-free control of each process within a common environment.

1.2 Discussion of Prior Art

Speech input user interfaces are well known. This specification expressly incorporates by reference U.S. Pat. No. 6,606,599 and U.S. Pat. No. 6,208,972, which provide a method for integrating computing processes with an interface controlled by voice actuated grammars.

Typical speech driven software technology has traditionally been useful for little more than a dictation system which types what is spoken on a computer display, and has limited command and control capability. Although many applications have attempted to initiate command sequences, this may involve an extensive training session to teach the computer how to handle specific words. Since those words are not maintained in a context based model that simulates intelligence, it is easy to confuse such speech command systems and cause them to malfunction. In addition, the systems are limited in capability to the few applications that support the speech interface.

It is conventionally known that an application window can spawn another window when the application calls for specific user input. When that happens, we call the first window a "parent window", and the spawned window a "child window". This presents certain problems in that the child window generally overlaps its parent window.

Some child windows have to be satiated or terminated before releasing control (active focus) and returning I/O access back to the main application window. Examples of Child Windows are i) a Document window in an application like Word, ii) another foreground, monopolizing (aka Modal) window like File Open, iii) another foreground, non-monopolizing (aka Non-Modal) window.

Every speech-initiated application maintains its own operating window as a "child window" of the system. The child/parent window scheme does not allow for complex command processing. A complex command may require more than one application to be put to contribution in a specific order based on a single spoken command phrase. For example, the spoken command phrase "add Bob to address book" is a multiple-step/multiple-application command. The appropriate commands required by the prior art are: "open address book", "new entry" and "name Bob". In the prior art, each operation is required to be completed one by one in a sequential order. Although this methodology works to a minimum satisfaction level, it does not use natural language speech. The prior art is typically not capable of performing multiple step operations with a single spoken command phrase. In addition, the prior art does not enable a single spoken phrase to process commands that require the application to perform multiple steps without first training the application on the sequence of steps that the command must invoke (much like programming a macro). For example, the spoken command phrase "Write a letter to Bob" requires multiple applications to be used sequentially, and if those applications are not running, they must be launched in order to execute the command. The prior art would typically have the user say: "open address book", "select Bob", "copy address", "open editor", "new letter" and "paste address"—or would require the user to train the application to perform these steps every time it hears this command. The address book and text editor/word processor are generally different applications. Since these programs require the data to be organized in a specific order, the voice commands must be performed in a specific order to achieve the desired result. The prior art is not capable of performing operations across multiple applications entirely on its own with a single spoken command phrase.

In each Windowed Operating System it is common for each executing application window to "pop-up" a new "child window" when a secondary type of interaction is required by the user. When an application is executing a request, focus (an active attention within its window) is granted to it. Windowed operating systems running on personal computers are generally limited to a single active focus to a single window at any given time.

Current computer technology allows application programs to execute their procedures within individual application oriented graphical user interfaces (i.e. "windows"). Each application window program is encapsulated in such a manner that most services available to the user are generally contained within the window. Thus each window is an entity unto itself.

When an application window requires I/O, such as a keyboard input, mouse input or the like, the operating system passes the input data to the application.

Typical computer technologies are not well suited for use with a speech driven interface. The use of parent and child windows creates a multitude of problems since natural language modeling is best suited for complex command processing. Child windows receive active focus as a single window, and because they are sequentially activated by the operating system (single action), and as stated above, prior art speech command applications are not suited for natural language processing of complex commands.

The following US patents are expressly incorporated herein by reference: U.S. Pat. No. 5,974,413, 1999 Oct. 26, Beauregard et al.; U.S. Pat. No. 5,805,775, 1998 Sep. 8, Eberman et al.; U.S. Pat. No. 5,748,974, 1998 May 5, Johnson; U.S. Pat. No. 5,621,859, 1997 Apr. 15, Schwartz et al.; U.S. Pat. No. 6,208,972, 2001 Mar. 27, Grant et al.; U.S. Pat. No. 5,412,738, 1995 May 2, Brunelli et al.; U.S. Pat. No. 5,668,929, 1997 Sep. 16, Foster Jr.; U.S. Pat. No. 5,608,784, 1997 Mar. 4, Miller; U.S. Pat. No. 5,761,329, 1998 Jun. 2, Chen et al.; U.S. Pat. No. 6,292,782, 2001 Sep. 18, Weideman; U.S. Pat. No. 6,263,311, 2001 Jul. 17, Dildy; U.S. Pat. No. 4,993,068, 1991 Feb. 12, Piosenka et al.; U.S. Pat. No. 5,901,203, 1999 May 4, Morganstein et al.; U.S. Pat. No. 4,975,969, 1990 Dec. 4, Tal; U.S. Pat. No. 4,449,189, 1984 May 15, Feix et al.; U.S. Pat. No. 5,838,968, 1998 Nov. 17, Culbert; U.S. Pat. No. 5,812,437, 1998 Sep. 22, Purcell et al.;

U.S. Pat. No. 5,864,704, 1999 Jan. 26, Battle et al.; U.S. Pat. No. 5,970,457, 1999 Oct. 19, Brant et al.; U.S. Pat. No. 6,088,669, 2000 Jul. 11, Maes; U.S. Pat. No. 3,648,249, 1972 Mar. 7, Goldsberry; U.S. Pat. No. 5,774,859, 1998 Jun. 30, Houser et al.; U.S. Pat. No. 6,208,971, 2001 Mar. 27, Bellegarda et al.; U.S. Pat. No. 5,950,167, 1999 Sep. 7, Yaker; U.S. Pat. No. 6,192,339, 2001 Feb. 20, Cox; U.S. Pat. No. 5,895,447, 1999 Apr. 20, Ittycheriah et al.; U.S. Pat. No. 6,192,343, 2001 Feb. 20, Morgan et al.; U.S. Pat. No. 6,253,176, 2001 Jun. 26, Janek et al.; U.S. Pat. No. 6,233,559, 2001 May 15, Balakrishnan; U.S. Pat. No. 6,199,044, 2001 Mar. 6, Ackley et al.; U.S. Pat. No. 6,138,098, 2000 Oct. 24, Shieber et al.; U.S. Pat. No. 6,044,347, 2000 Mar. 28, Abella et al.; U.S. Pat. No. 5,890,122, 1999 Mar. 30, Van Kleeck et al.; U.S. Pat. No. 5,812,977, 1998 Sep. 22, Douglas; U.S. Pat. No. 5,685,000, 1997 Nov. 4, Cox Jr.; U.S. Pat. No. 5,461,399, 1995 Oct. 24, Cragun; U.S. Pat. No. 4,513,189, 1985 Apr. 23, Ueda et al.; U.S. Pat. No. 4,726,065, 1988 Feb. 16, Froessl; 4766529, 1988-08-23, Nakano et al.; U.S. Pat. No. 5,369,575, 1994 Nov. 29, Lamberti et al.; U.S. Pat. No. 5,408,582, 1995 Apr. 18, Colier; U.S. Pat. No. 5,642,519, 1997 Jun. 24, Martin; U.S. Pat. No. 6,532,444, 2003 Mar. 11, Weber; and U.S. Pat. No. 6,212,498, 2001 Apr. 3, Sherwood et al.

2 OBJECTS AND SUMMARY OF THE INVENTION 2.1 Objects

It is an object of the invention to provide a speech processing method, comprising receiving a speech input representing at least one of a command and a stream of data; analyzing the speech for characteristics of a command structure, and if so, entering a command mode; in a command mode, analyzing the speech input with respect to a set of at least one grammar representation, to determine an ambiguity and a completeness; based in the determined ambiguity and completeness, prompting the user in a contextually appropriate manner for further speech input, to at least one of reduce ambiguity and increase completeness; and if the speech input is sufficiently unambiguous and sufficiently complete, generating an output representing the command; and in an absence of a characteristic of a command structures: treating the speech input as one representative of data; and generating an output as a symbolic representation of the speech input.

It is a further object of the invention to provide a method further comprising the steps of: entering a data input mode if the step of analyzing the speech for characteristics of a command structure does not result in entering a command mode or if the speech input represents a command to enter a data input mode; and in a data input mode: treating the speech input as one representative of data, unless a context of the speech input indicates that the data input mode has terminated, and thereafter entering the command mode. If the speech input represents a command to enter a data input mode, a data input mode may be entered wherein subsequent speech input is analyzed for a command, if a command is found a context may be determined, and if a command is in the context of data input, the speech input may be treated as one representative of data, otherwise generating an output as a symbolic representation of the speech input. The method may further comprise the step of maintaining at least one data structure representing at least a status of a grammar, wherein the data structure is updated based on the speech input and a context; and the speech input, wherein the set of at least one grammar representation is generated dynamically based at least in part on available ones of a set of temporally varying available functions within the command structure. In one embodiment, the analyzing determines if a single string of speech input comprises at least one of a single command impacting at least two software constructs, at least two commands, and a combination of at least one command and data, and processing the speech input in accordance with the determination. In another embodiment, the analyzing step is performed by a plurality of analyzers in parallel, each analyzer analyzing according to a different set of criteria, and wherein the outputs of the plurality of analyzers are directed to a plurality of respective applications. According to a further embodiment, at least one of a non-linguistic implicit input is employed as a cue to determine at least one of a context, and a target software construct for analyzing said input; and at least one of a temporal analysis, natural language analysis, and syntactic analysis are used to determine a context of the speech input. An output may be generated representing the command is targeted to one of a plurality of respective applications while preserving a respective prior system state, wherein at least one of: after command execution, and in dependence on a result thereof, a system state is selectively restored or processing assumed by another application without restoring the prior system state; and a command restores one of a previously preserved system state. A plurality of applications may be concurrently available, and said steps of analyzing and generating an output are performed with respect to, and directed at, a particular one of the available applications.

It is another object of the invention to provide a speech processing method, comprising: analyzing a set of contexts to determine available commands; formulating command structures corresponding to the determined available commands; statistically modeling at least portions of the command structures; receiving a natural language speech input representing at least one command; processing the speech input with respect to the statistically modeled portions of the command structures; determining, with respect to the statistically modeled portions of the command structures, if the speech input likely represents a command; if the speech input likely represents at least one command, determining a completeness and an ambiguity of the likely at least one command; if the likely at least one command is too ambiguous or incomplete for execution, prompting the speaker for further input to decrease an ambiguity or increase the completeness; and if the likely at least one command is sufficiently unambiguous and complete for execution, executing the command.

The method may further comprise the step of maintaining at least one data structure representing at least a status of a grammar, wherein the data structure is updated based on the speech input and a context; and the speech input, wherein the set of at least one grammar representation is generated dynamically based at least in part on available ones of a set of temporally varying available functions within the command structures. The analyzing step may determine if a single string of speech input comprises at least one of a single command impacting at least two software constructs, at least two commands, and a combination of at least one command and data, and processing the speech input in accordance with the determination. The analyzing step may be performed by a plurality of analyzers in parallel, each analyzer analyzing according to a different set of criteria, and wherein the outputs of the plurality of analyzers are directed to a plurality of respective applications. A non-linguistic implicit input is employed as a cue to determine at least one of a context. A target software construct may be employed for analyzing said input. At least one of a temporal analysis, natural language analysis, and syntactic analysis may be used to determine a context of the speech input. The command may be targeted to one of a plurality of respective applications, while preserving a respective prior system state, wherein at least one of: after command execution, and in dependence on a result thereof, a system state is selectively restored or processing assumed by another application without restoring the prior system state; and a command restores one of a previously preserved system state. A plurality of applications may be concurrently available, and said step of analyzing is performed with respect to a particular one of the available applications and the command is executed by that respective application.

It is a further object of the invention to provide a speech processing method, comprising: receiving a natural language speech input representing commands and data in the form of spoken words; analyzing the speech for contextual indicia to distinguish between spoken commands instructing a device at take automated action, and spoken words intended as data; determining whether speech analyzed to comprise commands, represents a sufficiently complete command capable of at least partial execution, or whether additional command input is required; if required additional command input is not received within a contextually appropriate period, prompting the speaker for additional input to complete the command sufficient for at least partial execution; at least partially executing commands; and passing speech containing words intended as data to a data sink.

The method may further comprise the step of maintaining at least one data structure representing at least a status of a grammar, wherein the data structure is updated based on the speech input and a context; and the speech input, wherein the set of at least one grammar representation is generated dynamically based at least in part on available ones of a set of temporally varying available functions within the command structure. A non-linguistic implicit input may be employed as a cue to determine at least one of a context. A target software construct may be employed for analyzing said input. At least one of a temporal analysis, natural language analysis, and syntactic analysis may be used to determine a context of the speech input. A command may be targeted to one of a plurality of respective applications while preserving a respective prior system state, wherein at least one of: after command execution, and in dependence on a result thereof, a system state is selectively restored or processing assumed by another application without restoring the prior system state; and a command restores one of a previously preserved system state. A plurality of applications may be concurrently available, and said analyzing step is performed with respect to, and directed at, a particular one of the available applications and the command is at least partially executed by that respective application.

A still further object of the invention provides a method for recursive processing of speech, comprising: receiving a speech input to be processed, the speech input comprising a command structure in which a processing result for a first portion of the speech input is necessary for determining a processing result for a second portion of the speech input; assigning control of processing of the speech input to a first processing unit, for generating the processing result for the first portion of the speech input; and delegating, from the first processing unit, to a second processing unit, control of processing the second portion of the speech input, the determining of the processing result for the second portion of the speech input by the second processing unit being deferred until the processing result for the first portion is available, and after the processing result for the second portion is available, deferring control back to the first processing unit. The second portion of the speech input may comprise a command structure in which a processing result for a first subportion of the second portion input is necessary for determining a processing result for a second subportion of the second portion, further comprising: delegating, from the second processing unit, to a third processing unit, control of processing the second subportion, the determining of the processing result for the second subportion by the third processing unit being deferred until the processing result for the first subportion is available, and after the processing result for the second subportion is available, deferring control back to the second processing unit.

Another object of the invention is to provide a speech processing method, comprising: receiving a speech input representing a command targeted to one of a plurality of respective applications, an execution of a second command interrupting an execution of a first command, wherein a respective prior system state representing a system state at the time of interruption is preserved, and wherein a plurality of system states may be preserved concurrently; after execution of the second command, in dependence on at least one of a predefined condition, the second command, and a result of an execution of the second command, the preserved system state prior to interruption of the first command is restored, another preserved system state is restored, or the processing is assumed by an application without restoring the prior system state.

2.2 Summary of the Invention

The current invention seeks to overcome these limitations by providing a uniform speech aware interface that is optimized for a hands free, speech driven environment and provides the user with a primary interface that minimizes the need for using a keyboard and pointing device. The keyboard and pointing device are not replaced, but rather speech, when available, becomes the primary interface, while giving the user the flexibility to use whatever input means works best at the time. Such a system enhances productivity and is especially useful for contact management, business professionals and anyone looking to eliminate the time consuming procedures of typing, using menus and pushing and shoving windows around a computer display to find the useful data buried therein. In the preferred embodiment of the present invention, by utilizing Speech-To-Text engine, an innovative natural language processor and a unique graphical user interface which can control and contain multiple applications, and display management, the limitations of the prior art are overcome.

According to an aspect of the invention, there is provided for a system and method for controlling a plurality of applications by speech initiated commands spoken by a user, each command having at least one phoneme, the steps comprising: receiving an initial command from a process in response to the user initiating an utterance, the process including a speech recognition process, such as a speech recognition engine or speech-to-text engine (the STT), setting a command mode of operation when the initial command from the step of receiving is determined to be a command activation statement (CAS), cycling through a first loop when in the command mode of operation, under control of the first loop: receiving an input stream, storing the input stream in a data location, searching the data location for a valid command, the step of searching includes comparing each the input stream to commands or derived representations thereof stored in the Commands Dictionary (CD) to determine if the input stream contains a valid command, reporting an error condition when the step of searching does not find a valid command, processing the valid command when the step of searching finds the valid command, the valid command statement corresponding to at least one of the plurality of processes and applications, and optionally dependent on the command, setting the mode of operation to a wait mode of operation when the step of processing the valid command is completed. When the step of searching finds a command statement that is not valid because information needed to process the command is missing, the reporting of an error condition can be one that prompts the user to input the missing information, and cycling through another loop. In this case, the process can be repeated successively until the user builds a valid command or the command input is terminated by the user or the system.

It is noted that the Command Dictionary may be embodied in a data matrix or network, and therefore need not be a simple table entry or human-readable or human comprehendible format. The Command Dictionary may also be associated with disambiguation logic in the case where a plurality of available commands has conditions or states simultaneously satisfied by a prior input.

According to another aspect of the invention, there is a method for controlling a graphical user interface display area for a plurality of applications by speech, and displaying said plurality of applications in a single display window that is composed of multiple facets. Multiple applications are displayed at one time, and applications (and their child windows, if any and if permitted by the application) move in and out of the display area, as they are needed. The size, shape and location of facets can be fixed at three as in the preferred embodiment (although the fixed number of facets can be more or less), or the facets can adjust in size, reshaping themselves, or morphing, to accommodate the number of applications that need to be displayed. From a visual standpoint in a non-Windowed, character-based operating system, the MFGUI occupies the whole display area. That makes the MFGUI the main user interface on the computer system, also fitting the widely accepted definition of a "shell".

The System functions as an interface enabling humans to exercise command and control over computer software applications and to input information into multiple software applications by speech, and in the preferred embodiment provides for a multi-faceted graphical user interface to display multiple applications in a single viewing area instead of being limited to multiple separate and overlapping windows as in the prior art.

Briefly stated, a preferred embodiment of the present invention has two main aspects that provide methods for a human centered user interface utilizing speech to input data and control multiple applications, and a multi-faceted graphical user interface for displaying multiple applications (and their child windows, if any and if permitted by the application) within multiple facets of one main window. While the present invention can be used for command and control and input to applications within the standard parent-child windows used in current computing systems, the preferred embodiment uses both aspects to implement a speech enabled environment to control and display multiple applications in a single window with multiple facets. The preferred embodiment also uses a context based parser such as a natural language model (NLM) to parse speech initiated commands and data, to route those voice initiated inputs to the required applications, and when applicable to determine if speech input is actual commands or input of data. In summary, parsing is the action of identifying the respective roles of uttered words. In the examples below, the roles that would be determined by parsing sentences appear in parenthesis. For example, a typical command could contain i) an optional statement to get the computer's attention, ii) a Command iii) Parameters (more information the command may need).

Example 1

"Computer, turn on (Command) the front lights (Parameter)."

Example 2

"Email (Command) Peter (Parameter—implied recipient) about his car (Parameter—"about" implied subject)

The System functions by parsing the output to a series of speech initiated commands received by a speech recognition process, such as a speech recognition engine or speech to text engine ("STT"), a series of command sequences are identified and tasks are executed by the System. The speech initiated commands can be composed of any type of phoneme (the smallest unit of speech that distinguishes one sound from another), word or phrase in any language supported by said speech recognition process. In the preferred embodiment, speech is used as an input means together with input received from other devices including a series of keyboard inputs or pointing device movements and clicks. Accordingly, although speech is the preferred means of input to the System, all available means of input are available and can be used to initiate the command sequence. In a preferred embodiment of the invention, hands free spoken commands control the execution of tasks by one or more software applications, facilitate managing multiple tasks simultaneously and allows speech control of all applications known to the System. In the ideal embodiment of the System, the System can be controlled entirely by speech, however, it should be noted that in some instances, it is simply more practical and efficient for the user to integrate the use of speech together with the keyboard and pointing device.

The present invention also provides advances for general graphic user interfaces, separate from speech enabled input. For example, the multifaceted graphic used interface may have independent utility.

3 DEFINITIONS 3.1 Grammar

"Grammars" are used by the speech recognition process to generate human readable and/or binary representations of allowable speech input corresponding to, and associating, actions and commands, the representations being used to functionally process the speech input, and to provide a framework for interpreting the commands. The grammars can be held within a command dictionary, discussed below, or dynamically generated by algorithm or other means.

3.2 Command

A "command" is defined as an instruction that can be acted upon, and may include parameters or associated data.

A command may be structured as a grammar and/or unstructured natural language input. A command may have an enabled or disabled state that may be acted upon based on external conditions.

An example of a command might be "Turn Lights On". An example of content might be text that we are dictating into a document in a word processing application, and in the context of that dictation, the spoken words "Mary asked John to turn the lights on" would be considered content.

3.3 Valid Command

A "valid command" is one that is both known and complete. The command matches an entry in the CD (is known to the system) and all the parameters needed to process the command are present (the command is complete).

3.4 Parameter(s)

A "Parameter" is additional information that is needed to process a command. For example, the command "open" needs something to open. Command parameter attributes are contained in the CD for each command.

3.5 The Command Types

In the preferred embodiment, the system has "command activation statement(s)" (CAS) "system commands," "application commands," "current command application commands" and "dictation commands," each of which is defined below.

3.5.1 Command Activation Statement (CAS)

A CAS is defined as a unique word/phrase/keystroke or the like which alerts the System that a user is planning to issue a command, and can be used to put the system in command mode. For example, the word "computer" can be used as a CAS.

3.5.2 System Commands

In the preferred embodiment, system commands (like the command to launch an application) must be preceded by a CAS. These commands are executed by the System. An example could be "Open Calendar."

3.5.3 Application Commands

An application Command can only be processed by an Application (like the command to dial a number in a phone dialer application) and is only valid within the application for which it is intended, as defined in the CD. Note that an application command like "print" for example, may be valid in many applications, however, each application has defined in the CD which application commands are valid for that application, so a command like "print" will be executed within the CCA unless it is specified as a system command to print something in another application. An exit command may be either a system command (to exit the system) or an application command (to exit the application)

3.5.4 Current Command Application (CCA) Commands

These are application commands for the CCA within content loop. Typically, a CAS is not required before a CCA command when the corresponding application is in Content Loop.

3.5.5 Dictation Commands

A dictation command (DC) is one that does not affect the function of, or control the application it is going into, but rather modifies the data. Typically, dictation commands are managed by the speech recognition engine, however, if desired these commands may be handled by other elements of the system. For example, the system may be able to receive a subset of commands that do not control the system or an application, but generate characters to be input into an application, such as a word processing program. Dictation commands are typically used with the system when an application has SPOCUS and is in a content loop. An example of a DC is the "new paragraph" command in a word processing application that is not data, but modifies the data, in this case text. In this example, the dictation command "new paragraph," results in two characters representing carriage returns being placed in the input stream that is being passed to the CCA as input (instead of the words "new paragraph").

3.6 Commands Dictionary (CD)

The "Commands Dictionary" ("CD") is a persistent data structure or set of data structures that maintains commands and if applicable all the information related to the commands.

3.7 Registered Applications (RAP)

A registered application (RAP) is an application in which the functional elements of each command associated with the RAP have been described to the System in the CD. After an application is registered in the system, the application is "known" to the System.

3.8 Active Applications

An "active application" is a Software Application that has been started by the system and is running. The System can send data to and get data from an Active Application. It is important to note that an application does not need to be visible or have focus in order to be active, and that once the System starts an application, even though it may not have focus or may not be visible, it remains active until the system or the user closes it.

3.9 SPOCUS

"Speech Operational Control User Service" (SPOCUS) is an active attention that is granted by the System to an application, which results in directing a speech input stream to that Application.

3.10 Current Command (CC)

The "Current Command" (CC) is defined as the command that the system is currently processing.

3.11 Current Command Application (CCA)

The "Current Command Application" (CCA) is defined as the application that is processing the current command, or part thereof. For example, some commands require the system to activate and give focus to an application that will receive input of data from the user, such as a word processing application that will receive dictation, and that application then has SPOCUS. Note that it may be possible for one application to execute a command without having SPOCUS, and while another application has SPOCUS. For example, issuing a command to turn on the lights while in a word processing application would process the command without needing to grant that application SPOCUS. Furthermore, if multiple applications share identical commands, when such a command is issued, it is executed in the CCA.

3.12 System State

The System State is where the system may be at any given moment, and for example, may consist of the Input Stream, the Data Construct, what application is the CCA, whether is has a facet and its position, the System Mode (content loop or not), a reference to the previous System State (thereby allowing a "stack" or stack type behavior) and any other contextual information.

The System State can be saved at any given point before the system switches states, enabling the system to suspend applications and processes and return to them later in the same state as they were before they were suspended.

3.13 Current Command Status

This is defined as the status of the Current Command (CC). When the system receives input from the user, it processes that input to search for a Command, which could include a CAS, and the Current Command Status depends on the result achieved when the System processes this input.

In the preferred embodiment, the Current Command Status may be set to "unknown," "incomplete," "system valid," "application valid," "processed," "processed error," or "aborted," "CAS" or CCA Valid." The CC Status may also contain information on the reason for that Command Status, thereby enabling the system to prompt the user for input, guide the user in the command input process, and/or advise the user of the reason for the command status. The following is a brief description of the Current Command Status settings used in the preferred embodiment, although other's may be used in alternate embodiments, depending on the system design:

3.13.1 Unknown

When a command is not found in the input stream, the CC Status is set to "Unknown." If desired, the user can be informed that no command was found in the input stream, and the system can return to Wait Mode.

3.13.2 Incomplete When a command associated with a known command has been found, but the command has incorrect or missing parameters as indicated in the CD, the CC Status is set to "Incomplete" and the user can be informed of and prompted to input the correct or missing parameters.

3.13.3 System Valid

When a valid Command is a System Command, the CC Status is set to "System Valid" and the command is processed by the system. The CC Status of "System Valid" is used only after a command is determined to be valid (known and complete), and prior to processing the command. After the command is processed, its status will be changed to "processed" or "processed error" depending on the outcome.

3.13.4 Application Valid

When a valid Command is an Application Command, the CC Status is set to "Application Valid" and the command is processed in the associated application. The CC Status of "Application Valid" is used only after a command is determined to be valid (known and complete), and prior to processing the command. After the command is processed, its status will be changed to "processed" or "processed error" depending on the outcome.

3.13.5 Processed

When a valid command has been processed with no error, the CC Status is set to "Processed," and the success information may be communicated to the user.

3.13.6 Processed Error

When a valid command has been processed and failed or returned an error condition, the CC Status is set to "Processed Error," and the reason for the Processed Error may be communicated to the user.

3.13.7 Aborted

A command input can be aborted by the user or by the system. When that happens, the CC status is set to "Aborted." A user may abort a command input from a command validation loop with an abort command. The system may abort a command input for reasons including, but not limited to, a predetermined time-out for processing a command having passed, or cycling through a command loop a predetermined number of times without successfully completing a valid command.

3.13.8 CCA

When a CCA command is found while the system is in content loop, its command status is set to "CCA" to indicate that the command should be processed in the CCA.

3.13.9 CAS

The system is always in command mode after a CAS. In the preferred embodiment, when a CAS is used to abort a command input or to leave a content loop for the input of a new system or application command, the command status is set to "CAS" so that the system will be left in command mode when it returns to wait for the next command.

3.14 System Mode

The System Mode can be defined as "the type of data that the System expects at this point". In the preferred embodiment, the possible values for the System Mode are "Wait Mode", "Command Mode", or "Content loop," however alternate embodiments could have more, less or different types of modes.

3.15 The Input Stream

The Input Stream is defined as raw data that the system receives from a speech engine, keyboard, pointing device or other input means. Typically the input stream is stored in a memory location until it is parsed into the Data Construct, as defined below.

3.16 The Data Construct

The Data Construct is defined as the location where the analyzed data from the input stream is kept. Typically it is the result of Parsing the Input Stream. In the Data Construct, Commands and raw text may be identified as such, along with whether they have been processed or not.

3.17 Parsing

"Parsing" is defined as the action of identifying the respective roles of uttered words consists of checking the context of the adjacent words (and gaps) to the possible command.

4 SYSTEM MODES

The System mode is a state that determines how input is processed. In the preferred embodiment, the system has three modes of operation: command mode, content loop, and wait mode.

4.1 Command Mode

Command mode is activated whenever the system detects a CAS. When the System enters command mode, it is ready to accept a command. In command mode, the system will only process commands.

4.2 Wait Mode

When the system is in wait mode, it is idle and waiting for a CAS. In wait mode, anything other than a CAS is ignored.

4.3 Content Loop (Mode)

"Content Loop" is a mode in which the System has granted focus to an application (the CCA) and the System is continually sending the incoming input stream to the application, while testing the incoming input stream for commands that match a CAS or an application command, or data such as text going to a word processing application, or data that belongs in a field of the CCA such as a date in a contact management application.

5 COMMANDS DICTIONARY OVERVIEW

5.1 Command Dictionary

In a typical implementation, the commands dictionary is not a human readable, acoustically accessible or otherwise directly comprehensible distinct set of possible commands, but rather comprises a set of information which define a correspondence between an input and an intended command, and information for resolving ambiguity between the possible available commands. As used herein, it is understood that a "Command Dictionary" (CD) is this representation, and that the phrases "Command Dictionary" or "representation of the Command Dictionary" are used interchangeably.

The speech recognition process may operate using a plurality of command dictionaries, each from a different source, but preferably the available command dictionaries at any time are processed to provide a single optimized decision space. However, the command is preferably provided in a form which facilitates this process as the context changes.

According to one example, a user seeks to make an appointment in a calendar program, which must be identified by the date and time, duration, location, participants (optional), confirmation details (optional), topic (optional), and followup (optional). The user begins by identifying the task, such as "make an appointment" or "new appointment" or "meeting" or other possible inputs. These may all represented in the commands dictionary. The user then (in no particular required order) inputs the other details. For example, the time, date and duration inputs may form part of a first command dictionary, the participants a second, the topic a third, confirmation (and contact details) a fourth, and follow-up a fifth, each with a possible different source of information. Since these details may be entered in any order, or even in mixed order, they are concurrently available; likewise, when entering a participant, an address book application or process may initiate, and may temporarily provide additional commands available, such as "add new entry to address book". On the other hand, once a user starts entering time details, the other commands dictionaries may become inactive based on the determined context of input.

Indeed, the commands "meeting" and "appointment" may have different meanings in varying contexts, and thus the commands dictionary for each respective command may differ, even if the end result could be the same. The make an appointment example—interacts with high level and based on the input and analysis of the input builds the grammar/representation for the next step in the loop.

A "command" can be processed by a command processor, and any input that is not a command or portion thereof, or a command parameter, may be deemed to be "content", and is passed to an application. As discussed above, in some embodiments, a command dictionary may also be employed at a higher level in processing data which may be represented as text and/or parametric information. Thus, at the speech recognizer level, a speech input may be treated as "content" to be passed to a higher level application, but at the application level, this may nevertheless be treated as a command, portion thereof, or command parameter.

An example of a command might be "Turn Lights On". This input could be processed at the speech recognition engine level, to determine if the input represents a command, and to pass that command for processing. This input could alternately be processed at the application level, wherein a speech recognition process passes the literal string "TURN LIGHTS ON", or any other meta-data corresponding and handled at the application level, to a command parser, which employs data of the CD to determine if all necessary parameters needed for unambiguously processing the command are available. An example of content might be text that we are dictating into a word processing document.

Some commands are only valid while in Command mode, others while in content mode, others in all modes. In some embodiments, the speech commands are dynamically available. At some times, it may be desirable to limit the domain of available speech commands dynamically based on commands available to the system at that time.

Higher level attributes for commands are maintained in the Command Dictionary (CD), and the data stored in the CD may include (but is not limited to) what information is needed to act upon a command, how the command is processed, and its impact on the system. By representing the impact or result of a processed command, the system state post command processing may be compared with the represented impact, and thus a failsafe mechanism provided. In some cases, for example, if the processed command state does not correspond to the represented impact, the system state may be reverted. Likewise, the post-command processing impact may be used to adapt the command processing for subsequent inputs.

In the preferred embodiment, commands associated with applications are registered with the system. In the preferred embodiment, an application is registered with the system by adding each functional aspect of the application to the Commands Dictionary, and when so registered it is referred to as a registered application (RAP). Thus, in the preferred embodiment a dictionary (the CD) corresponding to all the commands required for all "known" system commands and application commands is constructed, and that CD allows the System to identify the commands with the corresponding applications, commands, messages, events and methods, and use them in processing speech input from the user. While it is desirable to persistently maintain this information in the CD, some of this information about commands may be generated dynamically as needed.

The process of registering applications consists of updating the CD by adding the necessary entries required for an application and its functional aspects with the System. This can be done by any means that will enter the necessary data for the application in the CD, including but not limited to registering an applications commands in the CD at the time the application is installed, exercising various user interface elements to expose the command and control structures, manually inputting data into the CD, hard-coding it into the System program, or enabling the System to dynamically update the CD at the time of initialization, as needed, or as requested by the user. The process of registering application data and commands in the CD can also utilize a combination of methods, for example, the System can be made aware of an application by an entry in the CD that enables the System to import and append data from that application into the CD at the time of initialization or when data is updated. This is particularly useful with applications such as contact lists, where the application's data changes from time-to-time. Alternatively, a software application can guide the user by helping him or her entering the information into the System.

For Example, one application which lends itself to voice commands is a telephone dialer program. During registration of the telephone dialer application, a series of command structures are registered with the System which correspond to commands and parameters used by the telephone dialer and, and the CD is updated to contain the information from which the commands or their representations are constructed, and from which the speech recognition process builds its dictionary of command representations, relevant to the telephone dialer application. Examples of the required commands could be keywords and phrases or grammars such as: "dial", "call", "connect", "hang-up", "disconnect", "hold", "transfer", "forward", "redial" and the like. Once the application is registered, the System knows about the commands and parameters associated with the telephone dialer program and its functional features. Further, in the case of the telephone dialer, the contact data may be updated dynamically.

The CD is preferably stored in a persistent manner, meaning that the CD survives the System being shut down and restarted. It can be stored in any format typically used to store data that can be read by the system and applications, including but not limited to a file in its own format, a database file, table, or process registration database.

5.2 Structure

The CD is a collection of instances of a data structure, and can be in the form of a database, vocabulary table, process registration database, other database, XML file or any other data structure. Each entry in the CD pertains to a specific command and its attributes. These attributes may vary depending on the command, and may include but are not limited to the following:

1-Grammar
2-Command
3-Command Mode (optional)
4-Context the command is relevant in.
5-Parameters required for completing the command.
6-Impact on System Mode.

7-A reference to another entry for cases where multiple commands must be executed sequentially for a given spoken command.

Depending on the needs of the system, alternate embodiments could utilize other parameters not discussed here.

5.3 Grammar

This entry contains information defining the grammar of the command.

In order to enhance the natural language processing capabilities of the system, the CD can hold multiple entries or series of entries for the same command, effectively having the side effect of maintaining "synonyms" for commands. For example, the user could say "Turn on the living room light", or "Living room light on", or "light up living room". The CD has entries for "turn on", "on", and "light up," and all these commands are equivalent and give the same result.

5.4 Command

When the System finds an entry in the CD that corresponds to a representation of the associated grammar or matching conditions with the recognized text in the incoming input stream related to the System or the relevant application, the value of this field identifies the target of the operation (command) that must be processed. In other words, a Command is the instruction a user wants the computer to process when the user inputs a command.

5.5 Mode

This indicates the System state in which the system searches audio input to determine whether it contains a command. For example, a system command may be valid only while the system is in Command Mode (or it may be valid in all modes), whereas an application command may be valid only while its associated application has focus. Typically, the System considers only the command types that are identified as valid for the current System state. For example, in one embodiment, while in a Content Loop, the system will only consider and process application commands related to the CCA until a CAS places the system in command mode or a command to exit the CCA is received and processed. In certain other embodiments, no such limitation is applicable.

5.6 Application and Points in which the Command is Relevant.

Because the same speech input may correspond to different commands in different applications, or represent a command which is available in a plurality of applications, this field identifies the application(s) to which this command applies.

For example, consider two commands with the grammar "open". One is registered as a Home Control command to open the blinds, the other is registered by a word processing application to open a file. When the system knows the mode it is in and which application is the CCA, it can select which command to execute from the CD. In addition, there may be points in the system, such as where the user is prompted and has only a few choices (such as a prompt to confirm or cancel a command), in which only a few commands are applicable. In such cases, the test for a known and valid command can be limited to the applicable commands only, and a CAS need not precede such commands. Likewise, the command to open a file or perform an action may imply a default application needs to be started if it is not already running. In many instances, a CAS is not necessary, and the mode may be inferred from the context, such as a hiatus of speech input prior to and subsequent to an utterance, or based on a semantic analysis of the input.

This field also specifies whether the Application must be visible, and if it must be given SPOCUS and enter a content loop.

5.7 Parameters Required for Completing the Command.

Some commands require more information about what they should be acting on, and some commands may need to call other commands. This entry enables the system to process complex commands with multiple parts. It enables the system to test if a command is valid and complete, and react accordingly.

For example, the "Turn On" command by itself is not sufficient. Therefore its entry in the CD needs to specify a parameter that meets the criteria of something that can be turned on or off. A dialog mode may therefore provide a prompt to seek resolution of ambiguity or to complete entry of required parameters. Another more complete example is described in Example: "Make an appointment" in Section 6.4.1.

The CD may also specify that parameters must meet certain conditions, for example that the starting time of an appointment time must be some time in the future.

5.8 Impact on System Mode:

Some commands have the capability of changing the System mode or switching focus to another application after they are completed. Often, when an application is done processing a command, it is desirable to return focus to the application that previously had focus. In a preferred embodiment, when it is necessary to return to the previous system state after processing a command, information about the system or application state may be saved prior to processing a command in another application. The information in the CD on the impact that a command has on the System state can also be used to determine whether or not the System state must be restored to the original state after processing the command, however, in some variations, the system may be designed to return to the last application that had focus when another application is closed or removed from focus.

5.9 A Reference to Another Command or Commands.

This information is for cases where one command requires that multiple commands be processed. A parameter that enables the System to call another command or series of commands, or to link commands together enables the System to manage long, varying or complex spoken command statements. An example of a complex command is "Go to bed", which may turn off the lights and the TV, turn down the heat, and set the alarm.

6 FUNCTION OF THE SPEECH ENABLED SYSTEM

6.1 Command Modes and the Command Activation Statement

Once the System is initialized, the System enters a wait mode, waiting for user input. In a preferred embodiment, whenever the System is in wait mode, a CAS must precede a system command statement. Once the CAS is uttered and detected by the System, the System goes into command mode. Once the system goes into Command Mode, it remains there until some condition is met which returns the system to wait mode. This may be a time-out, command to return to wait mode, or the completion of another event, such as the processing of a command. In other embodiments, the CAS may not be required.

As defined previously, a CAS is a unique word/phrase/keystroke or the like which alerts the System that a user is planning to issue a command. For example, a CAS could be a word phrase, such as "computer" or "microphone on", or the computer could simply be placed in command mode by turning on the microphone. A command to return to wait mode could be "microphone off" or a command which puts the computer into another state, such as a mode in which the microphone is used for purposes other than processing commands or entering data. Each CAS is defined in the CD, but in alternate embodiments can also be defined in a separate CAS dictionary.

In an alternate embodiment, the System defaults to command mode until a specific command (like "Dictation") sets it into a content loop or a command (like "standby") sets it to wait mode. In alternate embodiments, the system is in command mode at all times so that input given in the correct context (for example, a pause, followed by a command, followed by another pause) is searched for a matching command. In such alternate embodiments, the behavior of command statements take on the characteristics of a CAS, and if desired the use of a CAS preceding a command is not required, or a CAS such as "microphone on" is used to place the system in command mode, and the system remains in command mode processing successive commands without returning to wait mode, until a command such as "microphone off" for example returns the system to wait mode.

In a preferred embodiment, when the system is in content loop, application commands for the CCA do not require a preceding CAS. In alternate embodiments, it may be desirable to have a CAS precede both system and application commands while in a content loop. In such alternate embodiments, when a CAS is detected while in the CCA, the System waits for input then processes the incoming input stream to determine if it contains a CCA or System command, and if so determines its context. If no command is detected in the input following a CAS, the System may: report an error condition and prompt the user, ignore the incoming input stream, or assume the incoming input stream is content and pass it as data to the CCA leaving the System in content loop with SPOCUS on the CCA. Still other alternate embodiments may not require a CAS preceding any command while in content loop, or the system may remain in command mode after processing a command in order to wait for another command.

6.2 Active VS Visible Applications

All applications that are activated (either in the System initialization process, or by command) remain active until closed. Since the System locates the applications for the user, it is not necessary for an application to be visible in order to process a command.

For example, one application can retrieve data from another application without displaying the other application, or a command (for example, "Turn on the kitchen lights") can be processed without displaying the application that controls the lights.

6.3 The Current Command

As discussed above, when the System determines that it has received a command, the information in the CD indicates which application should be called on to process the command, and what parameters, if any, are required for appropriately processing the command. It should be noted that some commands impact only the system, while others require the system to interact with one or more applications.

If a command is intended to be processed by an application, and the appropriate application is not active, the System starts the application, and that application becomes the CCA and may be displayed in the graphic user interface and granted focus if required or appropriate for user interaction with the application. The CD may also indicate if the application is one that accepts input of data, and if so, the system may enter content loop with respect top that application.

In a preferred embodiment, the System does not execute applications itself, but it requests the operating system ("OS") to execute the applications, and for that the OS loads them in memory, and allocates to them some processing time. However, in some embodiments, the System is a speech enabled operating system and performs this function.

6.4 Complex Commands

Some commands require more information about what they should be acting upon. These commands are called "complex" because they require other information in order to be complete, and this other information and its nature are maintained in the CD. A single spoken command may contain multiple components. In the preferred embodiment, the system is able to manage a complex incoming input stream such as this, identify its components and route them accordingly. A data construct derived from the speech input is analyzed to determine a target application for the input, and the required application is started if it is not currently active. For example, a contact management application might be activated by the input "Open the calendar and show me today's appointments."

In response, the system executes a command to "open calendar" to ensure that the calendar application is active, and a command to "show appointments" to trigger an action within the calendar application. "Today" is an input to the application, which indicates to the calendar application which appointments to show.

The next section further illustrates how the system handles a complex command.

6.4.1 Example: "Make an appointment"

This example illustrates the power of the System's capability to validate complex commands by identifying and prompting for missing parameters. The complex command "make an appointment" that is handled by a "contact management" application has an entry in the CD that also indicates that it requires four parameters (although there could be other parameters) as follows:

The person's name.
The date of the appointment.
The start time of the appointment.
The end time of the appointment.
The user may enter the command as:
User: "Make an appointment with John Smith on Tuesday at 8:00 AM."

However, in this case, the command is a known command (make an appointment) but it is not a valid command because it is missing an end time and is thus not complete. In this example, the system will prompt the user for more information:

System: "Please provide an ending time for your appointment."

If the user responds with a valid ending time (a time that is later than the start time of the appointment) the system will process the command by sending it to the contact management application. If not, the system will continue to prompt the user for a valid ending time until one is provided or the command is aborted.

There may also be other criteria required by that command, for example, the person's name being in the contact list, the date being equal to or later than the current date, the start time being later than the current time, and as discussed above, the end time being later than the start time. The system could also require other parameters or relationships of parameters as well.

Carrying this example further, when the user is prompted to supply an ending time, and responds with "eleven am," this will result in the command statement being validated and processed. But if the user responds with "Wednesday" or "seven am" that input does not meet the test for a valid ending time, and in the preferred embodiment the user would again be prompted to supply a valid ending time for the appointment. Similarly, the system tests other parameters in the same way, for example verifying that the contact's name is an entry in the contact manager, that the date of the appointment is the current date or later, and that if the appointment is on the current date the start time is later than the current time.

In summary, in the command example described above, the system receives the incoming input stream which is analyzed based on the CD to determine which application the stream should be routed to (the contact manager), starting the required application (if it is not currently active), initiating a command which is recognizable by the contact manager (which is now the CCA), and giving the contact manager the parameter (today) that it needs to process the command (to show today's appointments).

Another example of a complex command (in this case, one that is processed exclusively in the CCA in a content loop) is "save and print document" which, results in the current document in the CCA being saved (one CCA command) and printed (another CCA command).

6.5 Processing Commands 6.5.1 Acquiring User Input

In a high level processing schema, a user input may be processed by acquiring the data from an input stream (for example the output of a speech recognition process or speech to text engine or the input from keyboard or mouse click), and the data parsed into a data construct so that the system can act upon that data. The data construct can be kept in a memory queue, a memory address, a register, an operating system pipe, a shared memory area, on a hard disk drive or any other means of passing data from an outside resource into a program. In instances where the system has been integrated together with the input stream processing program (for example, a speech recognition process, the input stream can be passed directly into the System in memory. In any case, the data elements received from the acquired input stream correspond to the data which is being supplied by the primary interface (i.e. in the preferred embodiment, the microphone providing input to the speech recognition process engine which in turn is processed and passed to the System as text or other type of input that is usable by the System).

6.5.2 Parsing

In a preferred embodiment, the Input Stream needs to be processed into data in a form in which that data can be used by the System, and this is done by parsing the input stream into a context-based data construct, and storing it in a memory location.

In this preferred embodiment, a natural linguistic model is used parse the speech input into a context based data construct in order to enable the system to determine if the possible command is within the scope of the adjacent words. The linguistic model is used to tag verbs, nouns, adjectives etc. However, in alternate embodiments, other forms of context-based analysis could be utilized. Parsing is well defined in the art, and need not be discussed in more detail here.

It is also important to note that testing the input for commands, and further testing of commands for context, enables a CAS or command to be spoken in a context unrelated to a CAS or command. By reviewing the locus of words around a possible CAS or command and chronology, the context may be determined and an appropriate action taken. Accordingly, the System will not mistake input that contains a utterances corresponding to a CAS or command, if the utterances are spoken in the context of a sentence. For example, if the CAS is "Hal", the statement "Hal needs lunch" is to be passed on to the CCA as text.

One criterion for identifying a CAS or a command can be the presence of a pause or brief silence of predetermined length before and after speaking the CAS or a command. If no pause or silence is detected, the speech input is assumed to be part of the content. If the speech input is preceded and followed by silence, it is likely to be a CAS or a command. In alternate embodiments certain commands, like dictation commands, will always be executed as commands. Other embodiments, the context is determined by testing elements of the input stream preceding and following the CAS or command to determine if they are within the context of the sentence being spoken, and a CAS or command not in context is processed as a CAS or a command.

6.5.3 Validating the Command

After a command is determined to have been received, it may be one that has a non-trivial CD entry, and requires further validation. To validate a command, the System refers to the CD corresponding to the command matching the one found in the Data Construct. The CD entry for the known command indicates the required parameters, if any, and the data construct is further tested to determine if these parameters are all present and valid indicating a valid (known and complete) command. If it is determined that the user stated a valid command, the command is processed. Otherwise, the system will prompt the user to input the missing information (see below, Section 6.5.4 "Processing (validating) an incomplete command." In other cases, a command may be received which, for example, has a trivial CD entry, and therefore the determined existence of the command itself is sufficient for processing.

In variations of the preferred embodiment, the CD can be organized by command groups, or into different tables or dictionaries with limited command sets. This is useful when the system is working in an application or process with a limited set of commands, or when the system is being used in a task or manner where there is a limited field of possible commands. For example, when the system is in a dialog which displays "Cancel" and "Continue" as the only two options, then there is no need to search representations of all possible commands for a matching command when the user provides input in response to the dialog. It is only necessary to search audio input for the commands that are currently available, in this case "Cancel" and "Continue" which are the only two options available in this dialog which currently has focus (active attention). Likewise, when using a calculator application, only the subset of commands related to the calculator and whichever system commands are then currently available need be considered and other commands, such as the commands used by a home automation application, for example, do not need to be considered while the calculator is the active application. If this method for organizing the CD is employed, then when processing input in these cases, the system searches only the representations of the applicable portions of the CD, (or the applicable CD or table) for a matching command, rather than searching the entire CD.

Another method for achieving this is to create and register a representation of a grammar that has the available commands based on the system state, and to do this each time the system state or user interface changes and/or or is refreshed. In some cases, the visible dialog menus of an application are dynamically organized. For example, Microsoft Office 2003 provides pull-down menus which include most likely or most frequently used options. In theory, by limiting the number of options, presented to the user, the search time to find the desire selection will decrease, while the ability of the user to target a desired selection using the interface is enhanced by the limited number of choices. In like fashion, the speech recognition process(es) may employ a reduced or focused set of available choices, which will likely improve the discrimination between the choices and thus improve accuracy.

Thus, the speech interface may be responsive to changes in the visual user interface, but the visual user interface may be responsive to alterations in the status or context of he speech user interface. The interaction between these may be controlled at various levels, including the process, application, operating system or speech processing components. In the preferred case, the interaction is controlled at the operating system level, using application API features, and thus would be compatible with applications which are both intrinsically speech enabled and those which are not.

6.5.4 Processing (Validating) an Incomplete Command

There are many reasons why a command statement may be incomplete. Most often it is because the user has spoken a command with incomplete or incorrect information (missing, incomplete or incorrect parameters), but it can also be the result of a speech recognition error caused by many possible factors including but not limited to the user not speaking clearly, not speaking into the microphone or background noise. Or maybe the system just didn't correctly recognize all the words spoken by the user.

When the step of searching finds a known command, but which is incomplete, meaning the incoming input stream did not contain all of the required parameters needed for that command, or otherwise not appropriate for processing, there are a number of possible options. These options include but are not limited to: returning to wait mode, reporting an error condition, or as in a preferred embodiment, reporting an error condition and prompting the user to input the missing parameters and cycling through at least one loop to retest the Data Construct for a valid command. This permits the system to process and manage complex commands that contain incomplete or incorrect information, and compensate for errors in speech recognition. The system may also present a confirmation dialog to the user, presenting the command and the available information, along with a prompt for the missing, incorrect, inconsistent or ambiguous information. How this works is best illustrated in the Make an Appointment Example in Section 6.4.1.

This process of prompting can be accomplished by cycling through one or more loops, recursive calls or other algorithms, and can take place at various steps in the system according to the design of the embodiment as will be shown in the discussion of the Figures in Section 9.2. As the user supplies additional input, the parsing process refines the data construct by parsing additional input into the data construct then re-testing the data construct for validity. This process continues until a valid command statement is found in the data construct, or the user aborts the command input process, which can be done by issuing an abort command, a command activation statement (CAS), a new command, or by any other manner which may be desirable for aborting a command input such as a time-out, reaching a predetermined number of cycles without finding a valid command, or the occurrence of other predetermined events.

By being able to identify and prompt for missing command parameters, the system guides the user through the input of complex commands, which would otherwise fail, and the system is able to build a valid command. An example is the command statement: "open the garage door and turn on the lights." Depending on entries in the CD, this could result in the garage door being opened and all the lights being turned on, or in the user being prompted for which lights to turn on.

In alternate embodiments, the process of prompting the user for additional information can be done in various ways and at various places throughout the process, the object being to enable the system to help the user to complete the input of a command statement that can be validated and processed by the System, or return the user to a point where he or she can restate the command or state a new command.

For example, in alternate embodiments, when a command is recognized, but determined to be incomplete, the system can start over requiring the user to repeat the entire command; it can re-validate only the missing information when the user is prompted and supplies more input (instead of adding new input to the data construct and re-testing the entire data construct); or simply inform the user or return to wait mode without taking any additional action.

In yet other alternate embodiments, recursive functions or recursive functions combined with looping functions can be used to validate known commands that have missing or incorrect or inconsistent parameters. In one such alternate embodiment, the system uses recursive functions that each call for a piece of missing or incorrect command component. For example, this recursive function can operate in the following manner: If there are N missing/invalid parameters, the system launches a recursive function that launches itself again, until N functions have been launched, each such function being designated to prompt for and receive one component of the missing/incorrect parameters. After all the functions have been launched, the last one launched prompts the user for the parameter for which it is responsible, and when that parameter has been received, validated and entered into the data construct (or aborted by the user or a predetermined condition), the function exits, returning to the previous function which does the same thing for its designated missing/incorrect parameter, and this process continues until all the instances of the function have exited, so long as none of them was aborted, and the command is thereby validated (known and complete) and ready to be processed.

In variations of this alternate embodiment, the recursive functions may be required only to prompt for and collect input on missing/invalid parameter, and once all the functions have returned, the user input received from each is parsed into the data construct, and the data construct is again tested for a valid command. If the data construct still has missing or invalid or inconsistent parameters, the system cycles through another loop and this process of launching recursive functions repeats itself. This looping process continues until the command is validated, or is aborted by the user or by the system after meeting a predetermined condition (typically exceeding a predetermined time or number of loops or a time-out condition occurs).

The dialog may also prompt the user to supply all missing, incorrect or inconsistent information in a unitary process, and parse the received result to determine whether the received information satisfies all validity conditions. If not, the user may be prompted again. If the prompts do not yield progress toward resolution of the validation process, the system may then revert to a set of serial prompts seeking single parameter or issue resolution.

6.5.5 Routing the Current Command

In a preferred embodiment, if a command applies only to the system, it will be processed by the system. If not, and if the command applies to the CCA, it will be processed by the CCA. If not, and a command is valid for only one application, the system will send the command to that application. If a command can be processed in more than one application, and none of those applications are the CCA, then the system will prompt the user to select which of the valid applications will receive the command. If an application in which a command must be processed is inactive, the application is launched before processing the command. This sequencing priority enables the system to manage commands that are valid in multiple applications, for example "open" that can open the garage door in one application, and open a file in another application. In alternate embodiments, instead of, or prior to, having the user select which of the candidate applications will process the command, the system searches for an application in which the command is valid. For example, if two applications can process the "Open" command, the command "Open Garage Door" is not be valid in a word processing application, and the system will select the application that can open the garage door. In this alternate embodiment, if the system fails to find an application that can successfully process the command, then the user can be prompted to select the application.

6.5.6 Processing the Current Command

In accordance with one embodiment of the invention, a focus (an active attention) is granted to the current command application (CCA), which is the application that corresponds to the Current Command (CC). In the preferred embodiment, when the System has determined that the current command (CC) is valid (known and complete), the associated entry in the CD indicates whether the CC is a System Command or an Application Command, and if applicable the application that is associated with the CC, in which case the application is referred to as the current command application (CCA).

If the CC is a valid System command, the CC it is processed by the system.

If the CCA is not already active, it is started, and if applicable, the CCA may receive the focus, although some commands can be processed in the background without the need for giving the application focus. Some commands may result in focus being granted to another application, while in other instances a command may be processed while focus remains with or is returned to the previous application after the command is processed.

If the CC requires the CCA to be visible, then the CCA is made visible and in most instances the CCA is granted focus.

If the command calls for granting SPOCUS to the CCA, which may be independently granted from a known graphic user interface or operating system focus, the system grants SPOCUS to the CCA, and speech input is then directed to the CCA. Indeed, separate applications having SPOCUS and focus, respectively, may be concurrently active and receive separate user inputs, without mutual interference. In some cases, the CCA may be adapted to receive speech input as a native data type, or the CCA may directly interact with the speech recognition engine. Therefore, once SPOCUS is granted to the CCA, the system may curtail processing of commands in the speech input, and cease processing speech as data. For example, the system may be reactivated to a normal mode by requiring a specific CAS, and otherwise be idle. For example, this may be useful when it is desired to process sound as other than speech input, or when the application having SPOCUS is capable of processing its own speech input.

Still in other instances, it may be desirable for the system to direct speech input to the application which has focus, and if a command is not found in the input stream, to pass the input stream as text or sound data by default.

If the CC is an Application command, the CD contains the information the System needs to determine which application can process the command. Typically, an application command is executed in the CCA, and if two applications share identical commands, the CCA will have priority. However, some application commands may require the system to switch to another application. In such instances, depending on the nature of the command, the other application may or may not receive the focus, and after processing the command the focus may remain with the new application (in which case it becomes the CCA) or return to the previous CCA.

6.5.7 Managing Commands that Fail at the Application Level

There are instances where a command may be known to the system to belong to an application, and may have the necessary parameters to be a valid command, but where the command may fail at the application level. For example, in an application that turns on the lights, the system may not always know which lights can be turned on by the application. So a command to "turn on the garden lights" may be validated by the system since "turn on" is a known command, the parameter "light" belongs to the application that turns on the lights, and there is an additional parameter naming a light that can be turned on ("garden"). This command is valid at the system level, but if the "garden lights" are not known to that application, then the command will fail at the application level. When this happens, typically the application will generate an error message (although some applications may do nothing). In variations of a preferred embodiment, there are numerous ways the system can deal with this. Some examples include closing the command and prompting the user to issue another command, reporting the error condition (which may be done by either the system or the application) and prompting the user to restate the command, granting SPOCUS to the application or its child window so the user can interact with the application and its prompts, enabling the user to modify and retry the command, or providing the user with the option to process the command in another valid application. In some variations, the system may be designed to accept and process the output from the application thereby enabling management of failed application commands at the system level. These examples are not intended to be all inclusive or limiting, and are intended to demonstrate the flexibility in which the system can be designed to manage commands and applications where, as with a command that fails at the application level, some of the functionality falls outside the scope of the system. When in a content loop associated with an application, a preferred method is for the system to set an error condition, where the processing of the error condition is done within a loop that is handled by the CCA, or in a new stack managed by the System. Since the possible command choices are typically limited to only one or a few commands required by the error condition, when the user responds, the system searches the input only for the applicable commands, and the error condition can be processed without requiring a CAS to precede such commands.

It is possible to have nested (recursive) loops, overlapping loops, and repetitive loops. Further, in a data-driven architecture, the process of waiting for a valid or complete data input may be a different paradigm than a traditional software loop, but it is understood that this accomplishes the same end result and will be encompassed under the term loop as used herein.

6.5.8 Granting SPOCUS to the CCA

Typically, when an application has focus, keyboard, mouse and speech input are directed at that application. When the Current Command (CC) calls for the System to grant SPOCUS (Speech Operational Control User Service, an active attention) to the CCA, and commands and data resulting from speech input are directed at the CCA. Although only one application may have SPOCUS at any given time, one application may have SPOCUS while the other has focus, or the same application may have SPOCUS and focus. Likewise, the application having SPOCUS may be in a content loop, in a preferred embodiment, all active applications and their corresponding facets (if any) remain known to the System as active. The System is able to switch to any one of the active applications or activate other applications if a command so requires, and the System can grant SPOCUS or focus to, and can send and receive data to and from any one of the active applications if it is determined that the incoming input stream should be routed into a particular application. Likewise, the System can retrieve data from any one of the active applications.

Because the speech input from a single user represents a single stream, which may include data intended for the application and commands for that application. If the system were to try to analyze speech input for multiple tasks, inconsistencies and errors are quite likely, and further, this is non-ergonomic, since a normal user will typically address language commands or data to a single task at a time, and then redirect his focus to another or a subsequent data or command task. Therefore, this SPOCUS model of interaction is consistent with user expectations, and will result in lower user errors and system errors. It is understood, however, that granting SPOCUS or focus to a single process or application, and analyzing the speech input in the context of that single application or process, is not a technological limitation of the present invention, and as appropriate, the speech input may be subject to a plurality of simultaneously active analyzers, each with its own properties, and to determine whether they are intended to be invoked.

As discussed above, since all applications are still active, the System can send data to or receive data from any one of the active applications. Thus, the system branches into other applications (which then become the CCA when they have focus) without closing the current CCA), and the System can return to any application in the same state where it was left because the System state was saved before switching out of that application. Typically, the System remains always active and monitors the acquired input stream, so the System can receive a command (preceded by a CAS in a preferred embodiment), which is outside of the CCA, (a system command or an application command from any application known to the System). Upon receiving this command, the system activates another CCA, granting SPOCUS to the new CCA, and executes the other application. When the subsequent application or process is closed or sent into the background, the system may return SPOCUS back to the previous CCA. The system can perform this recursive type of behavior over a plurality of CCA's.

6.5.9 The System Mode and Focus or SPOCUS after Processing a Command

With some commands, it is desirable for the system to return to its previous state after the command is processed. The system mode after processing a command is specified in the CD for each specific system command, although it could be defined elsewhere in alternate embodiments. This can depend on what the system was doing prior to the command statement, and the nature of the command statement itself.

Typically, System commands will either leave focus or SPOCUS to the application that had focus or SPOCUS prior to the command (processing the command in the background), the application associated with the command, or grant focus or SPOCUS to the application while processing the command and return to the previous application. For example, the command statement to launch a second application while focus or SPOCUS on a first application (the CCA) typically leaves the system with focus or SPOCUS on the second application and it becomes the CCA.

Other commands (such as a command to turn on the lights) are processed and the System returns to its previous state (either wait mode or the CCA that had focus or SPOCUS before the command). Sometimes, these commands can be processed in the background, giving the appearance that the CCA before the command was executed never lost focus or SPOCUS. For example, while in a word processing application, the command to "turn on the kitchen lights" may be processed in the background, thereby leaving (or returning) return focus or SPOCUS to the word processing application after processing the command.

Typically, Application commands will leave the system with focus or SPOCUS on the CCA. Exceptions include when is an application command to exit the application (the CCA), or an application command that temporarily switches to another application.

Some commands can operate as both system commands and application commands. For example, the system command to open a file will give focus or SPOCUS to the application designated for that file type and result in the desired file being opened in that application, while the application command to open a file while in its associated CCA, will open the file and leave the focus or SPOCUS on the CCA.

Dictation commands affect only data that is being placed in the CCA, and typically do not affect the system mode. A dictation command results in the dictation command data being generated and placed in the data at the appropriate point where the dictation command is spoken.

In some systems, a cue may be used to determine whether or not the system processes speech input as speech commands or data, or even to which application the speech input is to be directed. For example, a video camera may be provided which is directed at the user, and determines which facet or window the user is looking at or pointing at. Likewise, if the user is looking away from the visual user interface, the processing of speech by the system may be suspended. Other cues which may alter the treatment of speech input may include a room occupancy sensor, telephone ringing or use, keyboard or pointing device input, or environment. For example, in a vehicular speech recognition control system, the context of speech input can be determined based on vehicular data, such as speed, traffic, steering inputs, detection of increased stress in the user's voice, or vetronics system data, and the speech input processed accordingly, for example to present default options which are more probable based on the environment, or to limit options which are unsafe or unwise.

6.5.10 Clearing the Data Construct

Typically, it is desirable for the system to clear the data construct when a CAS is spoken, when a command has been processed successfully, or when a command input is aborted by the user or by the system when a predetermined condition for aborting a command input is met. If the system is designed to process multiple commands per input stream, it may be desirable to clear data associated with each individual command after that command segment is processed or aborted. In alternate embodiments it may be desirable not to clear the data construct, to clear the data construct upon other conditions being met, or to save the data from each command input stream in a separate memory or persistent storage location. If the latter is employed, other conditions may be used to limit the space occupied in memory or persistent storage by the stacks of stored data constructs, for example limiting the size of memory or storage used, and/or limiting the number of stacks to a fixed value.

6.5.11 Saving and Restoring the System State

In a preferred embodiment, if it is necessary to switch focus or SPOCUS from one application to another in order to process a new command then return to that application at a later time, the state of the system with respect to the application which has focus or SPOCUS is saved in a memory location before placing focus or SPOCUS on the succeeding application. When returning to the application that formerly had focus or SPOCUS, this enables the system to restore its complete State back to what it was at before switching focus or SPOCUS to the other application. The result of saving and restoring the system state can be compared to how systems of the prior art switch focus or SPOCUS between application windows, returning to an application in its previous state when an overlapping window is closed or minimized. However, alternate embodiments may employ other means to return to an application in its previous state after processing a command. For example, a new command can leave focus or SPOCUS on its application requiring the user to issue another command to return to the previous application, or the task can be left to the operating system.

6.5.12 Resolving Commands Ambiguity

In some cases, a given speech input may correspond to more than one command in the system. When such ambiguity exists, it may be desirable to prompt the user and let the user choose which application to use, or it may be desirable to let the system decide which application to use by assigning a predetermined order in which applications will have the priority for processing such commands. This is important, because the System will consider the command as successfully processed whenever any application has successfully processed a command. So if a command can be successfully processed in more than one application (or the system and two or more applications), the disambiguation provided by subsequent user input, or the order in which the system seeks to process the command (system, CCA, active application, inactive application) will ultimately determine which application will process the command.

For example, a command may be valid only for the system, for the system and one or more applications, for only one application, or for more than one application. If the command is valid for one or more applications, the application may have focus or SPOCUS, be active and visible, active and not visible, or not active.

When a command is valid for the system and at least one application, or when a command is valid for more than one application, some factors that may be considered in determining the priority for which command processor will process the command will include:

If there is ambiguity, should the user be prompted to provide disambiguation information?

If the command is valid for the System, should the system always have the priority at processing the command?

If an application is the CCA, should it have priority over other applications?

Should a visible active application have priority over a non-visible active application?

Should an active application have priority over an inactive application?

If the command is missing parameters for one of the applications, does the System try the command in the other application instead of trying to complete/correct the command?

When does the system prompt the user to complete/correct the command?

Should the system prompt the user to make a choice when there is more than one possible path for processing a command?

Determining the priority by considering each these questions (and possibly others) enables flexibility in designing how an embodiment of the system will process commands which are valid in multiple instances, and can automate the process to minimize the need for user intervention. In a preferred embodiment the system implements the priority algorithm by answering yes to each of the questions above, and "the last" to the last question, although alternate embodiments could follow looser or stricter rules, or command-dependent rules, depending on the needs that the system is designed to meet.

6.5.13 Resolving Command Ambiguity vs. Resolving Command Completeness

It should be noted that resolving command ambiguity differs from resolving command completeness.

Typically, disambiguation tales place at a lower level and involves a command that can be processed in more than one target, prompting the user to select a target for the command from amoung the possible targets, and processing the command based on the input provided by the user.

Whereas resolving completeness typically takes place at a higher level and involves prompting the user for elements of missing information to build a completeness, and processing the command when the user has supplied all the necessary components of information needed to successfully process the command.

6.5.14 Processing an Input Stream that Contains Multiple Commands

Typically, the system is designed to accept one command per input stream, and multiple commands are input one at a time, however it may be desirable to allow the user to input more than one command per input stream. Note that this differs from a single command with multiple parameters. For example, the command "open document (name) and show me today's appointments," could require both a word processing application and a calendar application. As shown in more detail in the discussion on FIG. 6G, alternate embodiments of the system can be designed to manage multiple commands in a single input stream by identifying the number of known commands in the input stream, and validating/processing each known command parameter individually, or validating all the known command parameters then processing all the valid commands that have been identified.

6.6 The Content Loop

Some commands require the system to activate and give focus or SPOCUS to an application that will receive input of data from the user, for example a word processing application that will receive dictation. When a current command (CC) has activated or given focus or SPOCUS to such an application, it becomes the CCA, and the system may enter a Content Loop with respect to that application. If focus and SPOCUS are granted to different applications or processes, then there are potentially two different CCAs, $CCA^f$ (focus) and $CCA_s$ (SPOCUS). Indeed, this schema may be extended to a larger number, with different applications receiving or processing user input from various sources. Typically, with a single user and a consolidated multimedia user interface, focus and SPOCUS will be granted together, while in a dispersed user interface, or one in which the graphic user interface is not the primary interface, the two may diverge. Focus is at a low level interacting with the speech engine and SPOCUS is at a high level interacting with the system.

The incoming input stream is analyzed to determine which application the stream should be routed to, starting the required application if it is not currently active, and initiating a command which is recognizable by the word processing application which becomes the CCA. For example, a word processing application might be activated by the user uttering the command "Open the presentation text document." This phrase is parsed (divided up into system/application related pieces) as a command to "open the word processing application" which is a System Command that initiates a CCA (the word processing application) and starts a Content Loop (in accordance with the parameters in the CD for the command "open—text document").

After the system enters a content loop, subsequent input is generally routed to the CCA while continuing to parse and test components of the incoming input stream for commands indicating a CAS, a system command an application command, or a dictation command. Any data that is determined to be content is passed to the CCA to be placed in the required field of the CCA. If a command is found in any segment of the incoming input stream, it is further tested to determine whether it is an actual command, or content that is within the context of the input (data). In a preferred embodiment, this is done using a natural linguistic model to determine if the possible command is within the scope of prior and subsequent words. The linguistic model is used to identify parts of speech, such as verbs, nouns, adjectives etc. and then by checking the context of the adjacent words to the possible command, which may include periods of silence indicating a pause preceding and following a command. Such periods of silence, such as a pause in dictation before and after a command, can be one of the preferred means for determining whether or not a command is within context of dictation or an actual command.

If a command is not within the context of the input, then the system determines if the command is a CAS, an application command, or a dictation command, and the command is processed accordingly.

While in a preferred embodiment, a natural linguistic model is the preferred means used to determine if the possible command is within the scope of the adjacent words, in alternate embodiments, other forms of context-based analysis or linguistics models can be utilized. Other methods include determining if a command is spoken in the course of continuous dictation, for example without a pause before or after the command, which indicates it is intended to be part of dictation.

When in Content Loop, the System continuously processes the incoming speech input in this way until it is instructed to abort or suspend the Content Loop by either an exit CCA command or a CAS that sets command mode, which is usually followed by a new command switches focus to another application. Alternatively, the CCA can be exited with a CAS followed by a System command to close that CCA, however, typically a CAS is used to precede a new command that switches focus or SPOCUS to another application.

6.6.1 Processing Complex Content

When the system is in Content Loop, an incoming input stream can (and with a complex or multiple part commands, usually does) contain more than one command and/or component of data, for example, "save and print document" which will return from the Parse Complex process (S900) as two components that are CCA application commands and will result in the current document being saved (one command) and printed (another command). As another example, the above input stream could have included text to precede the two commands, in which case there would have been three data components, text to be inserted into the CCA and two application commands save and print.

6.6.2 The Content Loop and the CAS

In a preferred embodiment, when the system is in content loop, application commands for the CCA do not require a preceding CAS, however, a CAS must precede a system command or a command intended for an application other than the CCA. In alternate embodiments, it may be desirable to have a CAS precede both system and application commands while in a content loop. In such alternate embodiments, when a CAS is detected while in the CCA, the System waits for input then processes the incoming input stream to determine if it contains a CCA or System command, and if so determines its context. If no command is detected in the input following a CAS, the System may either report an error condition and prompt the user, ignore the incoming input stream, or assume the incoming input stream is content and passes it as data to the CCA leaving the System in content loop with SPOCUS on the CCA. Still other alternate embodiments may not require a CAS preceding any command while in content loop, and all input is tested for both system and application commands.

However, while the System is in a content loop, a CAS does not need to precede an application command statement or DC. In alternate embodiments, a CAS may have to precede application commands or a dictation command (DC).

In alternate embodiments, the content loop can take place as part of the parsing process in command mode, or the system can simply ignore the input if a command is not detected after a CAS, in which case the system can return to wait mode without any further action.

6.6.3 Dictation Commands in Content Mode

On a system that uses a speech to text engine, the speech to text engine may include dictation command capability. However, there may be instances where the speech to text engine or the CCA do not support dictation commands, or where it may be desirable for the system to incorporate this function, and to have the system generate dictation command data (characters) and place those characters in the data to be passed to the CCA. For example, the dictation command "New Paragraph" is not a system command or application command, but rather inserts two line breaks in place of the command words "New Paragraph." The processing of dictation commands is shown in optional steps S914 and S915 in FIGS. 9A and 9B, which illustrate the enablement of an embodiment of the system which supports dictation commands.

7 The MFGUI

In addition to being speech enabled, the preferred embodiment combines another aspect of the present invention to manage the display. This is referred to as the Multi Faceted Graphical User Interface ("MFGUI"). As discussed above, the MFGUI seeks to overcome the limitations of current technology that uses individual windows for each application, which inhibits easily viewing more than one application and its contents simultaneously, and can result in a cluttered display when too many windows are open and piled on top of each other. Accordingly, a windowed environment that requires a mouse and keyboard to navigate windows is not best suited for use with speech, and it will become obvious from the following discussion that the MFGUI of the present invention is ideal for a speech enabled environment.

7.1 MFGUI Overview

From a visual standpoint in a Windowed GUI-based operating system the MFGUI appears like a "high-level window". In these Operating Systems a high-level window is defined as one that is not a child of any other window, with the exception of the "desktop window". The desktop window has no parent window and acts as a "shell" by making child windows out of the applications placed within. According to one embodiment of the invention, the MFGUI bypasses the normal application Operating System and directly uses the graphical capabilities of the hardware. Therefore, by making the MFGUI occupy the entire display enables the use of the MFGUI as the main user interface on a computer system, fitting the widely accepted definition of a "shell". But in a Windowed GUI-based operating system the MFGUI could also be one of other high-level windows, living side-by-side or together with other applications on the computer display.

In one alternate embodiment, the System is used as a speech enabled operating system, and the MFGUI is the main display, functioning as the desktop. In yet other embodiments, multiple MFGUI windows can co-exist and applications are called into view by calling their respective MFGUI window. This latter embodiment lends itself to grouping applications, and navigating between MFGUI windows to view those applications. For example, in a word processing application and all of its open documents could reside in one MFGUI window, while the components of a contact management application could reside in another.

7.2 MFGUI Facets

The use of a single window display with a plurality of facets divided into a plurality of distinct viewing areas called "Facets" (FIG. 14) enables users to view multiple applications at one time .time. The active facets of the MFGUI are "tiled" sub-windows and are all maintained within the confines of that MFGUI window. Even when additional applications are activated subsequently, the configuration and number of the facets in the MFGUI may change, but no additional high-level windows ever appear. Moreover, once an application is activated, it remains active until closed, even when subsequent applications are activated and take their place in the MFGUI. However, as with all GUI environments where more than one application may be running, even when all facets of the MFGUI are occupied by an active application, only one facet can receive the input focus at one time, and that is the facet that contains the CCA.

Each facet of the display area has an independent application taking its input therefrom and routing its outputs thereto, and applications and their child windows move in and out of the facets to accommodate other applications. Applications that move out of MFGUI can close, or can remain active in the background waiting until they are called upon to return to the display. All activated applications can run simultaneously to provide the appearance of multitasking, and applications can be used in any sequence in order to execute commands, and an application can be used without the need for the application to appear in the MFGUI.

The number of facets and the size and shape of the facets within the viewing area are fixed at three in the preferred embodiment as in the example shown in FIG. 14. Although it is understood that any number of facets and configurations can be utilized, it is preferred to use a maximum of three facets at a time. The human brain can handle three facets at a time without taxing the users. An excessive number of facets creates cluttered view, and will eventually result in too many small facets where it becomes difficult to keep track of the information displayed in each application. Likewise, the prior art methods are difficult for users to deal with because parent/child windows appear one on top of another, creating an obscured, cluttered look to the screens. In the present invention, each display area corresponds to one of the active facets, which are all part of a single high-level window.

However, in alternate embodiments the number of facets and the shape, size and placement of facets can be fixed at a different value or variable according to the design of the system, preferences of the user and the number of active applications. When variable facets are utilized, as other applications are activated, each facet can also reshape (or morph) itself to bring a new application into one of the viewing areas. In the preferred embodiment, as the System State and context of the user input changes from one application to another, the System manages applications within the MFGUI and its facets to accommodate what is needed to accomplish the task. In some embodiments, the facets in the MFGUI are dynamic and change in number, size and placement according to the needs of the applications in use.

In the preferred embodiment, the System does not load applications into the MFGUI, the System requests the operating system ("OS") to execute the applications, and for that the OS loads them in memory, and allocates to them some processing time. However, in alternate embodiments, the System could function as a speech enabled operating system and perform this function.

8 BRIEF DESCRIPTION OF THE FIGURES 8.1 Overview of the Figures

The Figures shown here are not meant to be limiting, but rather, in designing the system, different components can be combined with each other or modified in order to achieve desired design and functionality for the System. The steps shown in the various Figures can be used in different combinations to create other alternate embodiments.

FIG. 1 is a flow chart showing an overview of the system main process in the preferred embodiment. All subsequent flow charts are elements of the system main process shown in FIG. 1.

FIG. 2 is a flow chart showing system initialization.

Figure 7C:
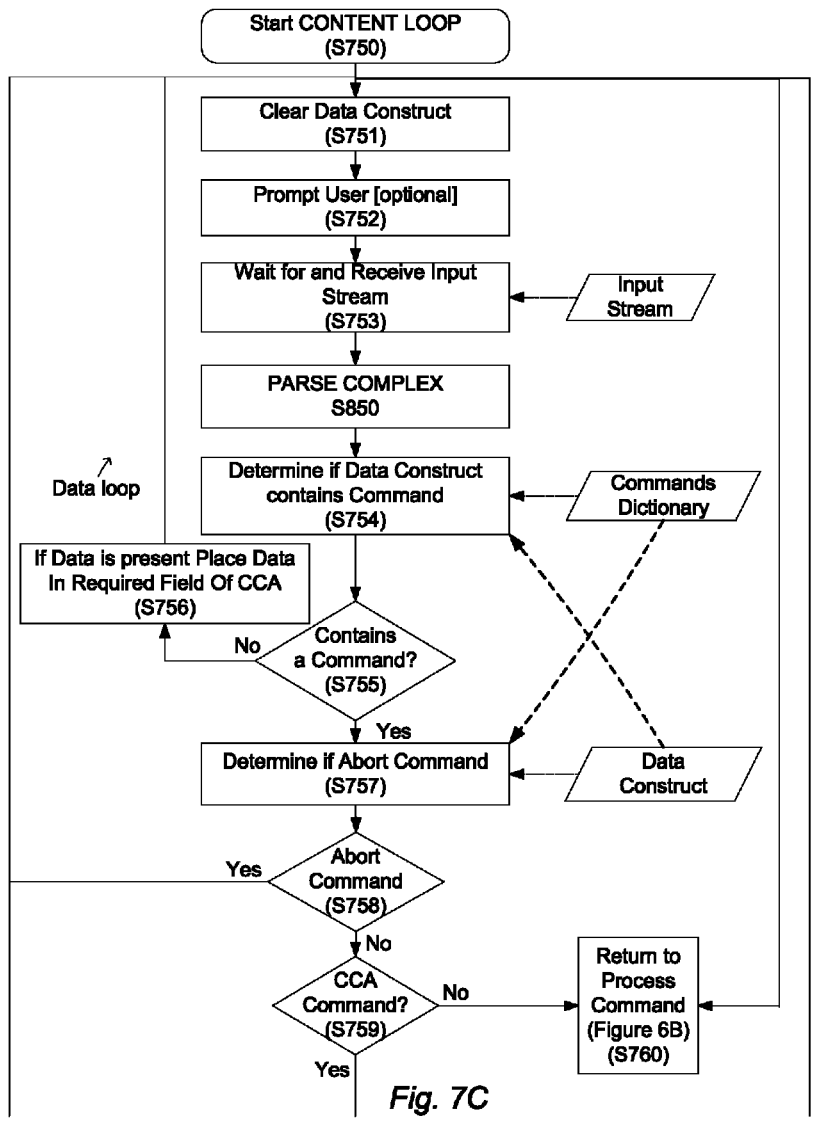

FIG. 3 is a flow chart depicting the activate system. At this point the system is active, waiting for and ready to process user input FIG. 4A is a flow chart of the preferred embodiment showing the high level overview of how the system processes user input. This figure depicts an embodiment where the user is prompted for missing command information and the system waits for additional user input at this level in the system flow.

FIG. 4B is a flow chart of an alternate embodiment where a CAS is not utilized, and the system is always in command mode. This corresponds to the alternate embodiment in FIG. 4C in the preferred embodiment, and depicts an embodiment where the user is prompted for missing command information and the system waits for additional user input at this level in the system flow. Although this FIG. 4B and succeeding figures in the B series correspond to the alternate embodiment of FIG. 4C, the concept of the system always being in command mode can apply to any embodiment. FIG. 4C is a flow chart showing a high level overview of an alternate embodiment. This figure, and the corresponding FIGS. 5C, 6D and the other Figures of the preferred embodiment, depict an embodiment where the system analyzes command input and if necessary prompts the user for missing command information, and returns to FIG. 3 to wait for the user to provide additional input.

FIG. 5A is a flow chart of the preferred embodiment depicting the parsing of user input to search for a CAS and set command mode if one is found, prior to the processing of the incoming input stream.

FIG. 5B is a flow chart of an alternate embodiment depicting the processing of an incoming input stream, and corresponds to the alternate embodiment shown in FIG. 6D. In this alternate embodiment all parsing of the incoming input stream is done at the Process Stream step shown in this FIG. 5B. In this section of the flow, a command is verified for processing, or returned for additional user input. FIG. 5C is a flow chart of an alternate embodiment corresponding with FIGS. 4C, 6D and the other FIGures of the preferred embodiment. This chart shows the parsing of user input to search for a CAS and set command mode if one is found. In this FIG. 5C, when command mode is set, only the CAS is cleared from the data construct leaving other command elements intact, and allowing the system to again pass through FIG. 5C if the system is already in command mode. This enables a CAS and a command to be issued together in a single input stream, or separately by prompting the user after a CAS and cycling through another loop.

FIG. 6A is s a flow chart depicting the processing of an incoming input stream in the preferred embodiment.

FIGS. 6B and 6C correspond to the process command steps shown in FIGS. 7A-7H in other embodiments, for the alternate embodiment where the system is always in command mode and a CAS is not used.

FIG. 6D is a flow chart of an alternate embodiment depicting the processing of an incoming input stream, and corresponds to FIGS. 4C, 5C and the other Figures of the preferred embodiment. In this alternate embodiment all parsing of the incoming input stream is done at the FIG. 5C level and in the course of processing a command, once placed in command mode, the system can pass through FIG. 5C Parse Mode multiple times while processing a CAS/command series as long as the system is left in command mode, thus enabling an incomplete command to be completed and validated without starting over. In this section of the flow, a command is verified for processing, or returned for additional user input. Note that in this alternate embodiment in FIG. 6D, optional step 613 is used only if optional steps 502 and 503 in FIG. 5C are used.

FIGS. 6E and 6F is a flow chart depicting an alternate embodiment of the processing of an incoming input stream, where the user is prompted for missing command information at this level in the system flow of processing user input. In this alternate embodiment, the flow corresponds with FIGS. 4C, 5C and the other Figures of the preferred embodiment, and steps S404 and S405 may be optional, and when used, will typically inform the user of the reason for the Command Status before returning to S302 to wait for user input.

FIG. 6G illustrates an embodiment where the system can process multiple commands in a single input stream, and corresponds with FIGS. 4C, 5C and the other Figures of the preferred embodiment.

FIGS. 7B and 7B is a flow chart showing the various ways in which the preferred embodiment can process a command. A command may start an application before processing the command, process the command in the desired application, and if required by the command, to enter a content loop with respect to an application as shown in FIGS. 8A and 8B and 9A and 9B. A command to open a certain type of file, may imply a command to also start the corresponding application if it is not already started.

Figure 7D:
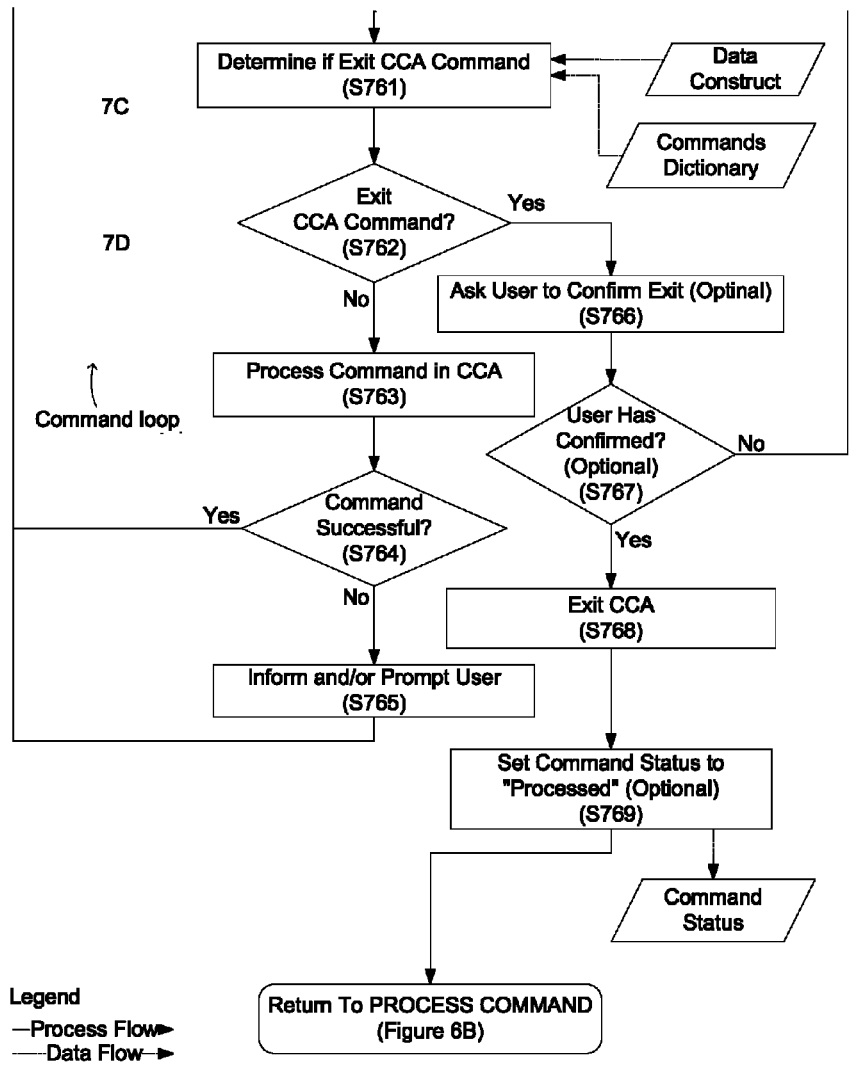

FIGS. 7C and 7D correspond to the Content Loop shown in FIGS. 8A-8J in other embodiments, for the alternate embodiment where the system is always in command mode and a CAS is not used.

FIGS. 7E and 7F and the corresponding FIGS. 9C and 9D, 8E and 8F and the other Figures of the preferred embodiment show a variation of the preferred embodiment where a CAS must precede all commands while in content loop, thereby allowing system commands and application commands to be issued and processed from within content loop.

FIGS. 7G and 7H and the corresponding FIGS. 9E and 9F, 8G and 8H together with the other Figures of the preferred embodiment depict another alternate embodiment where a CAS must precede both system commands and CCA commands while in content loop, and which is enabled for recursivity. When in a content loop, the system processes system or application commands outside of the CCA and return to the CCA in content loop.

FIGS. 8A and 8B is a flow chart depicting the content loop of the preferred embodiment under which data is being tested for commands while non-command input is passed as content to the current command application (CCA) which has SPOCUS.

FIGS. 8C and 8D correspond to the Parse Complex shown in FIGS. 9A-9H in other embodiments, for the alternate embodiment where the system is always in command mode and a CAS is not used.

FIGS. 8E and 8F and the corresponding FIGS. 9C and 9D, 7E and 7F and the other Figures of the preferred embodiment show a variation of the preferred embodiment where a CAS must precede system commands, application commands and CCA commands while in content loop.

FIGS. 8G and 8H and the corresponding FIGS. 9E and 9F, 7G and 7H and the other Figures of the preferred embodiment show another embodiment enabled for recursivity. In this alternate embodiment, a CAS must precede system commands, application commands and CCA commands while in content loop.

FIGS. 8I and 8J and the corresponding FIGS. 9G and 9H, 7E and 7F and the other Figures of the preferred embodiment show another variation of the preferred embodiment where a CAS must precede both system commands and CCA commands while in content loop.

FIGS. 9A and 9B is a flow chart of the preferred embodiment showing detail of the parse process while in content loop. This is how the system determines if the input received by the system is content for the CCA, or a command, and if it is a command, whether or not the command is an actual command, or content intended for the CCA. This figure also shows two optional steps for enabling dictation commands.

FIGS. 9C and 9D and the corresponding FIGS. 8E and 8F, 7E and 7F and the other Figures of the preferred embodiment show a variation of the preferred embodiment where a CAS must precede both system commands and CCA commands while in content loop, and if there is no CAS the input is assumed to be data for the CCA. This FIGS. 9C and 9D also illustrates several of many possible ways to process user input if a CAS is found, and is not in context. These options are not intended to be limiting, and these and other variations can be used here or in other alternate embodiments as long as the objects of the content loop are achieved.

FIGS. 9E and 9F and the corresponding FIGS. 8G and 8H, 7G and 7H and the other Figures of the preferred embodiment, depict an alternate embodiment where a CAS must precede both system commands and CCA commands while in content loop, and which employs recursivity. One or more "System State" memory locations are used to save the System state before leaving one application to process a system command or application command for an application other than the CCA, so that the system can return to the previous application in the same state as it was left when the system is finished processing command(s) in the succeeding application. The system returns to this point after system and application commands are processed, enabling the user to process these commands from the CCA and continue in the CCA without exiting or switching to other applications.

FIGS. 9G and 9H and the corresponding FIGS. 8I and 8J, 7E and 7F, 6D, 5C, 4C, 3, 2 and 1 show another variation of the preferred embodiment where a CAS must precede both system commands and CCA commands while in content loop, and uses a loop to validate commands at this level, thus enabling the user to complete a command from content loop without starting over the command input.

FIG. 10A shows an embodiment of processing a command in the CCA (S807 in the preferred embodiment), and illustrates the preferred option for managing an error condition if the CCA command fails to process.

FIG. 10B shows another variation for processing a command in the CCA.

FIG. 10C shows yet another variation for processing a command in the CCA, and opens a new stack at FIG. 11 to process an error condition returned from a processing a command in the CCA.

FIG. 11 shows the flow of processing an error condition from process command in CCA. Valid commands are restricted to applicable commands for the error condition.

FIG. 12 is a flowchart showing an overview of how the various charts flow together.

FIG. 13 shows an overview of the system.

FIG. 14 shows a variety of possible configurations of facets in the MFGUI. It is not meant to be limiting, but only to illustrate the flexibility of the MFGUI for displaying multiple applications in one viewing area composed of multiple facets.

FIGS. 15A and 15B is a flow chart illustrating one way in which the system can set and assign priority for processing commands. In the preferred embodiment, an input is processed at the highest level possible, meaning the system will have first priority at processing a command if the command is "System Valid", followed by the CCA, followed by other active applications, followed by inactive applications. In variations of the preferred embodiment or alternate embodiments, if a command is valid both to system and the CCA, or to multiple applications, then the system can use information in the CD to determine where the command will be processed, or user may be prompted to make this determination.

Requiring a command activation statement (CAS) is one method to filter input such as speech or background noise that is not intended to be input for the system, and the system wait mode essentially functions as a mute button. This enables the computer to be used for other types of speech input such as intercom or telephony functions. In some embodiments, it may be desirable to enable the user to command the system to enter into a wait mode. In other alternate embodiments, the use of a wait mode may not be necessary or desired. The B series of Figures specified below show one such alternate embodiment. In this embodiment, the system assumes all input is a command, so the CAS is not needed. If the user desires to mute the system from listening or to use speech input for another purpose besides command and control, the system mode can be changed by a command. FIGS. 1, 2 and 3, combined with FIGS. 4B, 5B, 6B and 6C, 7C and 7D, 8C and 8D and 10A, show an alternate embodiment where the system is always in command mode, and the use of a CAS is unnecessary. With the exception of input from a Content Loop, all input to the System is assumed to be command input. In this series, the functions of performed in FIG. 5A in the preferred embodiment are omitted, as these steps are unnecessary in this alternate embodiment, and FIGS. 6B and 6C, 7C and 7D and 8C and 8D correspond to the preferred embodiment FIGS. 7A and 7B, 8A and 8B, and 9A and 9B respectively.

8.2 Overview of the Figure Series

FIGS. 1, 2, 3, 4A, 5A, 6A, 7A and 7B, 8A and 8B, 9A and 9B, 10A, referred to as the preferred embodiment or A Series, show flowcharts detailing a first embodiment of the invention. This embodiment employs a command validation loop at the Process User Input level shown in FIG. 4A.

FIGS. 1, 2, 3, 4B, 5B, 6B and 6C, 7C and 7D, 8C and 8D, and 10A, referred to as the B Series, shows flowcharts according to a second embodiment of the invention, which provide an alternate embodiment wherein the system is always in command mode, and the use of a CAS is unnecessary. Except when in content loop, all speech input to the System is assumed to be command input.

FIGS. 1, 2, 3, 4C, 5C, 6D, 7A and 7B, 8A and 8B, 9A and 9B, and 10A, referred to as the C Series, show flowcharts according to a third embodiment of the invention, which show an alternate embodiment that uses a loop through the system to validate commands.

FIGS. 1, 2, 3, 4C, 5C, 6E and 6F, 7A and 7B, 8A and 8B, 9A and 9B and 10A, referred to as the D Series, show flowcharts according to a fourth embodiment of the invention, which show an alternate embodiment that uses a command validation loop within Process Stream level shown in FIGS. 6E and 6F.

FIGS. 1, 2, 3, 4A, 5A, 6A, 7E and 7F, 8E and 8F, 9E and 9F, and 10A, referred to as the E Series, show flowcharts according to a fifth embodiment of the invention, which show an alternate embodiment wherein a CAS must also precede all commands from within content loop. In this series, FIGS. 9E and 9F illustrate a command validation loop within the Parse Complex and multiple possibilities for managing or validating a command that is not valid (complete).

FIGS. 1, 2, 3, 4A, 5A, 6A, 7G and 7H, 8G and 8H, 9E and 9F, and 10A, referred to as the F Series, show flowcharts according to a sixth embodiment of the invention, which shows an alternate embodiment enabled for recursivity. As with the E Series, all commands from within content loop must likewise be preceded with a CAS.

FIGS. 1, 2, 3, 4C, 5C, 6D, 7E and 7F, 8I and 8J, 9G and 9H, and 10A, referred to as the G Series, show flowcharts according to a seventh embodiment of the invention, which is a variation of the E Series embodiment, with command validation enabled within the Parse Complex FIGS. 9G and 9H of the content loop. If a command issued from content loop is missing required parameters, the user can complete the command within the Parse Complex.

FIGS. 1, 2, 3, 4C, 5C, 6F, 7A and 7B, 8A and 8B, 9A and 9B, and 10A, referred to as the H Series, show flowcharts according to an eighth embodiment of the invention, which depict an embodiment which processes input of multiple commands in a single input stream.

9 DESCRIPTION OF THE FIGURES 9.1 Overview of Numbering Scheme

FIGS. 1-3 and 4A-10A contain a detailed flow chart for preferred embodiment of a SPEECH INTERFACE SYSTEM AND METHOD FOR CONTROL AND INTERACTION WITH APPLICATIONS ON A COMPUTING SYSTEM (the "System") designed according to the preferred embodiment of the present invention, which incorporates the command and control aspect and the multi-faceted graphical user interface ("MFGUI") aspect of the invention together. For convenience, every process step is designated with a process step identifier containing a letter 'S' followed by a three digit number (i.e. S300). Each process step ("Sxyz") uses a numbering convention where the three digit code ("xyz") corresponds to the figure with which the process step relates. In every process step designated as "Sx00", the "x" digit corresponds to the figure number in which the detail of the procedure is shown. For example, the "x" refers to the current figure, and "yz" refers to a unique process step number in that figure.

In each figure there is an end of process block which is designated as a "return" statement. The "return" process step in each figure specifies the figure to which to return, and unless otherwise specified, the return is to the point of departure. The convention used to designate process steps will become apparent from the following discussion.

9.2 Detail Description of the Figures

FIG. 1, shows a general flow diagram for the System.

The System is started by initiating a start command. The start command can be generated by speaking into a sound input device like a microphone, striking a key or sequence of keys on a keyboard, moving and clicking a pointing input device like a mouse on an icon or menu item, or any other known method of starting a computer software application and executing a sequence of instructions. In embodiments where the System is used as the operating system, the start command occurs as part of the boot process. Once the start command is initiated, a main process (S101, FIG. 1) is executed by the System. The main process initializes a series of parameters (S200, FIG. 2).

Referring to FIG. 2, a detail of the System initialization sequence (S200) is shown. This includes initializing the viewable graphical user interface window (S201) which in the preferred embodiment is a multi-faceted graphical user interface ("MFGUI"), opening a series of previously designated default applications (S202), activating a speech recognition process into the system (S203) so it is accessible to the System, activating a text to speech (TTS) translation engine so it is accessible to the System (S204), loading the Commands Dictionary (CD) from storage into a memory location (S205) and initializing the default applications to graphical user interface, where in the preferred embodiment, such default applications are displayed in the default facets of the MFGUI (S206). Both predefined commands and dynamically generated commands, as well as derived structures inferred from these commands, may be employed, and thus step S205 may either return the CD or provide potential synchronization with these derived structures. The derived structures may be context dependent. It is understood however, that steps in FIG. 2 could be performed in any reasonable order.

In the preferred embodiment, in the above initialization sequence in FIG. 2, steps S201 and S206 set the MFGUI as one high-level window, which displays multiple active viewing areas (called "facets"). Each application that is set by default (if any) to be displayed upon initialization occupies one facet of the display area. The output of the applications displayed in the MFGUI are directed to each such applications corresponding facet.

Once the initialization sequence ends, control is returned to S102 in the Main process in FIG. 1.

Referring again to FIG. 1, after the System is initialized in step S200, the System goes on to verify that the speech recognition process is active, and if so sets speech as the primary interface (S102-104). This can be done, for example, by verifying the System has a connection to the speech recognition process and/or TTS engine(s). The system can also verify that it is receiving input from the sound input and processing devices (such as a microphone and sound card) to verify that the input of sound is present and active on the computer. If these steps are successful, then speech is set as the primary interface (S104). When the speech recognition process or sound input are missing or disabled, the System bypasses speech as an input, and sets the keyboard and pointing device as the primary input device to the System (S105). However, even when speech input is enabled, the keyboard and pointing device are always active as secondary input devices so the user is able to utilize all three methods of input thereby increasing efficiency and flexibility of the System. At this step, testing for the presence and availability of the TTS may also take place, and in yet other alternate embodiments, this step may take place as part of the process of loading the speech recognition process and TTS engines. Further, if desired, the output of the TTS engine may also be displayed graphically and this may be by design or optional to the user.

According to alternate embodiments of the invention, the System may test for available means of input and select one of the available means (including but not limited to speech) as the primary input device, the selection being made in order of assigned priority. The System may also be designed to use any available input method including but not limited to speech, without checking for availability of sound or speech input or without setting any one of the available means of input as primary. Yet another alternative is for the System to prompt the user to select one or more of the other available input means as the primary input means. If speech is determined to be an available input modality, the speech engine is initialized in anticipation of receiving input. Other inputs may act concurrently, and indeed, one aspect of the invention coordinates inputs from multiple sources to ensure that the status of each interface modality is synchronized. Thus, for example, if a user inputs a partial command using speech, provides another part using the keyboard and/or mouse, and the final part using speech, the speech input system must include the non-speech inputs within the command analysis. Therefore, both the application and the speech interface may respond to the same commands.

Once all the initialization parameters are set in place, the System may greet or prompt the user (S106, FIG. 1) and the System goes into an active mode (S300, FIG. 3) wherein the System is active and ready to accept and process all input and output of data through the computer. Optionally, the prompt in S106 can be combined with the prompt at S301, although in the preferred embodiment, the difference between the two prompts is that S106 indicates the initialization has been successful and S301 indicates that the System is ready to accept input from the user. The prompt(s) can be any graphical/audio/visual prompt that is desired. For example, the TTS engine can be used by the System to announce a greeting and ask the user for input, a message can be displayed on the MFGUI, or both methods can be employed. However, prompting the user at steps S106 and S301 are not essential to the function of the system and can be omitted or bypassed if desired.

FIG. 3 shows a flow chart depicting the process flow in the preferred embodiment where the System has been activated (S300). First, the user is prompted for input (S301). In the preferred embodiment, this prompting is not a general greeting as in step S106 but instead is a request for user input. This request can be in the form of any graphical, audio or visual cue, which is necessary to alert the user that the system is waiting for an input.

After S301, the System is active, and running at all times. The speech primary interface is active and constantly monitored by the System for possible commands, requests or data input. Even when the system is in the middle of communicating with another application, the primary interface is being polled continuously for commands. Alternatively or in addition to polling, the System can use the system interrupt mechanism to accomplish this function, or any other means that accomplishes similar results.

The system waits for the user to generate an input stream (S302). The user generated input stream can be derived from any acceptable input process including, but not limited to a speech recognition process, a keyboard, a pointing device like a mouse or any other input device that may be present and active on the System. Once an input stream is supplied, the System acquires and processes the input stream (S400, see FIG. 4A for and beyond for details). If the System returns from S400 without detecting a CAS or command input, in the preferred embodiment, the System returns to S302 to again wait for user input, although optionally if desired, the system can return to S301 to prompt the user before returning to S302 to wait for user input.

The general manner in which user input is processed is depicted in the flow chart found in FIG. 4A. As shown in FIG. 4A, an input is processed (S400) by acquiring the data from an input stream (like the output of a speech recognition process, an STT engine or input received from a keyboard or pointing device for example) (S401) and parsing that data elements to determine what operating mode the input stream requires for that data to be acted upon (S500, FIG. 5A).

FIG. 5A shows a flow chart depicting the parsing of an acquired input stream in order to determine if the system needs to be in the command mode (S500). The stream is first parsed (divided) into a data construct (S501), which is stored in a location in memory. The data construct is searched for a Command Activation Statement (CAS) (S504) which in the preferred embodiment is contained in the Commands Dictionary, although it may be contained in another location if desired. Thus, the present invention expressly contemplates various organizations of the commands in a data structure, ranging from a single database, to separate files, to multiple files, representing the dictionary for each command, multiple commands, an entire process or application, or the entire operating system, supporting multiple applications. In some cases, the system will be "flat", with all commands at a single level, while in others, the commands will be organized in a hierarchy, facilitating resolution of ambiguity by contextual analysis.

The use of a CAS and Command Mode are particularly useful when the speech input for the System has other applications, such as use with a telephone system or intercom for example. Likewise, multiple systems may receive the same acoustic input, and thus must determine which commands are intended for a particular system, and which are not commands or are intended for other systems. However, in alternate embodiments, such as one discussed below, the System may be designed so that it always in command mode and searches all input for one or more commands indicating the input of a command, and in such alternate embodiments, the Parse Mode (FIG. 5A) can be omitted with all parsing taking place in Process Stream FIG. 6A. Such an alternate embodiment is show in FIGS. 4B through 8D. Still, in other alternate embodiments, the step of searching for a CAS can take place in Process Stream (FIG. 6A), or at least some (or all) commands can be given the effect of a CAS. The object and effect of such alternate embodiments is to eliminate the need for a CAS to precede a spoken command. In these alternate embodiments the functions of FIGS. 5A and 6A can be combined. Finally, the input of a CAS is typically done by speech, however, it could be done by a key stroke or combination of keystrokes, or mouse movement or click. Keystrokes and mouse clicks should have the same effect as a CAS for placing the system in command mode.

Returning to the preferred embodiment, when a CAS has been found in the data construct (S505), the system is set into command mode (S506) and after clearing the CAS from the data construct (S507), returns to Process User Input (FIG. 4A) where in the preferred embodiment once the System determines it is in command mode (S402 and S403) the user is prompted to input a command (S404) and the System waits for user input (S405). If a CAS is not found in the data construct, the System goes directly back to FIGS. 4A-4C and returns to steps S402 and S403 and because a CAS is not found the system returns to Activate System (FIG. 3), which will result in returning to S302 to wait for user input. Note that the CAS is cleared from the data construct at S507 to allow some embodiments of the system to pass through FIGS. 5A-5C (Parse Mode) again without clearing command elements from the data construct in subsequent loops during the process of validating a command. In some embodiments where the command validation takes place at a higher level, this step S507 may be omitted.

Finally, in the preferred embodiment, in order to enable the user to abort the input and validation of a command, if the system detects a CAS or an Abort command while in the process of validating a command (see FIG. 6A (S609-S611), the data construct is cleared at S414 when the system cycles back to FIGS. 4A-4C, and returns to S302 to wait for another command input, thus enabling the user to abort the input of one command and start another with a CAS or an abort command. The difference between the two is that a CAS will leave the system in command mode so the user can start the command input again without repeating the CAS, and an abort command will return the system to wait mode. The exception to this is a CAS detected while using an application in a content loop as shown in FIGS. 8A and 8B, and 9A and 9B below, which depending on the context may be handled in more than one way.

In alternate embodiments, prompting the user for a command and waiting for user input after a CAS can take place in Parse Mode (FIG. 5A in the preferred embodiment) after setting command mode S506, or the System can return to S301 after S303 and prompt or inform the user at this point and going to S302 to wait for the next input. As in the preferred embodiment, in other alternate embodiments it may be desirable to omit the step of prompting at this point, and simply return to S302 to wait for a command.

In the preferred embodiment, once the System is set to command mode, it remains in command mode until a command is either processed, the command input is aborted by the user or a predetermined event such as a time out or exceeding a predetermined number of loops occurs, although other conditions can also result in a command input being aborted, although it may be desirable to leave the system in command mode after a command is processed in order to wait for another command.

Returning to FIG. 4A, after the data has been parsed and tested for a CAS in FIG. 5A, the System tests to determine the mode of operation (S402). If the system is set to command mode (S403), the Data Construct is tested to see if it contains command information S404. If no command information is found in the Data Construct at S404, the user is prompted for a command (S405) and the system waits for user input (S406). In this case, the user will have only spoken a CAS as his or her initial input. When the user provides input, the system acquires the incoming input stream (S407) and goes on to processes the input stream (S600 FIG. 6A), (details found in FIG. 6A) in order to determine if the data input following a CAS contains a valid command (known to the system and complete with all the elements of information needed to process that command). If the user speaks a command in the same input stream as the CAS, the Data Construct will contain command information at S404 and the system will go on to S600 (FIG. 6A) to process the input stream (S600 FIG. 6A). If the System is not in command mode at S403, the System will return to S411, the System mode is set to "Wait", and the System returns to FIG. 3 S303 to return to S302 to wait for the next user input.

After returning from FIG. 6A, the System checks the command status to determine how the input stream was processed (S408) by checking the Command Status. The command status may also include information from the System on the reason for the command status, and the uses that information to inform and/or prompt the user for a command (S410 or S411). If the Command Status at (S409) is "Processed," "CAS," "Processed Error" or "Aborted", (meaning the Command Status is not "unknown" or "incomplete"), the system goes on to S410 to inform the user or prompt the user based on the command status. If the command status is "processed error" the user may also be informed of the reason for this status. If the command status is "Processed," "CAS," "Processed Error" or "Aborted" the user is informed of the command status (S410) and the system clears the data construct, depending on the Command Status, at S414, before the System returns FIG. 3 to wait for the next command at (S302). The information provided by the prompt at S414 (and S411) assist the user in interacting with the System. If the command status at S409 is "incomplete" or "unknown" the system informs and/or prompts the user for command information (S411), and if the command status is "incomplete" S412, returns to S405 to wait for additional user input. This combination of prompting (S411) and cycling through a command loop (back to S405) assists the user with inputting and completing incomplete commands (commands which are known, but do not contain all the required elements of command information needed to process the command). If the system has not found a command (command status "unknown" at S412), the data construct is cleared at S414 and the system mode is set to Wait Mode, after which the system returns to FIG. 3 S302 to wait for the next user input.

In the preferred embodiment, if the command status is "incomplete," S412 after the user has been prompted for a command (S411), the System cycles back to S405 to wait for the missing user input, and when the user provides new input, the system cycles through another loop, again passing through Process Stream (FIG. 6A) to test for a valid command (known and complete) and to process a valid command if one is found. This process continues until the command is processed, or the command input is aborted by the user or the system as discussed above.

At S409, if the Command Status is set to "processed" this typically means that a command has been successfully processed by the system or the designated application for the command. The Command Status of "aborted" or "CAS" means the user has given an abort command or a CAS, or the system has encountered a predetermined condition for aborting the command such as exceeding a predetermined time-out or number of cycles through a loop. If the command status is set to "processed error," this means that a command failed to process.

Following the "yes" branch in S409 in the preferred embodiment, if a CAS was used to abort a command input, the command status was set to "CAS Valid" at S611, and at S414 the data construct is cleared and the system mode is left in "command mode," so the user can proceed with the input of a new command without repeating the CAS. If the command status is other than "CAS Valid" in this branch, the System mode is set to "Wait" and the System then returns to activate system (FIG. 3), to wait for user input at S302. Following the "no" branch of S409, if the command status at S412 is "unknown" (Command Status not "incomplete") then optionally, the data construct is cleared (S413) and the system still in command mode returns to activate system FIG. 3), to wait for user input at S302. Optionally in an alternate embodiment, the system can skip the optional step S413 and return directly to FIG. 3, or can pass through S414 with the options to clear or not clear the data construct and to leave the system in Command Mode or set the system to Wait Mode. At this stage, another alternate embodiment determines which option to follow after an unknown command, based on at least one of the previous system state, current system state, user preference or an instruction in the commands dictionary.

In an alternate embodiment as shown in FIG. 4C and the corresponding FIGS. 5C and 6D, instead of requiring a CAS, prompt, command input format, and cycling through a loop between S410 and S405 to complete an incomplete command as in FIG. 4A, the system is able to accept and process a CAS and a command separately or in the same input stream, and incomplete commands are validated by cycling through FIGS. 3, 4C, 5C and 6D of the System as opposed to using a command validation loop like the ones shown in FIG. 4A and FIGS. 6E and 6F. This enables the user to either speak a CAS, then issue a command, or to speak a CAS and a command in the same input stream. Such a status is not generally available in this embodiment, however, though extrinsic or modified processes, this may be possible or even desirable.

Referring to FIG. 4C, to accomplish this, after acquiring the incoming input stream (S401), the System cycles through Parse Mode (S500, FIG. 5C) where optionally the system determines the mode of operation. If the system has already been placed in command mode (S503) by the previous utterance of a CAS, then it may be desirable to bypass the remainder of the Parse Mode and return to FIG. 4C. Otherwise, if the system is not already in command mode, the system searches the Data Construct for a CAS. If a CAS is found (S505) the System is set to command mode (S506) and the CAS is cleared from the data construct (S507). After following either branch from S503 FIG. 5C, the system returns to FIG. 4C S402-S403, where if the system is in command mode it continues on to cycle through to FIG. 6D where it searches the input stream for commands. In the first cycle, the system will process a valid command that was issued in the same input stream with a CAS. If no known command was contained in the initial input stream with the CAS (the user spoke only a CAS), or if a known command is incomplete, the system goes to FIG. 4C and cycles to S302 (FIG. 3), to wait for the user to input a command (command status "unknown) or missing parameters (command status "incomplete"). In this alternate embodiment, once a CAS places the system in command mode, the System stays in command mode until a command input is processed or aborted. If the System returns to S302 because the command status is "unknown" or "incomplete," the user does not need to repeat a CAS and when a user provides additional input, the System acquires the incoming input stream S401 and passes through Parse Mode (FIG. 5C) in this second loop without finding a CAS, detects that the system is already in Command Mode and continues.

It should be noted that in this alternate embodiment, if optional steps S502 and S503 in FIG. 5C are not utilized, then a CAS cannot be used to abort a command input as in some of the other embodiments, as the CAS will be cleared from the data construct each time the system passes through FIG. 5C and there can be no CAS to detect at S610 in FIG. 6D. Such a configuration must rely on an abort command to cancel a command input.

Continuing on with FIG. 4C, after passing through FIG. 5C, the System returns to FIG. 4C, S402-S403, where being in Command Mode it goes on to FIG. 6D, to test for a known command in steps S603-S604, and a valid (known and complete) command at S606-S607. The system goes on to test for an "Abort" command or "CAS" at S609-S610, and if it does not find a "Abort" command or "CAS" it goes on to set the command status S612 as required for the command and the command will be processed at S700 according to parameters contained in the CD for that command. It should also be noted at this point that if the command can apply to more than one application or to the system and at least one application, that the system must determine which application (or the system) in which the command will be processed. This determination is made based on at least one of the previous system state, current system state, user choice, user preferences, requirements in the commands dictionary or any other criteria which is useful for making this determination. Continuing on with FIG. 4C, if at any step, a command is determined to be "unknown," "incomplete," "aborted" or "CAS", the System sets the appropriate command status at steps S605, S608 or S611, and the System cycles through another loop and continues until the command is processed or the command input is aborted. After a valid command is processed, the system returns to FIG. 4C which subsequently returns at S302 with the System set to wait mode.

The main difference between the preferred embodiment and the alternate embodiment shown in FIGS. 4C, 5C and 6D, are that the user can input a CAS and a command in one command statement, and if the user inputs a CAS and a valid (known and complete) command in a single input stream, the command can be processed in a single loop through the system, and if an incomplete command needs to be validated, the system cycles through FIGS. 3 through 6D as needed until the command is validated and processed or the command input is aborted (as opposed to the command validation loop in FIG. 4A used in the preferred embodiment). Likewise, if a CAS and command are spoken in separate input streams, the system cycles through FIGS. 3 through 6D, first for the CAS, then for the command until the command is likewise validated and processed or the command input is aborted.

This alternate embodiment illustrated in FIGS. 4C, 5C and 6D enables the system to either process a CAS spoken with no subsequent command where the system prompts the user for a command and cycles through another loop where the user inputs the command (for example: User: "Computer", System: "What would you like me to do?" User: "Turn on the lights" [uses two loops]), or to process an input stream that contains both a CAS and a command together (example: Computer turn on the lights [uses one loop]). In the former, if the user speaks a CAS, and waits for a prompt to input a command, the system cycles through another loop, and when the user inputs a command which is acquired at (S401), the system continues on to FIG. 5C (S500) where the mode of operation will be determined as command mode S503 or a CAS will not be found at S505. However, following optional steps S501-S505, the system, already being set to command mode in the previous loop, remains in command mode when it returns to S402-S403, and being in command mode the system goes on to Process Stream S600. Following the latter, (S502-S503 not used) the system remains in command mode after S505. Either way, this looping process through FIGS. 3 through 4C, 5C and 6D continues and the system remains in command mode until the command is validated (Command Status set to "system valid" or "application valid") or aborted (Command Status set to "aborted" either by the user or a predetermined condition (such as an abort command, exceeding a predetermined number of cycles through a loop, or a time out, for example). So accordingly, if a command input was already started in a previous loop and a CAS is subsequently issued by the user, the system will remain in command mode, and data elements that were parsed into the data construct in previous loops will remain intact.

Finally, FIGS. 4C, 5C and 6D are also used with other alternate embodiments, and enable an incomplete command following a CAS while in content loop to be validated at a lower level by cycling through the system instead of using a command validation loop at higher level steps as in the preferred and some of the alternate embodiments.

Returning now to FIG. 4A in the preferred embodiment, once it is determined that the system is in command mode S403, the system determines if the Data Construct contains command information S404 by comparing the Data Construct to Commands Dictionary to search for a matching command. If no command information is found in the data construct, the system prompts the user for a command S405 and waits for user input S406. When the user provides input, the system acquires the incoming input stream S407 and continues on to process the incoming input stream at S600 in FIG. 6A.

Moving on to FIG. 6A, in the preferred embodiment, after acquiring the input stream at S407, the System moves on to S601 where the system parses (divides) the incoming input stream acquired into a data construct, which in the preferred embodiment is contextually based, and at S602 potentially compares the content of the data construct to derived structures inferred from a grammar or set of grammars, or alternatively compares the content of the data construct to a grammar or set of grammars, or alternatively searches commands held as input streams for matches, or alternatively by using any other mechanism that will achieve the purpose of associating a command within the command dictionary provided the incoming input stream, all of which are derived from the commands dictionary or dynamically generated.

Typically, a command will have a set of required or optional elements, each of which is required or permitted. Once a particular command is identified as intended to be invoked, the context-based data construct then enables the determination of the sufficiency and/or validity of input speech. A data construct can also be interpreted variously in dependence on the context, meaning the environment, mode, prior commands and data, etc.

Even if a known command is found in the data construct S604, that is not sufficient for a command to be valid. To be valid, a command must also be complete, meaning that it must contain all of the parameters or elements (as indicated in the CD) that are required to successfully process the command. If the data construct does not contain a known command at S604, the command status is set to "Unknown" at S605 and the system returns to FIG. 4A S408 where the system goes on to inform the user that no command was found and/or prompt the user for a command at S411 before the System returns to FIG. 3 where it will wait for the next user input at S302. It should be noted that if the command status is set to "unknown," in the preferred embodiment the user is informed of the "unknown" command status and the system returns to S302, still in command mode, to wait for the next command input.

If the data construct contains a known command at step S604, then the data construct is further tested to determine if the command is complete S606, meaning that it contains all the parameters or elements (information) as indicated in the CD which are needed in order to process the command. If the command is complete in S607, it is a valid command.

The scope of valid commands includes an "abort" command and a CAS. If the command is valid (known and complete), the System goes on to test for an "abort" or "CAS" at S609-S610. If the command is an "abort" or "CAS", the System moves to S611 where the command status is set to "Aborted" or "CAS" and the System returns to FIG. 4A, S408. Note that in the preferred embodiment either an abort command or a CAS aborts the current command input and ultimately returns the System to S302 to wait for a new command either in wait mode (abort command) or command mode (CAS). While the preferred embodiment employs both an abort command (for example a "cancel" command) and a CAS to abort the input of the current command, some variations may use a CAS as the sole means for aborting a command input. The System can also use the occurrence of a predetermined condition (such as a time-out or exceeding a predetermined number of loops) to abort a command input, and if so, these abort conditions have the same effect as a user issued abort command.

If the command is not "Abort" or "CAS" at S610, the Current Command (CC) Status is set to either System Valid or Application Valid at S612 depending on the command type. As the system proceeds in processing the command, the CC status is used to determine how the System will then process the command in FIGS. 7A and 7B.

Alternatively, this step in S612 can be bypassed and the System can be designed to use predetermined parameters to make the determination of whether the command is processed in an application or by the system using the information contained in the CD, the current or previous system state, user preferences, user prompt or other applicable criteria to make the determination. These alternatives are useful when a command can be processed in both the system and an application, or in more than one application.

Returning back to S607, if the command is not valid because it is not complete, the system sets the Command Status to "incomplete" at S608, then returns to (FIG. 4A S408, where the user is informed and/or prompted for the missing command information at S411, and at S412, the command status being set to "incomplete" results in a command validation loop where the System returns to S406 to wait for the user to input the missing information. The user can then input the required information, the system cycles through another loop adding the new input to the data construct thereby enabling the command to be tested again and validated if all the required command information is then present when the system cycles through another loop.

For example, the command "Turn On" is identified as a known command at S604, because the command "Turn On" is contained in the commands dictionary and is known to the system. But it fails the test of complete (valid) in S607 because the command "turn on" requires the parameter of something that the System or an Application can "turn on" (such as the kitchen lights). It is necessary to have this information before the system can determine which application needs to process the command (if there is more than one applications that can process the command "turn on") and what the application needs to turn on. In this example, the command status is set to "incomplete" at S608 and when the system has cycled through a first loop and prompted the user for the missing command information (in this case something to turn on), and has supplied the missing command parameter(s) correctly in the second loop (for example, the user said "kitchen lights"), the command is determined to be complete at S607. Since the command is not an abort or CAS the system goes on and the command status is set to "application valid" S612 (since the application that controls the lights is needed), and the command is then processed in the designated application as shown in FIGS. 7A and 7B discussed below.

However, if in the second or subsequent loops, the user fails to provide the required, complete or correct input after being prompted, or if the subsequent input is still missing some of the required parameters (as in a command with multiple missing parameters where the user supplied some but not all of the required command information), then after cycling through successive loops between S411 and S405 (FIGS. 4A through 6A), continuing to prompting the user for the missing information in each cycle, and repeating the process through successive loops. This looping process continues until the command is validated (command status set to "system valid" or "application valid") and processed at Process Command S700 (FIGS. 7A and 7B), or the command input is aborted either by the user or the system upon occurrence of a predetermined condition (including but not limited to an abort command or CAS, exceeding a predetermined number of cycles through a loop, or a time out, for example).

In other variations of the preferred embodiment, if a command is missing more than one parameter, it may be desirable to design the system so that it prompts the user for only one such missing parameter at a time, and cycles through one or more loops for each missing parameter, thereby enabling the user to build a complete and valid command in a logical and sequential order.

Returning to FIG. 4A in the preferred embodiment after Process Stream S600, unless the command status at S408 is set to "CAS Valid," "unknown" or "incomplete," the system goes on to S414 when it clears the Data Construct, sets its mode to "Wait" mode. If the command status is "CAS Valid" the system clears the data construct at S414 and leaves the System in "Command Mode." As discussed above, a command status of "incomplete" will cycle back to S405 to wait for user input and cycle through another loop. If the command status is "unknown" at S412, then the system clears the data construct at S413 leaving the system in command mode. In variations of the preferred embodiment, S413 is omitted and the data construct is cleared at S414, where the system may be left in command mode or set to wait mode; the difference being if the system is left in command mode the user will not have to repeat the CAS to try the command again, and if the system is set to wait mode the user will have to repeat the CAS to start a new command. After these steps, the system returns to Activate System (FIG. 3) which results in a return to S302 to wait for the next user input.

FIG. 6D corresponds to FIGS. 4C and 5C where the system can accept a CAS and command in one input stream or separately, and the command validation loop cycles through FIGS. 3 through 6D in order to validate an incomplete or unknown command. This is as already discussed in detail in the discussion on FIG. 4C above and need not be discussed further here.

While in the preferred embodiment, the System cycles to S411-S405 when a command is incomplete or unknown, in alternate embodiments, this can take place at other points in the System, and the command validation loop shown in FIGS. 6E and 6F, S606-S620, is an example of an embodiment where a command validation loop is utilized at the Process Stream level to enable the user to build a complete and valid command at this higher level in the System.

In this alternate embodiment, depicted in FIGS. 6E and 6F, the process of prompting the user for more information when a known command is incomplete can take place in a higher level command validation loop as shown in FIGS. 6E and 6F which starts at S606. In this alternate embodiment, the command validation loop in FIGS. 6E and 6F takes the place of the command validation loop shown in FIG. 4A S411 to S405, and this FIGS. 6E and 6F corresponds with FIGS. 4C and 5C, and the other FIGures of the preferred embodiment. In this alternate embodiment, the steps of testing for an abort command or CAS take place in these FIGS. 6E and 6F at S609-S610, and if an abort or CAS command are present, the command status is set accordingly at S611. If a known command is not found at S604, the command status is set to "unknown" at S605. In any of these cases, the System returns to FIG. 4C which results in the user being informed of the command status and the system returning to S302 in Command or Wait Mode, depending on the command status, to wait for the next user input.

If the command is known at S604, the System tests for a complete (valid) command at S606-S607. If the known command is complete at S607, the System goes on to test for an "Abort" command or "CAS" S609-610 and if found, the command status is set to "Aborted" or "CAS" S6611 and the system returns to FIG. 4C which results in the System returning to FIG. 3 S302 (either in Wait Mode or Command Mode) to wait for the next user input. Otherwise, the command is a valid command for the system or an application, and the system goes on to set the command status at S610 and to process the command at S700 according to parameters contained in the CD for that command.

It should be noted at this point that if the command status is "application valid" this command status flag may also contain information about which application should process the command. While this information is typically maintained in the commands dictionary, or determined by the system or the user in cases when the command is valid for more than one application or the system and at least one application, other means such as this for identifying where the command is to be processed may be employed.

After a valid command is processed in FIG. 7, the system returns to FIG. 4C which subsequently returns to FIG. 3 at S302 with the System set to wait mode.

Returning to FIGS. 6E and 6F, if the known command is not complete S606-S607, the System goes on to S614, prompts the user for the missing information, and waits for user input at S615. Subsequent user input is acquired and parsed into the data construct at S616, and the System checks for an "Abort Command or CAS in S617-S618. An abort command can be one or a combination of a command to abort the current command, a CAS, exceeding a predetermined number of loops, or a predetermined time-out if subsequent input is not received within a predetermined period of time, or other events that may be used to terminate input of a command. If neither an "Abort" command nor a "CAS" are present at S618, the system returns to S606 where it again cycles through another loop to test for a complete (valid) command. This command validation looping process is repeated until the command is either processed successfully or aborted. If the command input is aborted by an abort command or CAS, the command status is set to "Aborted" or "CAS" S619 and the System returns to FIG. 4C which ultimately returns the system to FIG. 3 S302 to wait for user input, and depending on whether a abort command or a CAS was used to abort the command input, the system is either in wait mode or command mode.

In this alternate embodiment, steps S415 and S416 in FIG. 4C may be optional, as in this alternate embodiment the command validation and prompting has taken place in FIGS. 6E and 6F. If used, these steps will typically be used to inform the user of the reason for the command status, and to prompt the user to input a new command, In yet other alternate embodiments that are variations of FIGS. 6E and 6F, it may be desirable for simplification to eliminate the step of checking for a complete command S606 and S607, setting the Command Status to "Unknown" at S605 when a valid (known and complete) command is not found at S604, thereby requiring the user to start over.

In other alternate embodiments, it may be desirable to enable the user to input and the system to process multiple known commands in a single input stream. FIG. 6G which corresponds with FIGS. 4C, 5C and the other FIGures in the preferred embodiment illustrates an example of one of the possible methods for enabling this functionality which employs a command validation loop between steps S627-S636, that functions similarly to the loop shown in FIGS. 6E and 6F S606-S618, and likewise repeats itself for each known command found in the data construct. In this alternate embodiment, the data construct is tested for at least one known command S625-S627, and if at least one known command is found, then for each known command the system test for a complete (valid) command S629-S630. The System sets the command status of each complete (valid) command to "System Valid" or "Application Valid" as required by the command, and processes each such command at FIGS. 7A and 7B S700. If a known command is not complete at S630, then for each known command that is not complete, the System enters a command validation loop to validate and that command S630-S629. This continues until all the known commands found in the data construct are determined at S628 to have been validated and processed, or aborted. If no known commands are found at S627, the command status is set to "unknown" at S638 and the system returns to FIG. 4C where it will return to FIG. 3 S302 in wait mode to wait for the next user input.

Typically, when an input stream with multiple commands is being processed, the commands are processed serially, and the system is required to return to its previous state after each command is processed, which results in the next known command in the sequence being processed, and so on until all known commands in the data construct have been processed or aborted, and the system state is determined by the last command in the sequence. This is necessary in order to enable the system to process all the known commands in a given input stream, so for example, if multiple commands in a given input stream each start an application that enters a content loop, or if the first command activates or uses an application that enters content loop or needs to wait for user input, the system is able to go on with processing the other known commands until all known commands in that input stream have been processed. Alternatively, the commands can be processed in parallel and the system state will return to its previous state after all commands are processed, to a predetermined state according to parameters in the Commands Dictionary for the commands processed, or to the state as required by at least one of the commands in the sequence.

In yet another alternate embodiment, the system may validate all known commands found in the data construct first, then process all the valid commands after the validation process is complete. In such an alternate embodiment, the system assigns a Command Status of System Valid or Application Valid to each known command in the input stream that is determined to be valid, and after validation of all known commands is finished, the commands that are System Valid and Application Valid are then processed. In this variation, unknown commands are typically ignored, and incomplete commands must either be validated or aborted before the system can go on to process any of the commands in that input stream.

As indicated above, the application which receives focus after all the known commands are processed depends on system design, at least one of the commands in the sequence, or user preference or choice. For example, in different variations of this alternate embodiment, the system can be designed to grant focus to the application associated with the first command or the last command found in the data construct, to prompt the user for which application the user wants to receives focus, or return to the application that last had focus before the input stream was processed. These examples are not meant to be limiting, and are intended to demonstrate the flexibility in which the system can be designed and implemented.

Returning to FIG. 6A in the preferred embodiment, when the System has determined that a valid command, known S604, and complete S607, is contained in the input stream and the command is not an abort command or CAS, the command status is set to "System Valid" or "Application Valid" at S612, and command is processed in S700, FIGS. 7A and 7B. Upon successful completion of processing the command in the input stream, the System goes to Process User Input (FIG. 4A), which returns to Activate System (FIG. 3), which returns S302 to wait for the next user input. As a variation of the preferred embodiment, after FIG. 4A, the System can be designed to return to S301 (optional) and the user can be informed of the current command (CC) Status and prompted for input or the next command at this step S301 in place of or in addition to being prompted as S410 or S411 in FIG. 4A.

In order to process a command in the preferred embodiment, which once validated is known as the Current Command (CC) the System must perform a series of tasks as shown in FIGS. 7A and 7B Process Command. Which steps are taken at this point depends in part on the CC status.

After a CC is processed, the CD indicates whether the System should return to wait for user input FIG. 3 S302, return to the previous application that was in use before the CC or enter a content loop as shown in FIGS. 8A and 8B and 9A and 9B and other FIGS. 8C-8J and 9C-9H. There are instances when the system itself may need information about its state with respect to an application so it can return to the same state when it comes back to that application (for example whether the application is in content loop or not and which facet of the MFGUI it is assigned to). This may also be necessary when the system itself is being used as the operating system or a component of the operating system.

In the preferred embodiment, when it is necessary or desirable to maintain such information, preserving the information about the system state that is needed in order to return to the previous state takes place in S701, if required, and enables the System to return to the previous application in the same state it was at prior to switching to another application, when the subsequent application is closed or focus is returned to the previous application. Preserving system states, for example returning focus to a previous application that had focus when a subsequent application window is closed, is well known in the art and need not be discussed in great detail herein.

In alternate embodiments, preserving the system state or the state of an application to which the system may return after using another application may be done at other steps or accomplished in other ways such as employing recursive calls or stacks, the object being to enable the System to receive a new command while in one application, process a System command or an application command in another application, and then return to the former application in its previous state at the same point where it left. In yet other alternate embodiments, particularly where the system is a stand-alone application or shell, returning the System to its previous state may be left to the operating system, or if the System itself is being used as an operating system, this function may be done by the System, similar to the way current state-of-the-art operating systems return to the previous application that had focus when a foreground application is closed or minimized.

Returning to FIGS. 7A and 7B, after preserving the system state S701, the System then needs to determine if the CC is a system command that impacts only the system (for example a command to change the number of facets in the MFGUI), or an application command that impacts a registered application (for example, a command to launch an application), and this is done at steps S702-S703. In the preferred embodiment, this is done by testing for the command status, which was set to either "System Valid" or "Application Valid" in FIG. 6A S612.

In steps S702-S703, if the CC is determined to impact only the system, (command status "system valid") the command is sent directly to be processed. In this preferred embodiment, prior to processing a system command, the system needs to determine if the command is a command to return to a previous state S713, for example a "go back" command, or if the command is a command to exit or shutdown the system S714. Note that an exit command can be one to exit, suspend, shutdown, logoff or restart the system, and that the system can be required to perform a set of at least one function prior to completing any exit/shutdown command, for example preserving the system state and/or other information. If the command is to return to a previous state, the previous state is restored S725. It should be noted at this point that a system state prior to processing a CC for restoring the previous system state was preserved in S701 prior to the system leaving that state, and that once this command is processed at S725, this now becomes the previous system state, allowing the user to go back to that system state if desired.

If the command is to exit or shutdown the system, the system exits or shuts down S715 after performing any required exit or shutdown tasks, such as preserving information that needs to be preserved. Otherwise, the command is processed at S716. Note that in some variations of the preferred or alternate embodiments, it may be desirable to preserve some or all aspects of the system state before exiting so that if desired, either by default or as determined by the user, the system can return to the state it was in prior to exiting the next time it is started. It may also be optional and desirable to prompt the user to confirm an exit system command prior to it being processed in order to minimize the potential of an unintentional exit from the system. Also note that in some variations of this preferred or alternate embodiments, these tests for restoring a previous state and exit/shutdown the system can be omitted and these commands can just be processed by the system at S716.

In variations of the preferred and alternate embodiments, the system can be designed to use only one of either command status "system valid" or "application valid" where the choice is one or the other, and if the command status is not set to one, then it is the other is assumed. For example, if "system valid" is used, and there is no command status set, then in this alternate embodiment the system should treat the command as "application valid."

If at S703 the command status is set to "Application Valid" the CC is determined to be a command associated with a registered application (referred to as the Current Command Application or CCA). If there is more than one application that can be associated with the command and disambiguation is required, this step may include prompting the user to resolve this ambiguity by giving the user a choice from among the possible applications which can be processed by the command, and processing said command based upon subsequent user input. If there is no ambiguity or once the ambiguity is resolved, the System then goes on to determine if the CCA is an application which is already active S704-S705. When a CCA is already active, and if the application is one that needs to be displayed in one of the facets of the MFGUI and it is not already so displayed the active application is set to one of the facets of the MFGUI S710, the facet is given the focus and the CCA is granted SPOCUS and becomes speech activated. If a CCA is not active, the CCA is started S706, and if the CCA starts successfully S707-S708, then if required, the CCA is set to one of the facets in the MFGUI S710, the facet has focus and CCA is granted SPOCUS and becomes speech activated. Typically, the CCA has focus and is placed in a default facet, or any available facet. It may also replace another visible application if all facets are being used. If desired in step S710, the System can prompt the user to select a facet in the MFGUI in which to display the application.

If the CCA does not start successfully (S708), the System sets the Command Status to "Processed Error" S709, and goes back to (FIG. 6A) which returns to FIG. 4A S408 and leads to the user being informed at S4410 that the application failed to start, and the system ultimately returns to FIG. 3 S302 to wait for the next command.

If the CCA was already started (active) S705, or is started successfully S708, the system goes to S710 to select a facet and display the application in the MFGUI (if required) and goes on to determine if the command was a command to start or switch to an application S711-S712. If the command was a command to start or switch to an application, the command was completed when the application was displayed and/or given focus on the MFGUI, and the system goes to S718 to set the command status to "processed."

If the command was not to start or switch to an application, the system goes to S716 to process the command. It should be noted at this point that the step of processing the command may include a step of disambiguation, when a recognized command may apply to more than one possible application and process. If such disambiguation is required, then the system can prompt the user to make a choice (or obtain other disambiguation information) and the command is processed accordingly. It should also be noted that the command input can also be aborted at this step of disambiguation.

After a command has been sent for processing S716, the system determines if the command was processed successfully or not S717, and the CC status is either set to "processed" S718 or "processed error" S719, so that the user can be informed and/or prompted in FIG. 4A when the system returns at S410.

Moving on to S717, if the CC was not successfully processed, the Command Status is set to "Processed Error" at S719 optionally the data construct is cleared S726 and the System goes to (FIG. 6A) which returns to FIG. 4A S408 where the user is informed at S410 that the CC was not processed successfully. At this point, System returns to FIG. 3 waiting for user input at S302, although in some alternate embodiments the user may be prompted to reenter the command. Optionally, instead of prompting the user at S410, the System can return to S301 and from that point either inform the user that the command was not processed successfully, or prompt the user to reenter the command or to enter a new command.

If at S717, the system determines that the command is successfully processed, the command status is set to "processed" S718 and the System goes on to S720-S721 where it determines from information in the CD associated with the CC, whether or not the CC required starting a content loop, and if "yes" the system goes on to FIGS. 8A and 8B S800 and starts a content loop for the CCA. The function of the content loop is discussed in detail below under FIGS. 8A and 8B, and 9A and 9B. Alternatively, the steps of determining if the CC starts a content loop S720-S721 and starting of the content loop S800 can take place within S716 as steps of processing the CC, and in this alternate embodiment (not shown) those steps are part of the steps for processing a command S716.

If the CC did not require starting a content loop, the system determines from information in the CD associated with the CC, whether or not the CC required restoring the System to its previous state S722-S723. If not, then optionally the data construct is cleared at S726, and the System goes on to FIG. 6A which returns to FIG. 4A S408 and ultimately returns to FIG. 3 to wait for user input at S302. Alternatively, at this point, the System can go to S301, and the user can be informed and prompted at this point instead of at S408 as in the preferred embodiment.

If the CC required returning to the previous state as indicated in the CD for that command, S722-S723, then at optionally the user is informed of the command status S724, the previous system state is restored and if required the system sets SPOCUS to the previous application as its system state was preserved in step S701, thereby restoring the previous CCA as it was before the command and if the previous CCA was in content loop then placing the CCA from the previous system state back in a content loop S800. An example of this is while in a word processing application, the user speaks a CAS followed by the command "turn on the kitchen lights." If after the kitchen lights are turned on, information in the CD for that command indicates that the System should return to the previous state, then in this example the system returns to the word processing application in content loop as it was left. If the previous CCA was not in content loop as determined at S720-S721, then the System goes on to FIG. 6A which returns to FIG. 4A S408 and ultimately returns to FIG. 3 to wait for user input S302 with the focus on the previous CCA as it was before the CC.

FIGS. 7E and 7F corresponds to an alternate embodiment with a content loop that requires a CAS before any command, and thus enables system commands and application commands to given and processed from content loop, and corresponds to FIGS. 8E and 8F and 9C and 9D. The main difference here is that a CAS is used preceding all commands, and the command status is set to System Valid, Application Valid or CCA valid. When returning to FIGS. 8E and 8F, if a command status is CCA valid, it is processed in the CCA within content loop. Otherwise, when the system returns to FIGS. 7E and 7F from content loop, the system tests for command status at S728-S729, and if the command status is System Valid or Application Valid, the system goes to S703 to begin processing the system command or application command that was issued from and identified in content loop, and when the system is finished processing the command, it S723-S725 and returns to the content loop S800 in its previous state. Note that after a command to start another application, the system will not always return to the previous system state directly after starting that application, but rather will go that application, and the previous state will be restored after the user is finished with the second application. For example, if while in content loop in application one, the user issues a command to start application two which also requires a content loop, then application two will start and enter content loop. When the user is finished with application two (the user closes or releases focus from application two), then the system will return to S722-S723 and will be required to return to the previous state (application 1), and at S725 the system will return to application one in content loop.

FIGS. 7G and 7H corresponds to an alternate embodiment employing a CAS prior to any command (system application or CCA) while in content loop (similar to FIGS. 7E and 7F), and uses saved System States to process system commands and application commands outside of the CCA, thereby enabling the system to process commands from content loop in a recursive manner and return to the previous State when each command is finished processing. The difference between FIGS. 7E and 7F and FIGS. 7G and 7H, is that the former exits the CCA to process system and application commands and returns to content loop by way of S800, and the latter uses a stack of system states to accomplish recursive behavior, enabling the user to leave one application from content loop, work with successive applications and exit them in reverse order when done with each succeeding application. In this alternate embodiment (FIGS. 7G and 7H), if the CC is not a CCA command (meaning the CC is a System Command or an Application Command for an application other than the CCA), the system saves its current state in a stack in FIGS. 9E and 9F (discussed below) at S932, sets the command status to "system valid" or "application valid" S933 and goes to FIGS. 7G and 7H S702 in a new stack to process the command. If command completion requires a return to the previous state (S724-S724), then at S731 the system returns to the previous stack at FIGS. 9E and 9F S935 when processing of the command is complete, the data construct is cleared at S936, and the system returns to FIGS. 8G and 8H where the system will return to S803, at which no CCA S803-S819 or data input S805 will be found and the system returns to S801-S802 to wait for the next user input.

Moving on to FIGS. 8A and 8B, which illustrates the content loop as used in the preferred embodiment by the system to speech enable applications which receive input of both data and commands. FIGS. 8A and 8B and 9A and 9B illustrate the Content Loop where the CCA receives focus, has SPOCUS, and processes the incoming input stream with respect to that application. In content loop, the incoming input stream from speech input received by the System is parsed to determine if it is data for the CCA, or if it contains a command and if so, is the command a known command (CCA command, dictation command, CAS or exit command), and if so does the command include all the necessary parameters needed to process the command successfully. The system searches the input stream for command, and if the input stream does not contain commands, the input stream is passed to the CCA as data or ignored (depending on the embodiment). If the input stream contains commands, then the System must then determine if the commands are CCA commands, or if they belong in the context of data for the CCA, and in alternate embodiments if they are commands for the system or applications other than the CCA. If the command is not in context of the input, then it is determined to be a command, and if it is in context it is passed to the CCA as data. The function of a Content Loop will become clear from the following discussion.

As shown in FIGS. 8A and 8B, when an application has entered content loop, the CCA has SPOCUS and the CCA is speech enabled. As the system enters and cycles through the content loop, the system clears the data construct S801, waits for and receives the input stream from the user input S802. When user input is received, the system enters the Parse Complex (FIGS. 9A and 9B) S900 (as described below) which parses and analyzes the input stream to determine if it contains data or a command. Upon returning from the Parse Complex process in S900, the System has parsed components of the input stream in a data construct, and for each parsed component the system determines if the data construct contains a CCA command or a CAS S803-S804. If data is present, and if a component of the streamed data in the data construct does not contain a CCA command or a CAS, it is data that belongs in the CCA and it is passed to the CCA to be placed in the required field of the CCA at S805, and the System returns to S801 to clear the data construct, and then to S802 to await the next input from the user.

If a command is found in the data construct at S804, then the system determines if the command is a CAS at S806, and if the command is a CAS (command status CAS Valid) the system will remain in command mode when it cycles through FIGS. 7A and 7B, FIG. 6A and FIG. 4A and returns to FIG. 3 S302 in command mode to wait for the next command input. In the preferred embodiment, when the system is in content loop, a CAS is required before the user can issue a system command or an application command for an application other than the CCA, and if a CAS is spoken the system leaves content loop to process the system command or application command, returning to content loop in the CCA only if information in the commands dictionary indicates so after the next command is processed. Optionally, if the System returns to FIG. 3 while in command mode, the System may go to S301 to prompt the user to input a command, in place of processing that step at S410.

If a CAS is not found at S806, then the command found in the data construct is a CCA command (command status CCA valid as set in FIGS. 9A and 9B) S909. Optionally, the step S909 can be omitted and if a command is not a CAS it is a CCA command by default. A CCA Command is an application command that belongs to the CCA, for example, a command to save the text that has been written in a word processing application which is currently in content loop and has focus. When a CCA command is present it is processed in the CCA at S807, and if the CCA command is other than an exit CCA command S808-S809, after processing the command in the CCA, the system remains in content loop and returns to S801 where it clears the data construct and goes to S802 to wait for and receive the next input from the user.

If the CCA command is a command to exit the CCA S808-S809, the CCA exits and the command status having been set to "processed" before entering content loop S718 the system branches back through FIGS. 6A and 4A, returning to FIG. 3 S302 to wait for the user to input the next command. Note that there is a difference between a command to exit a CCA S808 and the command to exit/shutdown the System S714. The former closes the CCA and the system returns to S302 to wait for the next command input, and the latter exits or shuts down the system at S715 after performing any required exit/shutdown functions. Also note that a CCA command within an application can exit the CCA, or a system command from outside an application can exit the system or any application including the CCA.

It should be noted at this point, as will become evident in the discussion on FIGS. 9A and 9B below, that the Parse Complex process S900 can return multiple components of the input stream, and each component is processed separately in the Content Loop of FIGS. 8A and 8B. For example, a complex command might contain data that goes into several different fields of the CCA, and might also contain one or more CCA application commands. In order to enable the System to process complex commands, the Content Loop S800 processes each component of the data returned from the Parse Complex process S900 so that each such component is routed and processed as required by the CCA. For example, an input stream may contain data, and the commands to save and print the data, and in this example all three are acted upon by the CCA so that the data is entered in the CCA, the data is saved and the data is printed.

In alternate embodiments, while in content loop the system may be designed to determine if a command belongs to another application without the need for a preceding CAS, and if so start that application if required and grant focus to that other application after saving the current System state in a "System State" memory location stack, thereby suspending the CCA and current content loop. If employed in the System, this behavior enables the system to have multiple applications running in content loops at any given time, allowing the user to switch between applications in content loop by restoring the System State for the desired application that was saved in its System State memory location stack. When multiple content loops are suspended, there is a corresponding amount of memory locations where each has its System State saved. This behavior has a similar effect to changing focus between windows in systems of the non-speech enabled prior art.

In a variation of the preferred embodiment, it may also be desirable to limit the scope of commands while in content loop to the commands that are applicable only to the CCA.

In some embodiments, while the system is in content loop, it may be desirable to have a CAS precede all commands (system, application and CCA) both system commands and application commands. FIGS. 8E and 8F and the corresponding FIGS. 7E and 7F and 9C and 9D show an alternate embodiment with a content loop that requires a CAS to precede all commands. The benefit of this alternate embodiment is that all input that occurs without a preceding CAS is assumed to be data for the CCA. In a variation of this alternate embodiment, a CAS or variations of the CAS can be a command that switches the system between modes for accepting only data or only commands, and dependent on that mode the input to the CCA is processed accordingly. In this variation, if the system is in data mode, then it is not necessary to test the input for command and whether or not those commands are in context.

In the alternate embodiment shown in FIGS. 8E and 8F, if the data construct contains a command at S812, the command is further tested to determine if the command status is incomplete S813. If the command status is "incomplete," the user is prompted at S814, and the system loops back to S802 to wait for input of the required command information. After the user provides the next input, the system cycles back through FIGS. 9C and 9D parse complex. If the command status is not "incomplete," the system tests for the command status "unknown" at S815, optionally the user is informed of the command status at S817, and the system cycles back to S801-S802 to wait for the next user input. Otherwise, at S816-S818 the command is tested to determine if it is a CCA command. If the command is not a CCA command at S818, (command status "System Valid" or "Application Valid") the system will return to FIGS. 7E and 7F to process the system or application command. If the command status is "CAS Valid" the system will return through FIGS. 6A, 4A and 3 ending up at S302 in command mode to wait for the next user input.

The steps S813 and S815 in FIGS. 8E and 8F are optional and are intended to be used only if the path employing steps S924 and S925 are taken in FIGS. 9C and 9D. These steps enable processing of incomplete or unknown commands within content loop FIGS. 8E and 8F.

It should be noted that in yet another variation of this alternate embodiment, the use of a CAS while in content loop can also be eliminated, and in this variation the System determines if a command belongs to the CCA, the system or another application based on information in the Commands Dictionary, giving priority to the CCA if an application command is valid in more than one application and the application is not specified. In another variation, the system can also be designed so that a CAS will result in the command status being set to "unknown" so the user is prompted for a command at S410, and returns to S302 to wait for the user to respond. The variations discussed here are not meant to be limiting, but rather intended to illustrate the flexibility in which the System can be designed with variations to achieve desired design objectives and results.

FIGS. 8G and 8H and the corresponding FIGS. 7G and 7H and 9E and 9F, and enable recursive behavior in content loop to process any command (system application or CCA) while in content loop, which uses a stack of saved System States to process system commands and application commands outside of the CCA, thereby enabling the system to process commands from content loop in a recursive manner and return to the previous state when each command is finished processing. In this recursive preferred embodiment, there is no need to test for a CAS in FIG. 8, as input of a CAS is managed in FIG. 9 parse complex. The system never leaves content loop with a CAS, but only by a command initiated by a CAS or by an exit CCA command. In the multitasking environment of modern operating systems, this recursive behavior for processing some commands may be user transparent.

FIGS. 8I and 8J corresponds to another alternate embodiment in which a CAS precedes all commands while in content loop, and the system can cycle through one or more command validation loops in FIGS. 9G and 9H if a known command is not valid (incomplete), thereby enabling the user to validate commands within content loop. This is discussed in more detail below in the discussion of FIGS. 9G and 9H.

Returning to the preferred embodiment, the analysis and parsing of the incoming input stream when the system is in a content loop (FIGS. 9A and 9B, Parse Complex process) S900 is a step in the Content Loop and is related to the CCA. Referring now to the Parse Complex process in FIGS. 9A and 9B, as each phrase received from the incoming input stream is parsed into the data construct, the system searches the data construct to determine if commands are present, and if they are CCA commands, a CAS or belong in the context of input of data that belongs in the CCA. Each component of the input stream is returned as data components and/or command components, and if command components the type of command, which in the preferred embodiment are either a CAS (which will leave content loop to allow the user to input system commands or application commands for applications other than the CCA) or CCA commands (which belong to the CCA that is currently in content loop). Therefore, in the preferred embodiment, while the CCA is in content loop, the system does not require a CAS to precede CCA commands and a CAS must used to precede input of a command that is intended for the system or another application.

Moving on to steps S901-S905, the incoming input stream is parsed into a context based data construct S901 and the components are tested for a command at S902 by comparing the data construct to the CD to search for a matching command. If the data construct does not contain a command (S903) the input stream set to be passed as data for the CCA S912, and the System goes back to (FIGS. 8A and 8B) where it returns to S803 and the data is placed in the required field of the CCA in step S805. In the preferred embodiment, the input of incomplete or invalid commands is typically passed to the CCA as data. However, optionally the user can be informed of the input of an incomplete or invalid command at S913, and if desired the optional path shown by the dotted line coming from S913 can be taken so that no data is passed to the CCA from a failed command input within content loop.

Returning back to FIGS. 9A and 9B, if the data construct contains a command S903, then the System searches the locus of words around the command to determine if the command is within the scope of those words S904. Natural language modeling or other context based analysis can be used in this process. Alternatively, a pause before and/or after speaking a command can be used to make this determination.

For example, if the system uses the word "computer" as a CAS, then an example of a command that is within context of the input stream while the user is in a dictation program, is the statement "My computer needs a new modem." In this instance, the word "computer" is known to the system as a CAS, but is passed through to the CCA as data because it has been determined to be within the context of a sentence being input into the dictation application that is currently the CCA in content loop. In this example, if the user had said "computer" without an accompanying sentence, or in some variations of the system, if the user had paused before and/or after saying "computer" then the system would have instead determined that the utterance was a CAS, and would have proceeded accordingly. Other examples are the statement "I will need to start a new paragraph and print my document when I get to the end of this topic" or "I will have to exit this application when I'm finished." Each of these statements contains a command word that corresponds to commands available for processing, but the command is determined by the system to be within the context of dictation, and is accordingly set to be passed on to the CCA as data in S912.

The use of a basic natural language model, or the use of a pause before and after a command are the preferred means to determine if a command is in context or not, however, to improve speech recognition accuracy, the speech to text engine and/or the system can use more sophisticated means including but not limited to variations of natural language modeling, statistical analysis and/or biasing, or any algorithm that enables the system to determine the context of commands found within the input stream. Such statistical models and/or biases may be derived empirically to optimize system performance, or employ an expert-type system.

Returning to FIGS. 9A and 9B, if the data construct is found to contain a match to a command in S903 and the command is determined not to be in context (outside the scope of the context of adjacent words spoken) S904 and S905, then that component of the input stream is determined to be a command, and in the preferred embodiment, the System must determine if it is valid (complete) S906-S907, meaning that it has all the command information needed for the command to be processed. This is accomplished by referring to the CD where the System checks to determine if all the required parameters needed for processing that command are present. When determining if a command is present and valid, it may be desirable to limit the system to checking only for commands which are applicable to the CCA as indicated in the commands dictionary, thereby speeding up the process and requiring less processing power.

Referring to the CD to search for a matching command may be performed by at least one of referring to the CD directly, building at least one of grammars and representations from the CD, and by other means such as dynamically generating at least one of grammars and representations for the purpose of such comparison and searching.

Typically, CCA commands are not complex, and in the preferred embodiment, if the command of a data component contains a known CCA command but is not valid because it is not complete S906-S907, then optionally the user is informed S913, and depending on the embodiment, the data in the input stream may be passed to the CCA as data S912, or it is not set to be passed to the CCA as data and will be ignored when the system returns to FIGS. 8A and 8B. If the command is valid, the system goes on to optional steps S914 and S915 of the preferred embodiment in FIGS. 9A and 9B, which show the use of Dictation Commands (DC) in content loop. Typically, speech to text engines manage dictation commands, so these steps are optional, and used if the speech to text engine used with the system is not enabled for dictation commands, or if it is desirable for the system to manage this function. This enables the system to use Dictation Commands (DC's) with a CCA in content loop.

When employing these steps to enable the system for DC's, the Parse complex also identifies DC's S914, generates the associated dictation command data and places it at the appropriate point in the input stream S915 so it can be passed to the CCA as part of the input stream S912. An example of this is the dictation command "new paragraph" which is not an actual command, but results in two carriage return characters being inserted at the point where this DC was spoken, which when passed to the CCA results in a new paragraph at that point in the input stream. Another example is the dictation command "period" which if not in context of the words being spoken will generate the character "." instead of the word "period." For example, if the user says "Jane was late for her second period class period" the first occurrence of the word "period" is in context of the sentence, and the second occurrence is determined to be a dictation command to insert a period. In this example, the following data would be passed to the CCA: "Jane was late for her second period class".

In a variation of the preferred embodiment as shown in FIGS. 9C and 9D and discussed in more detail below, the system may find a Dictation Command (DC) that is in context. When the system uses DC's, if potential commands (or DC' in FIGS. 9C and 9D) including DC commands are determined to be in context S905 (meaning the input was intended to be part of the input stream and not a command), then that input is set to be passed to the CCA as a data element S912 and the system goes to S913-S803 (FIGS. 8A and 8B) where it returns to S803 and the data is placed in the required field of the CCA at S805. Otherwise, the DC characters are generated and placed at the appropriate point in the input stream to be placed as data in the CCA at S805.

If the command is valid S907, and is not a dictation command S914, or if the system does not use dictation commands or relies on the text to speech engine for that functionality, then the system goes on to S908 to determine if the command is a CAS. If the command is a CAS, the system state is preserved S910, and the command status is set to CAS valid S911, and the system will branch back through FIGS. 6A, 4A and 3, returning to S302 to wait for the user to input a command. If the command is not a CAS at S908, then it is a CCA command, and the command status is set to "CCA Valid" at S909. When the system returns to FIGS. 8A and 8B a command status of "CAS Valid" at S806 will result in returning to S302 to wait for a command, and a command status of "CCA Valid" will result in the command being processed in the CCA at S807.

In alternate embodiments, some of which are discussed below, the system may be dealing with applications that include complex application commands, and it may be desirable to design the system to include a command validation loop after S905, as shown in FIGS. 9E and 9F and 9G and 9H. This command validation loop can be similar to the loop illustrated in FIGS. 6E and 6F S607-S618, so that if a known command is found but the command is not valid because the input stream does not include the required command elements (parameters) needed for processing that command, then the system can prompt the user for the missing command information, thereby enabling the user to complete the command.

In the preferred embodiment, the system must leave a content loop in order to process a system command or an application command for an application other than the CCA, and a CAS is required in order to do this. Thus, if the command is determined to be a CAS at S908, then the system state (CCA, Content Loop) is preserved S910, so that if it is required later, the System can return to this CCA content loop as it left it. The System then goes on to S911 where the command status is set to "CAS" and proceeds to FIGS. 8A and 8B where it returns to S803. The command status CAS Valid is detected as S806 and the system ultimately returns to through FIG. 6A and FIG. 4A leading back to FIG. 3 S302 to wait for the user to input a command, where the system is left in command mode (because the command status is CCA), and the system behaves as if a CAS had been spoken from S302 and the system had cycled through FIG. 5A to set command mode. Optionally, instead of prompting the user at S410, it may be desirable to return to S301 and prompt the user for command information from this step.

In one or more variations of this preferred embodiment, the steps of setting command status to "CAS Valid" may take place at a lower level, such as in FIGS. 8A and 8B in the branch following S806 (instead of at FIGS. 9A and 9B, S911).

Finally, if a command is valid to both an application and the system, typically the system is given priority in the preferred embodiment, although in some embodiments it may be desirable to give an application or CCA command priority over the system, particularly while in content loop, depending on one or more of the operating objectives for the system, the application being used or user preference, particularly when the system is in content loop and the command is applicable to both the CCA and the system. It may also be desirable to prompt the user to choose which application (or the system) should be used to process the command.

FIGS. 9C and 9D, and the corresponding FIGS. 8E and 8F, 7E and 7F together with the other FIGures of the preferred embodiment show an alternate embodiment that employs a CAS prior to any command (system, application or CCA) while in content loop, and the system assumes that any input not preceding a CAS is intended as data input for the CCA. In this alternate embodiment, a CAS must be spoken before issuing any system, application or CCA command; however, it should be noted that the command status CAS valid is not required to be used at this point in the System, as a CAS must precede all commands, and as opposed to the preferred embodiment, system commands and application commands for other than the CCA can be initiated directly from the current content loop.

When the system detects a CAS S917 the CAS is tested to determine if it is in context of the input or not S918-S905. If the CAS is determined to be in context S905, it is passed to the CCA as data S912. If the CAS is not in context of the input S905 the system prompts the user for a command S919. The then system waits for user input S920, and when the user inputs a command, the input stream is parsed into the data construct S921. At S903 the system determines if the data construct contains a command and if so the command type and if the command is valid (complete) S922-S907. If the data construct does not contain a command S903 or if the command is not valid S907 the system can follow any one of the options shown from S924 and described above.

Step S924 of FIGS. 9C and 9D illustrates several variations of alternate embodiments. Each variation provides a different option for processing the input of a command following a CAS. These options are taken as a path from S924 when the data construct does not contain a command at S903 or when the command is not valid at S907. One such option is to return to S919 which results in a command validation loop, and if applicable at S919 the user is promoted for the missing command information. Another option is to inform the user of no command found S925, and to set the command status to unknown or incomplete S926 which will result in a command validation loop at steps S813 and S815 in FIGS. 8E and 8F. Another option is to pass the invalid command input to the CCA as data at S912. Still another option, shown by the dotted line leaving S925 is to optionally clear the data construct at S927 so as to not pass the invalid command input to the CCA and return to FIGS. 8E and 8F which cycles through S811, S812 and S805 where there will be no data. Alternatively, S927 can be omitted and the invalid command input can be set to be ignored at S805 which will result in the invalid command data being cleared from the data construct at S801. If this latter option is taken, the step of informing the user at S925 is also optional.

The system design options shown in step S924 in this FIGS. 9C and 9D are not intended to be limiting, but rather to illustrate the flexibility in the design and implementation of the system. Additionally, it should also be noted that while these options are illustrated only in this FIGS. 9C and 9D, these or similar options can be applied to variations of the preferred embodiment, or likewise to alternate embodiments when desired and determined that the system design and performance will benefit from these alternatives.

Moving on to the alternate embodiment shown in FIGS. 9E and 9F, which corresponds to FIGS. 8G and 8H, 7G and 7H, and the other Figures from the preferred embodiment, and which enables the System with recursive behavior. This stack behavior enables the user to leave one application in content loop for another, and another (and so on) in sequence, returning to the previous application in the state in which it was left when the user closes each succeeding application. The behavior of this alternate embodiment is much like that of "windowed" systems of the non-speech enabled prior art where closing one window returns focus to the window that had focus before it. However, when the system and MFGUI are used together, focus may move from one application to another while both remain visible, or an application may be closed or moved to the background where in which case the application that previously had active focus will then again receive active focus.

As in some of the other alternate embodiments, in this embodiment a CAS must precede any command issued from content loop, and commands which are known and incomplete can be validated or aborted directly within the Parse Complex. Also, in this alternate embodiment, the System will not leave the content loop with a CAS, but only by a command initiated with a CAS or by an exit CCA command. If a CAS is found at S930, it results in a command input and validation loop following S905. Recursive behavior is accomplished by preserving system states in memory stacks, leaving the current stack to process a system command or application command for other than the CCA at S934 and returning at S935 when the succeeding stack is closed.

In this alternate embodiment, if the command is a system command or application command, the system state is preserved in a stack S932, the command status is set to "System Valid" or "Application Valid" S933, and at S934 the command is processed in a new stack starting at FIGS. 7G and 7H S702. When the system command or application command is processed, the system may stay in the new stack (for example as in a command to start or switch to another application). When that stack is closed, or if the new stack was needed only for processing the command, the system returns to S935 and restores the system state for the CCA Content Loop from which the command was issued. The data construct is cleared at S936, and returning to S803 without any input present for the CCA, the System cycles back to S802 to wait for the next command input.

FIGS. 9G and 9H corresponds to another alternate embodiment in which a CAS must precede all commands while in content loop, and which corresponds to FIGS. 8I and 8J, 7E and 7F, 6A, 5A, 4A, 3, 2, and 1. In this alternate embodiment the system enables the user to complete an incomplete command issued while in content loop within the parse complex FIGS. 9G and 9H, by employing a command validation loop within said parse complex. System commands and application commands can be given and validated from within content loop, and processed by the system outside of the current content loop.

If the data construct contains a CAS S916-917, and the CAS is not in context S918-S905, the data construct is cleared and the user is prompted for a command. If the data construct does not contain a command after a CAS S903, the user is prompted for a command S937, the data construct is cleared S931, and the system returns to S803 where no input will be present, thereby returning to S802 to wait for the next input.

If the data construct contains a command at S903, the system determines the command type and if the command is valid S922-S907. If the command is not valid (incomplete) at S907, the system can cycle through one or more command validation loops in FIGS. 9G and 9H S938 to S930, thereby enabling the user to validate commands within content loop. When a command is not valid as determined in S907, the user is prompted for the missing command information at S923, and the system goes back to S920 to wait for user input. A command input can be canceled and restarted by a CAS, which if detected at S930 returns to S938 where the data construct is cleared and the user can restart his or her command input. The user can abort the command input with an abort command S939, which clears the data construct at S931, and returns to FIGS. 8I and 8J S803 where no input will be present, thereby returning to S802 to wait for the next input.

When a command is valid S907, not a CAS S930 and not an abort command S939, the command status will be set depending on the command at S909 or S940, which will result in a CCA command being processed in the CCA in FIGS. 8I and 8J if the command status was set to CCA Valid at S909 (CCA command). If the command status was set to "System Valid" or "Application Valid" in S940, (system commands or application commands for applications other than the CCA) the command will be processed in FIGS. 7E and 7F.

Moving on to the alternate embodiment illustrated by FIGS. 1, 2, 3, 4B, 5B, 6B and 6C, 7C and 7D, 8C and 8D and 10A, this series of flowcharts details an alternate embodiment where the System is in command mode all the time, and assumes all input outside of content loop is a command. In this embodiment, a CAS is not utilized, and the flow is much like the flow in the preferred embodiment, with the exception that the steps in the Parse Mode to search for a CAS (FIG. 5A) is omitted and the parsing of the input stream into a data construct is done in FIG. 5B S551 which step corresponds to the similar step S601 in FIG. 6A in the preferred embodiment.

In this alternate embodiment, when in content loop, a command for the CCA is applicable to more than one application, the CCA will have the priority, and the command will be processed in the CCA. Accordingly, for some commands, the user must switch to the System or to another application to issue the desired command. Optionally, this alternate embodiment can be designed to give the user a choice if a command is applicable to more than one application, and to allow the choice to be remembered at any given point in the system by adding information to the commands dictionary or otherwise storing this information.

In another variation from the preferred embodiment, within FIGS. 8C and 8D in the Parse Complex, shows two possible options for proceeding after S863, and either option is a variation of this embodiment. In one variation, if a command is not valid at S857, then the system optionally informs the user of command failure and returns to Content Loop FIGS. 7C and 7D. Alternately, the system can be designed to enable the user to complete a command which is not valid. If this path is followed, the system prompts the user for command information and waits for user input at S864. When the user provides new input, the system acquires the input and loops back to S851 where the input is parsed into the context based data construct repeating the command validation process.

Another variation of this alternate embodiment employs a CAS or series of CASs to toggle the system between command mode, wait mode and other possible modes. For example, when the system placed in command mode, all input is assumed to be command input. If the system is placed in some other mode, it can be used for other functions which utilize speech input, for example, conferencing, telephony, etc., with reduced risk of the input stream being misinterpreted or taken out of context.

FIGS. 10A, 10B and 10C show variations of the steps for possible processing of an application command in the CCA (S807 in the preferred embodiment), and how the System can manage processing of CCA commands. FIGS. 10A, 10B and 10C are not intended to show the exclusive methods useful in accordance with the invention for processing commands, and are merely exemplary of various schemas. In fact, it is possible for command processing to be assumed by an application, without departing from the spirit of the present application. It should also be noted that while in content loop in the CCA, available commands may be limited to CCA commands and certain system commands in order to minimize the possibility of command ambiguity.

If a CCA command is processed successfully, the system continues on in content loop, moving to S808 in the preferred embodiment. When the CCA fails to process a command, typically an error condition is set and the user is prompted. In this case, the command choices for the error condition are typically limited to a few simple commands, and the system searches only for applicable command in the input stream. For example, if an application failed to process a command, the application or the system may present the user with a dialog that displays two options, cancel and retry. These are the only two commands the system will look for or respond to while this dialog is displayed. Therefore, a CAS does not need to precede a command at this state in the System.

FIG. 10A shows the preferred embodiment for processing a command in the CCA. In FIG. 10B a new stack is opened for the error condition at S302 (alternately S601), and the error condition is processed at the System level. In FIG. 10C, a new stack is opened and the error condition is processed in a new process (FIG. 11), which is similar to an application or subprocess of the CCA.

In the error condition stack (FIG. 11), the system waits for user input, parses the user input into a data construct S1102, and determines if the data construct contains a command applicable to the error condition. If so, the error command is processed in the new stack at S716, and the system returns to S1006, and continues on to S808 in content loop. If a valid command is not contained in the data construct, the system continues to cycle through the error condition until the user responds with a valid command. Alternately the error condition can be processed entirely within in the new stack (not shown), and when the error condition is cleared the new stack closes leaving S807 and going to S808 to continue the content loop.

FIG. 12 shows an overall view of the system flow.

FIG. 13 shows an overview of the System.

FIG. 14 shows some examples of possible facet configurations in the MFGUI, which can change as needed to accommodate the desired number of applications.

FIGS. 15A and 15B shows a decision chart for priorities at executing commands. As discussed in Section 6.5.12 above, some commands may be valid for both the system and one or more applications. FIGS. 15A and 15B illustrates one of the ways the system may the resulting command ambiguities based on the order of priorities between the various types of commands at various points in the system. Note that every time the system prompts the user, the user may abort the command input. The abort would be represented by arrows to the Return box, but have been omitted from these FIGS. 15A and 15B. FIGS. 15A and 15B are not intended to be limiting, but rather to show one of the possible ways in which the system can be designed to automate or assign command priority. It should be noted that alternate embodiments and variations may be designed differently to meet a wide variety of design objectives.

In alternate embodiments (some of which are shown and discussed above), the system is not restricted to processing commands only in the CCA while it is in content loop. In such embodiments, the system gives priority to the CCA for any command associated with the CCA, but can process a known command belonging to the system or another application at any point. For example, in such an alternate embodiment, if a command is not associated the CCA, but is known to be valid to the system or to another application, the system processes that command and depending on the parameters for that command leaves focus with the other application (making it the CCA) when done, or returns to the CCA that had focus when the command was issued. If a command is not valid in the CCA, but valid for more than one other application or valid within for the system, the user can be prompted in these alternate embodiments to choose an application (or the system) in which the command will be processed, or the system can be designed so that it makes the decision based on pre-determined parameters which may be designed into the system or as variables that can be modified. In such alternate embodiments the system ability to detect, manage and process commands outside of the CCA has the effect of replacing the need for a CAS before issuing and processing commands for the system or applications other than the CCA.

The chart in FIGS. 15A and 15B can be better understood with a few of examples that illustrate how command priority can be determined.

In the first example, the user utters the command "Open Garage Door". The command "Open" is valid to both the System (Open (Application Name), the Home Control application (Open Garage Door), and many other applications (for example Open File Name). According to the order of priorities illustrated by in FIGS. 15A and 15B, the system itself will first try to process the command "Open" with the parameter "Garage Door". So it will search the CD for a "Garage Door" command that can be acted upon by the system. When it does not find one, it will search the CD for an application that can process the command "Open" with a parameter of "Garage Door" as something that can be opened, and if the parameter "Garage Door" is registered with the system in the CD, the system find and process the command in the Home Control Application.

Another example is a command that is invalid, such as "Open Jelly Jar." In this case, the system will fail to find an application that can process the command, and the command status will be set to "processed error."

In a third example, the user utters the command "Open File Name". According to the above, the command will be submitted to the System, which typically does not open a file, and accordingly the System will then find the file and search for an application that can open the specified file. As with the previous example, this can be done by searching the CD to determine which application can open the requested file, or by trying to open the file in successive applications, or by searching applications until it finds one that can open the requested file. Alternatively, the system may prompt the user to choose the application if more than one application can open the desired file. If the system finds more than one file with the same name, the user may be prompted to choose one, and may also be prompted to select the desired application in which to open the file. Alternatively, the system may be designed to make the determination based on the information registered in the CD or some other location indicating which application was last used to open the requested file.

If more than one application can process a command, then the priority of for choosing an application will depend upon the system design, which may enable the system to select the application according to a predetermined priority, or the system may be designed to prompt the user to choose an application. In some embodiments, the system may be designed to register and use information about the application previously processed that command, and select the application accordingly. Although these are some methods for resolving the order in which the system and applications have priority over processing commands, the system can be designed in other ways, including but not limited to prompting the user, letting the system decide, or not resolving the ambiguities.

Returning to the first example, in alternate embodiments, if the parameter "Garage Door" is not registered or associated with the Home Control Application in the CD, the system may continue searching and testing for the application that can process this command by attempting to process the command in various applications in which the "open" command is valid, and the system continues this "search and test" process until it either finds the right application and succeeds in processing the command, or has exhausted the possibilities. Alternatively, the system may submit the command to applications in which the "Open" command is valid, until this "polling" finds an application where "Garage Door" is something that can be opened, and in this case the system does this without actually trying to process the command in each application. When the correct application is found, the system processes the command in that application (possibly with a request for user confirmation).

In yet other alternate embodiments, the system may do a combination of both "searching and testing" and "polling," using information in the CD to narrow the list of possible applications.

In yet another alternate embodiment (or variations of the preferred and alternate embodiments discussed herein), it may be desirable to enable the system to register commands and their associated applications in the CD, so that each time the system processes a previously unregistered command or uses a previously unregistered application, it can "learn" from this process and use this information to process the same command next time it is found in the input stream. This alternate embodiment, when employed enables the system to adapt to a wide range of users who may be running a wide variety of applications in a wide variety of configurations. In this alternate embodiment, it may even be desirable to break the CD into multiple tables or data structures, or to structure the CD and searching of the CD in a hierarchal fashion in order to increase the efficiency of searching and the scope of the system.

Returning back to FIGS. 15A and 15B, there are 5 decision diamonds on the left, and these illustrate the possibilities of command priority in the preferred embodiment. The first decision, "CAS" is typically determined at S505. The second decision "System Command" is typically determined at S702, and the remaining decisions are made at S705. At these points, FIGS. 15A and 15B illustrate how the system is enabled to resolve command ambiguities using some of the methods discussed in the examples above, and shows where the system can be adapted to use some of the alternative methods also discussed.

10 CLOSING

Examples of alternate embodiments and variations thereof are not intended to be limiting, but to demonstrate the flexibility in which the System of the present invention can be structured and designed to function in order to perform its objectives, as they may vary according to system design or implementation. Having described the preferred and some alternate embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A speech processing system, comprising:
an input port configured to receive a speech input representing at least one of a command and a stream of data by an automated data processing system having a system state;
at least one processor, executing:
a parser configured to distinguish between a command structure and dictation within the speech input;
an analyzer configured to automatically analyze a grammar of the speech input for at least a distinguished command structure, to determine ambiguity and completeness representing a command structure deficiency;
a user feedback system configured to indicate the command structure deficiency and to solicit the user to remedy the deficiency by providing additional speech input, in a contextually appropriate manner, wherein at least the user feedback system is adapted to alter the system state, such that a system state before soliciting the user to remedy the deficiency differs from the system state after soliciting the user to remedy the deficiency; and
an interrupt module, configured to automatically preserve the system state prior to soliciting the user to remedy the deficiency, and after soliciting the user to remedy the deficiency, to automatically restore the preserved prior system state to the system state prior to soliciting the user to remedy the deficiency subject to changes in the system state resulting from execution of the command.

2. The method according to claim 1, further comprising entering a data input mode if the speech input is distinguished as dictation, and in the data input mode further analyzing the dictation to determine at least one of a termination of dictation and a command structure.

3. The speech processing method of claim 1, wherein said parser is responsive to a content of the speech input and a context of use.

4. The method according to claim 1, further comprising performing a natural language analysis of the speech input to determine the context of use.

5. The method according to claim 1, further comprising determining a status of at least one grammar structure with respect to the speech input, and selecting a grammar structure in dependence on the status of at the least one grammar structure with respect to the speech input.

6. The method according to claim 1, further comprising determining one of a plurality of software objects which represents a target of the command structure.

7. The method according to claim 1, wherein the analyzer comprises a plurality of automated processors operating concurrently in parallel.

8. The method according to claim 1, wherein the user feedback system comprises a graphic user interface, and the system state comprises a state of the graphic user interface.

9. The method according to claim 1, further comprising executing a software object subsequent to executing the command, substantially without restoring the preserved prior state of the system.

10. A speech processing method, comprising:
determining a variable set of available commands;
determining command structures corresponding to the determined set of available commands;
processing a natural language speech input representing at least one command with respect to the determined command structures, with at least one automated processor, wherein an interpretation of the natural language speech input is dependent on the determined variable set of available commands;
determining and preserving in a system state of the at least one automated processor prior to the natural language speech input;
determining if the natural language speech input likely represents a command;
determining a completeness and an ambiguity of the represented command with respect to the determined command structures, and if the likely at least one command is too ambiguous or incomplete for execution, obtaining further speech input to reduce ambiguity or incompleteness, wherein at least said obtaining is adapted to change the determined system state, such that a system state before said obtaining further speech input differs from the system state after said obtaining further speech input;
executing the represented command with at least one automated processor; and
reverting the at least one automated processor to the determined preserved system state with further changes in the system state resulting from executing the represented command by the at least one automated processor.

11. The method according to claim 10, wherein the system state comprises a state of a graphic user interface.

12. The method according to claim 10, further comprising maintaining at least one data structure representing at least a status of a grammar, wherein the data structure is updated based on the natural language speech input and a context; wherein the variable set of available commands is determined dynamically.

13. The method according to claim 10, wherein said determining if the natural language speech input likely represents a command is selectively dependent on a context of use and the variable set of available commands.

14. The method according to claim 10, wherein the represented command is targeted to one of a plurality of available applications, further comprising restoring a system state to a different state than immediately preceded execution of the represented command.

15. The method according to claim 10, wherein a variable subset of a plurality of applications are concurrently available, further comprising determining a respective application within the variable subset which is targeted by the natural language speech input.

16. The method according to claim 10, further comprising determining whether the natural language speech input represents unstructured language input which does not represent a command within the determined set of available commands.

17. A speech processing method, comprising:
receiving a natural language speech input representing structured commands and unstructured words;
analyzing the natural language speech with at least one automated processor for contextual indicia to distinguish between the structured commands, instructing a device at take automated action, and the unstructured words intended as data and not instructing the device to take automated action defined by the unstructured words;
determining whether a respective structured command is sufficiently complete to permit at least partial execution, or whether additional command input is required for sufficient completeness to permit at least partial execution;
preserving a system state;
soliciting further input to increase a completeness of the respective structured command, while causing a first change in the system state, and further determining whether a respective structured command is sufficiently complete to permit at least partial execution;
at least partially executing the determined sufficiently complete commands with the at least one automated processor, while causing a second change in the system state;
restoring the system state to the preserved system state to reverse the first change in the system state and permit the second change in the system state; and
passing the natural language speech containing the unstructured words intended as data to a data sink.

18. The method according to claim 17, wherein the system state comprises a state of a graphic user interface.

19. The method according to claim 17, further comprising maintaining a plurality of data structures representing at least a status of a plurality of grammars, wherein the data structures are dynamically updated based on the natural language speech input and a context determined by the at least one automated processor.

20. The method according to claim 17, wherein at least one of a non-linguistic implicit input selected from the group consisting of at least one of a temporal analysis, natural language analysis, and syntactic analysis is used to determine contextual indicia of the speech input.

* * * * *